US008915659B2

(12) United States Patent  
Marcouiller et al.

(10) Patent No.: US 8,915,659 B2
(45) Date of Patent: Dec. 23, 2014

(54) SPLICE ENCLOSURE ARRANGEMENT FOR FIBER OPTIC CABLES

(75) Inventors: Thomas Marcouiller, Shakopee, MN (US); Paula Rudenick, Eden Prairie, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 649 days.

(21) Appl. No.: 13/106,371

(22) Filed: May 12, 2011

(65) Prior Publication Data

US 2011/0280525 A1    Nov. 17, 2011

Related U.S. Application Data

(60) Provisional application No. 61/421,353, filed on Dec. 9, 2010, provisional application No. 61/334,815, filed on May 14, 2010.

(51) Int. Cl.
*G02B 6/255* (2006.01)
*G02B 6/44* (2006.01)
*G02B 6/40* (2006.01)

(52) U.S. Cl.
CPC .............. *G02B 6/403* (2013.01); *G02B 6/4471* (2013.01); *G02B 6/2551* (2013.01); *G02B 6/2558* (2013.01)
USPC .............................................. 385/99; 385/95

(58) Field of Classification Search
None
See application file for complete search history.

(56) References Cited

U.S. PATENT DOCUMENTS

| 2,047,152 A | 7/1936 | Mitchell |
| 3,441,659 A * | 4/1969 | Laudig et al. ............... 174/88 C |
| 3,691,505 A | 9/1972 | Graves |
| 3,845,552 A | 11/1974 | Waltz |
| 3,879,575 A | 4/1975 | Dobbin et al. |
| 3,912,854 A | 10/1975 | Thompson et al. |
| 3,912,855 A | 10/1975 | Thompson et al. |
| 3,991,014 A | 11/1976 | Kleinschuster |
| 4,067,852 A | 1/1978 | Calundann |

(Continued)

FOREIGN PATENT DOCUMENTS

| DE | 25 13 723 A1 | 10/1976 |
| DE | 35 37 684 A1 | 4/1987 |

(Continued)

OTHER PUBLICATIONS

International Search Report and Written Opinion mailed Feb. 9, 2012.

(Continued)

*Primary Examiner* — Uyen Chaun N Le
*Assistant Examiner* — Chad Smith
(74) *Attorney, Agent, or Firm* — Merchant & Gould P.C.

(57) ABSTRACT

An optical fiber cable includes a first cable segment; a second cable segment; and a splice enclosure. The first cable segment can have a different configuration than the second cable segment. The splice enclosure is coupled to the strength member and strength component of the first cable segment and the second cable segment. One example splice enclosure includes a first enclosure body having a first threaded connection region and a second enclosure body having a second threaded connection region. Another example splice enclosure includes a tubular enclosure with two end caps. Cable retention members are positioned within the splice enclosure at fixed axial positions.

15 Claims, 71 Drawing Sheets

(56) References Cited

U.S. PATENT DOCUMENTS

| | | | |
|---|---|---|---|
| 4,078,853 | A | 3/1978 | Kempf et al. |
| 4,083,829 | A | 4/1978 | Calundann et al. |
| 4,085,286 | A | 4/1978 | Horsma et al. |
| 4,089,585 | A | 5/1978 | Slaughter et al. |
| 4,107,451 | A | 8/1978 | Smith, Jr. et al. |
| 4,130,545 | A | 12/1978 | Calundann |
| 4,152,539 | A | 5/1979 | Charlebois et al. |
| 4,161,470 | A | 7/1979 | Calundann |
| 4,196,965 | A | 4/1980 | Matsuno |
| 4,199,225 | A | 4/1980 | Slaughter et al. |
| 4,304,462 | A | 12/1981 | Baba et al. |
| 4,318,842 | A | 3/1982 | East et al. |
| 4,322,573 | A | 3/1982 | Charlebois |
| 4,343,844 | A | 8/1982 | Thayer et al. |
| 4,348,076 | A | 9/1982 | Oldham |
| 4,359,598 | A | 11/1982 | Dey et al. |
| 4,401,361 | A | 8/1983 | Slaughter |
| 4,405,083 | A | 9/1983 | Charlebois et al. |
| 4,413,881 | A | 11/1983 | Kovats |
| 4,420,220 | A | 12/1983 | Dean et al. |
| 4,460,735 | A | 7/1984 | Froix |
| 4,467,137 | A | 8/1984 | Jonathan et al. |
| 4,468,364 | A | 8/1984 | Ide |
| 4,475,935 | A | 10/1984 | Tanaka et al. |
| 4,481,380 | A | 11/1984 | Wood et al. |
| 4,490,315 | A | 12/1984 | Charlebois et al. |
| 4,512,628 | A | 4/1985 | Anderton |
| 4,515,435 | A | 5/1985 | Anderson |
| 4,528,150 | A | 7/1985 | Charlebois et al. |
| 4,528,419 | A | 7/1985 | Charlebois et al. |
| 4,549,039 | A | 10/1985 | Charlebois et al. |
| 4,550,220 | A | 10/1985 | Kitchens |
| 4,550,976 | A | 11/1985 | Cooper et al. |
| 4,553,815 | A | 11/1985 | Martin |
| 4,556,281 | A | 12/1985 | Anderton |
| 4,569,420 | A | 2/1986 | Pickett et al. |
| 4,570,032 | A | 2/1986 | Charlebois et al. |
| 4,581,480 | A | 4/1986 | Charlebois |
| 4,589,939 | A | 5/1986 | Mohebban et al. |
| 4,591,330 | A | 5/1986 | Charlebois et al. |
| 4,592,721 | A | 6/1986 | Charlebois et al. |
| 4,595,256 | A | 6/1986 | Guazzo |
| 4,609,773 | A | 9/1986 | Brown et al. |
| 4,623,495 | A | 11/1986 | Degoix et al. |
| 4,625,073 | A | 11/1986 | Breesch et al. |
| 4,629,597 | A | 12/1986 | Charlebois et al. |
| 4,648,606 | A | 3/1987 | Brown et al. |
| 4,648,919 | A | 3/1987 | Diaz et al. |
| 4,654,474 | A | 3/1987 | Charlebois et al. |
| 4,659,174 | A | 4/1987 | Ditscheid et al. |
| 4,666,537 | A | 5/1987 | Dienes |
| 4,670,069 | A | 6/1987 | Debbaut et al. |
| 4,670,980 | A | 6/1987 | Charlebois et al. |
| 4,678,866 | A | 7/1987 | Charlebois |
| 4,684,764 | A | 8/1987 | Luzzi et al. |
| 4,693,551 | A | 9/1987 | Blanco et al. |
| 4,701,574 | A | 10/1987 | Shimirak et al. |
| 4,715,677 | A | 12/1987 | Saito et al. |
| 4,723,831 | A | 2/1988 | Johnson et al. |
| 4,725,035 | A | 2/1988 | Charlebois et al. |
| 4,728,698 | A | 3/1988 | Isayev et al. |
| 4,729,628 | A | 3/1988 | Kraft et al. |
| 4,730,894 | A | 3/1988 | Arroyo |
| 4,732,628 | A | 3/1988 | Dienes |
| 4,747,020 | A | 5/1988 | Brickley et al. |
| 4,761,052 | A | 8/1988 | Buekers et al. |
| 4,761,053 | A | 8/1988 | Cogelia et al. |
| 4,764,232 | A | 8/1988 | Hunter |
| 4,765,712 | A | 8/1988 | Bohannon, Jr. et al. |
| 4,767,183 | A | 8/1988 | Martin |
| 4,773,728 | A | 9/1988 | Kershaw |
| 4,778,244 | A | 10/1988 | Ryan |
| 4,781,433 | A | 11/1988 | Arroyo et al. |
| 4,798,443 | A | 1/1989 | Knipe et al. |
| 4,807,962 | A | 2/1989 | Arroyo et al. |
| 4,810,834 | A | 3/1989 | Grögl et al. |
| 4,813,754 | A * | 3/1989 | Priaroggia ............... 385/69 |
| 4,818,060 | A | 4/1989 | Arroyo |
| 4,818,824 | A | 4/1989 | Dixit et al. |
| 4,822,434 | A | 4/1989 | Sawaki et al. |
| 4,826,278 | A | 5/1989 | Gartside, III et al. |
| 4,835,047 | A | 5/1989 | Isayev et al. |
| 4,844,575 | A | 7/1989 | Kinard et al. |
| 4,852,965 | A | 8/1989 | Mullin et al. |
| 4,875,757 | A | 10/1989 | Greveling |
| 4,875,952 | A | 10/1989 | Mullin et al. |
| 4,884,863 | A | 12/1989 | Throckmorton |
| 4,895,427 | A | 1/1990 | Kraft |
| 4,906,066 | A | 3/1990 | Ryan |
| 4,909,592 | A | 3/1990 | Arroyo et al. |
| 4,910,727 | A | 3/1990 | Fussganger |
| 4,913,512 | A | 4/1990 | Anderton |
| 4,946,249 | A | 8/1990 | Barlow et al. |
| 4,950,048 | A | 8/1990 | Kakii et al. |
| 4,952,798 | A | 8/1990 | Graham et al. |
| 4,956,039 | A | 9/1990 | Olesen et al. |
| 4,961,623 | A | 10/1990 | Midkiff et al. |
| 4,963,698 | A | 10/1990 | Chang et al. |
| RE33,459 | E | 11/1990 | Bohannon, Jr. et al. |
| 4,974,925 | A * | 12/1990 | Troutman et al. ............... 385/99 |
| 4,982,083 | A | 1/1991 | Graham et al. |
| 4,986,762 | A | 1/1991 | Keith |
| 5,004,315 | A | 4/1991 | Miyazaki |
| 5,006,402 | A | 4/1991 | Isayev |
| 5,006,403 | A | 4/1991 | Isayev |
| 5,015,063 | A | 5/1991 | Panuska et al. |
| 5,021,475 | A | 6/1991 | Isayev |
| 5,032,433 | A | 7/1991 | Isayev et al. |
| 5,039,456 | A | 8/1991 | Bowen et al. |
| 5,042,901 | A | 8/1991 | Merriken et al. |
| 5,046,811 | A | 9/1991 | Jung et al. |
| 5,050,957 | A | 9/1991 | Hamilton et al. |
| 5,054,868 | A | 10/1991 | Hoban et al. |
| 5,066,095 | A | 11/1991 | Dekeyser et al. |
| 5,070,157 | A | 12/1991 | Isayev et al. |
| 5,074,808 | A | 12/1991 | Beamenderfer et al. |
| 5,076,688 | A | 12/1991 | Bowen et al. |
| 5,082,348 | A | 1/1992 | Gartside, III et al. |
| 5,097,529 | A | 3/1992 | Cobb et al. |
| 5,098,177 | A | 3/1992 | Tanaka |
| 5,099,088 | A | 3/1992 | Usami et al. |
| 5,115,105 | A | 5/1992 | Gallusser et al. |
| 5,121,244 | A | 6/1992 | Takasaki |
| 5,121,458 | A | 6/1992 | Nilsson et al. |
| 5,125,060 | A | 6/1992 | Edmundson |
| 5,125,063 | A | 6/1992 | Panuska et al. |
| 5,148,509 | A | 9/1992 | Kannabiran |
| 5,157,752 | A | 10/1992 | Greveling et al. |
| 5,185,844 | A * | 2/1993 | Bensel et al. ............... 385/135 |
| 5,194,692 | A | 3/1993 | Gallusser et al. |
| 5,210,812 | A | 5/1993 | Nilsson et al. |
| 5,214,730 | A | 5/1993 | Nagasawa et al. |
| 5,217,808 | A | 6/1993 | Cobb |
| 5,222,176 | A | 6/1993 | Webber et al. |
| 5,224,187 | A | 6/1993 | Davisdon |
| 5,229,851 | A | 7/1993 | Rahman |
| 5,238,638 | A | 8/1993 | Isayev |
| 5,241,611 | A * | 8/1993 | Gould ............... 385/70 |
| 5,245,151 | A | 9/1993 | Chamberlain et al. |
| 5,260,380 | A | 11/1993 | Isayev |
| 5,268,225 | A | 12/1993 | Isayev |
| 5,275,877 | A | 1/1994 | Isayev |
| 5,307,843 | A | 5/1994 | Jarrin et al. |
| 5,320,788 | A | 6/1994 | Schneider et al. |
| 5,335,408 | A | 8/1994 | Cobb |
| 5,345,525 | A | 9/1994 | Holman et al. |
| 5,345,526 | A | 9/1994 | Blew |
| 5,347,089 | A | 9/1994 | Barrat et al. |
| 5,353,367 | A | 10/1994 | Czosnowski et al. |
| 5,360,497 | A | 11/1994 | Schneider et al. |
| 5,367,159 | A | 11/1994 | Schofiled et al. |
| 5,367,593 | A | 11/1994 | Lebby et al. |
| 5,376,196 | A | 12/1994 | Grajewski et al. |
| 5,378,853 | A | 1/1995 | Clouet et al. |

(56) References Cited

U.S. PATENT DOCUMENTS

| | | | |
|---|---|---|---|
| 5,394,502 A | 2/1995 | Caron | |
| 5,402,515 A | 3/1995 | Vidacovich et al. | |
| 5,410,105 A | 4/1995 | Tahara et al. | |
| RE34,955 E | 5/1995 | Anton et al. | |
| 5,420,958 A | 5/1995 | Henson et al. | |
| 5,440,655 A | 8/1995 | Kaplow et al. | |
| 5,440,665 A | 8/1995 | Ray et al. | |
| 5,442,726 A | 8/1995 | Howard et al. | |
| 5,448,670 A | 9/1995 | Blew et al. | |
| 5,450,517 A | 9/1995 | Essert | |
| 5,475,781 A | 12/1995 | Chang et al. | |
| 5,491,766 A | 2/1996 | Huynh et al. | |
| 5,509,097 A | 4/1996 | Tondi-Resta et al. | |
| 5,509,202 A | 4/1996 | Abdow | |
| 5,517,592 A | 5/1996 | Grajewski et al. | |
| 5,528,718 A | 6/1996 | Ray et al. | |
| 5,557,698 A | 9/1996 | Gareis et al. | |
| 5,561,729 A | 10/1996 | Parris | |
| 5,596,662 A | 1/1997 | Boscher | |
| 5,627,932 A | 5/1997 | Kiel et al. | |
| 5,657,413 A | 8/1997 | Ray et al. | |
| 5,666,453 A | 9/1997 | Dannenmann | |
| 5,680,234 A | 10/1997 | Darcie et al. | |
| 5,684,911 A | 11/1997 | Burgett | |
| 5,696,864 A | 12/1997 | Smith et al. | |
| 5,708,753 A | 1/1998 | Frigo et al. | |
| 5,727,100 A | 3/1998 | Grajewski et al. | |
| 5,734,776 A | 3/1998 | Puetz | |
| 5,737,470 A | 4/1998 | Nagano et al. | |
| 5,748,819 A | 5/1998 | Szentesi et al. | |
| 5,757,997 A | 5/1998 | Birrell et al. | |
| 5,767,198 A | 6/1998 | Shimizu et al. | |
| 5,767,448 A | 6/1998 | Dong | |
| 5,778,122 A | 7/1998 | Giebel et al. | |
| 5,790,285 A | 8/1998 | Mock | |
| 5,802,231 A | 9/1998 | Nagano et al. | |
| 5,823,646 A | 10/1998 | Arizpe et al. | |
| 5,825,963 A | 10/1998 | Burgett | |
| 5,838,864 A | 11/1998 | Patel et al. | |
| 5,861,575 A | 1/1999 | Broussard | |
| 5,892,870 A | 4/1999 | Fingler et al. | |
| 5,894,536 A * | 4/1999 | Rifkin et al. | 385/99 |
| 5,898,808 A | 4/1999 | Morlion et al. | |
| 5,898,813 A | 4/1999 | Beier | |
| 5,907,417 A | 5/1999 | Darcie et al. | |
| 5,945,633 A | 8/1999 | Ott et al. | |
| 5,969,294 A | 10/1999 | Eberle et al. | |
| 5,970,192 A | 10/1999 | Osugi et al. | |
| 5,970,196 A | 10/1999 | Greveling et al. | |
| 5,978,536 A | 11/1999 | Brandi et al. | |
| 5,982,966 A | 11/1999 | Bonicel | |
| 5,997,186 A | 12/1999 | Huynh et al. | |
| 6,014,487 A | 1/2000 | Field et al. | |
| RE36,592 E | 2/2000 | Giebel et al. | |
| 6,086,263 A | 7/2000 | Selli et al. | |
| 6,088,499 A | 7/2000 | Newton et al. | |
| 6,104,846 A | 8/2000 | Hodgson et al. | |
| 6,122,420 A | 9/2000 | Satoh | |
| 6,122,423 A | 9/2000 | You et al. | |
| 6,137,936 A | 10/2000 | Fitz et al. | |
| RE37,028 E | 1/2001 | Cooke et al. | |
| 6,181,861 B1 | 1/2001 | Wenski et al. | |
| 6,198,865 B1 | 3/2001 | Risch | |
| 6,215,930 B1 | 4/2001 | Estes et al. | |
| 6,241,399 B1 | 6/2001 | Nobuhara | |
| 6,249,628 B1 | 6/2001 | Rutterman et al. | |
| 6,255,584 B1 | 7/2001 | Renaud | |
| 6,256,438 B1 | 7/2001 | Gimblet | |
| 6,257,769 B1 | 7/2001 | Watanabe et al. | |
| 6,273,621 B1 | 8/2001 | Eslambolchi et al. | |
| 6,278,831 B1 | 8/2001 | Henderson et al. | |
| 6,321,012 B1 | 11/2001 | Shen | |
| 6,324,324 B1 | 11/2001 | Dixon et al. | |
| 6,343,950 B1 | 2/2002 | Eginton et al. | |
| 6,347,172 B1 | 2/2002 | Keller et al. | |
| 6,356,690 B1 | 3/2002 | McAlpine et al. | |
| 6,370,303 B1 | 4/2002 | Fitz et al. | |
| 6,376,774 B1 | 4/2002 | Oh et al. | |
| 6,400,873 B1 | 6/2002 | Gimblet et al. | |
| 6,407,338 B1 | 6/2002 | Smith | |
| 6,419,402 B1 | 7/2002 | Zimmel | |
| 6,434,307 B1 | 8/2002 | Church | |
| 6,439,776 B1 | 8/2002 | Harrison et al. | |
| 6,439,777 B1 | 8/2002 | Harrison et al. | |
| 6,454,464 B1 | 9/2002 | Nolan | |
| 6,459,837 B1 | 10/2002 | Fitz et al. | |
| 6,466,725 B2 | 10/2002 | Battey et al. | |
| 6,481,903 B1 | 11/2002 | Varma et al. | |
| 6,493,491 B1 | 12/2002 | Shen et al. | |
| 6,493,500 B1 | 12/2002 | Oh et al. | |
| 6,495,764 B1 | 12/2002 | Hori | |
| 6,501,888 B2 | 12/2002 | Gimblet et al. | |
| 6,519,395 B1 | 2/2003 | Bevan et al. | |
| 6,527,986 B2 | 3/2003 | Blyler, Jr. et al. | |
| 6,539,160 B2 | 3/2003 | Battey et al. | |
| 6,542,674 B1 | 4/2003 | Gimblet | |
| 6,546,175 B1 | 4/2003 | Wagman et al. | |
| 6,576,166 B1 | 6/2003 | Perrin et al. | |
| 6,579,014 B2 | 6/2003 | Melton et al. | |
| 6,583,867 B1 | 6/2003 | Jennings et al. | |
| 6,592,268 B2 | 7/2003 | Chen et al. | |
| 6,619,697 B2 | 9/2003 | Griffioen et al. | |
| 6,621,964 B2 | 9/2003 | Quinn et al. | |
| 6,621,975 B2 | 9/2003 | Laporte et al. | |
| 6,648,520 B2 | 11/2003 | McDonald et al. | |
| 6,654,523 B1 | 11/2003 | Cole | |
| 6,654,527 B2 | 11/2003 | Sakabe et al. | |
| 6,655,016 B2 | 12/2003 | Renaud | |
| 6,660,182 B2 | 12/2003 | Jester | |
| 6,661,339 B2 | 12/2003 | Muirhead | |
| 6,668,127 B1 | 12/2003 | Mahony | |
| 6,701,047 B1 | 3/2004 | Rutterman et al. | |
| 6,706,968 B2 | 3/2004 | Yaworski et al. | |
| 6,707,979 B2 | 3/2004 | Wang et al. | |
| 6,712,527 B1 | 3/2004 | Chan et al. | |
| 6,714,710 B2 | 3/2004 | Gimblet | |
| 6,744,954 B1 | 6/2004 | Tanaka et al. | |
| 6,764,220 B2 | 7/2004 | Griffiths et al. | |
| 6,801,695 B2 | 10/2004 | Lanier et al. | |
| 6,807,347 B2 | 10/2004 | McAlpine et al. | |
| 6,808,116 B1 | 10/2004 | Eslambolchi et al. | |
| 6,810,194 B2 | 10/2004 | Griffiths et al. | |
| 6,813,422 B1 | 11/2004 | Krishnamurthy et al. | |
| 6,819,842 B1 | 11/2004 | Vogel et al. | |
| 6,836,603 B1 | 12/2004 | Bocanegra et al. | |
| 6,856,748 B1 | 2/2005 | Elkins, II et al. | |
| 6,880,219 B2 | 4/2005 | Griffioen et al. | |
| 6,899,467 B2 | 5/2005 | McDonald et al. | |
| 6,901,191 B2 | 5/2005 | Hurley et al. | |
| 6,907,164 B2 | 6/2005 | Lachance et al. | |
| 6,928,217 B2 | 8/2005 | Mohler et al. | |
| 6,937,801 B2 | 8/2005 | McAlpine et al. | |
| 7,006,739 B2 | 2/2006 | Elkins, II et al. | |
| 7,010,201 B2 | 3/2006 | Risch | |
| 7,011,774 B2 | 3/2006 | Risch | |
| 7,016,592 B2 | 3/2006 | Elkins, II et al. | |
| 7,020,956 B2 | 4/2006 | Kuribayashi et al. | |
| 7,088,893 B2 | 8/2006 | Cooke et al. | |
| 7,090,406 B2 | 8/2006 | Melton et al. | |
| 7,090,407 B2 | 8/2006 | Melton et al. | |
| 7,113,680 B2 | 9/2006 | Hurley et al. | |
| 7,127,143 B2 | 10/2006 | Elkins et al. | |
| 7,146,090 B2 | 12/2006 | Vo et al. | |
| 7,197,214 B2 | 3/2007 | Elkins, II et al. | |
| 7,197,215 B2 | 3/2007 | Baird et al. | |
| 7,218,821 B2 | 5/2007 | Bocanegra et al. | |
| 7,242,841 B2 * | 7/2007 | Greenwood et al. | 385/137 |
| 7,264,402 B2 | 9/2007 | Theuerkorn et al. | |
| 7,306,382 B2 * | 12/2007 | Qian et al. | 385/95 |
| 7,349,605 B2 | 3/2008 | Noonan et al. | |
| 7,349,642 B2 | 3/2008 | Tatematsu et al. | |
| 7,352,924 B2 | 4/2008 | Gaebe et al. | |
| 7,379,642 B2 | 5/2008 | Kachmar | |
| 7,393,148 B2 | 7/2008 | Allen et al. | |

(56) References Cited

U.S. PATENT DOCUMENTS

| | | | |
|---|---|---|---|
| 7,410,308 B2 * | 8/2008 | Qian et al. ................ 385/95 | |
| 7,458,103 B2 | 12/2008 | Citterio et al. | |
| 7,461,983 B1 * | 12/2008 | Gurreri et al. ............. 385/99 | |
| 7,494,289 B1 | 2/2009 | Chen | |
| 7,565,055 B2 | 7/2009 | Lu et al. | |
| 7,566,474 B2 | 7/2009 | Kachmar | |
| 7,693,375 B2 | 4/2010 | Freeland et al. | |
| 7,869,677 B2 | 1/2011 | Kachmar | |
| 8,041,166 B2 | 10/2011 | Kachmar | |
| 8,041,178 B2 | 10/2011 | Lu et al. | |
| 8,090,232 B2 | 1/2012 | Kachmar | |
| 8,107,781 B2 | 1/2012 | Kachmar et al. | |
| 8,290,320 B2 | 10/2012 | Kachmar | |
| 8,326,104 B2 | 12/2012 | Kachmar | |
| 8,333,519 B2 | 12/2012 | Marcouiller et al. | |
| 2001/0016103 A1 | 8/2001 | Hoch | |
| 2001/0041035 A1 | 11/2001 | Uchida et al. | |
| 2002/0025127 A1 | 2/2002 | Graham et al. | |
| 2002/0146563 A1 | 10/2002 | Risch | |
| 2002/0181925 A1 | 12/2002 | Hodge et al. | |
| 2002/0184747 A1 | 12/2002 | Kuribayashi et al. | |
| 2003/0007755 A1 | 1/2003 | Morita et al. | |
| 2003/0091307 A1 | 5/2003 | Hurley et al. | |
| 2003/0118296 A1 | 6/2003 | Smith | |
| 2003/0123838 A1 | 7/2003 | Wang et al. | |
| 2003/0169422 A1 | 9/2003 | Mukai | |
| 2004/0074852 A1 | 4/2004 | Knudsen et al. | |
| 2004/0105613 A1 | 6/2004 | Chown | |
| 2004/0105636 A1 | 6/2004 | Cottevieille et al. | |
| 2004/0123998 A1 | 7/2004 | Berglund et al. | |
| 2004/0126069 A1 | 7/2004 | Jong et al. | |
| 2004/0223720 A1 | 11/2004 | Melton et al. | |
| 2004/0228589 A1 | 11/2004 | Melton et al. | |
| 2004/0247265 A1 | 12/2004 | Takano et al. | |
| 2005/0053342 A1 | 3/2005 | Melton et al. | |
| 2005/0069275 A1 | 3/2005 | Brants et al. | |
| 2005/0111799 A1 | 5/2005 | Cooke et al. | |
| 2005/0111800 A1 | 5/2005 | Cooke et al. | |
| 2005/0123262 A1 | 6/2005 | Dowd et al. | |
| 2005/0147363 A1 | 7/2005 | Chastain et al. | |
| 2005/0175308 A1 | 8/2005 | Elkins, II et al. | |
| 2005/0213898 A1 * | 9/2005 | Rubinstein et al. ........ 385/99 | |
| 2005/0259928 A1 | 11/2005 | Elkins, II et al. | |
| 2005/0259929 A1 | 11/2005 | Elkins, II et al. | |
| 2005/0259930 A1 | 11/2005 | Elkins, II et al. | |
| 2005/0276552 A1 | 12/2005 | Cooke et al. | |
| 2006/0056782 A1 | 3/2006 | Elkins, II et al. | |
| 2006/0093303 A1 | 5/2006 | Reagan et al. | |
| 2006/0153517 A1 | 7/2006 | Reagan et al. | |
| 2006/0159407 A1 | 7/2006 | Kachmar | |
| 2006/0193573 A1 | 8/2006 | Greenwood et al. | |
| 2006/0291787 A1 | 12/2006 | Seddon | |
| 2007/0025664 A1 | 2/2007 | Macaraeg | |
| 2007/0092178 A1 | 4/2007 | Gaebe et al. | |
| 2007/0098339 A1 | 5/2007 | Bringuier et al. | |
| 2007/0127875 A1 | 6/2007 | Allen et al. | |
| 2007/0127878 A1 | 6/2007 | de montmorillon et al. | |
| 2007/0189696 A1 | 8/2007 | Van Koetsem et al. | |
| 2007/0280615 A1 | 12/2007 | de Montmorillon et al. | |
| 2008/0187276 A1 | 8/2008 | Roberts et al. | |
| 2008/0292254 A1 | 11/2008 | Kachmar | |
| 2009/0034916 A1 | 2/2009 | LeBlanc | |
| 2009/0034917 A1 | 2/2009 | Burwell et al. | |
| 2009/0297104 A1 | 12/2009 | Kachmar | |
| 2009/0317039 A1 | 12/2009 | Blazer et al. | |
| 2009/0317047 A1 | 12/2009 | Smith et al. | |
| 2010/0046894 A1 | 2/2010 | Kachmar | |
| 2010/0086266 A1 | 4/2010 | Marcouiller et al. | |
| 2010/0166370 A1 | 7/2010 | Cody et al. | |
| 2011/0103755 A1 | 5/2011 | Kachmar | |
| 2011/0280525 A1 | 11/2011 | Marcouiller et al. | |
| 2011/0286707 A1 | 11/2011 | Kachmar | |
| 2012/0106905 A1 | 5/2012 | Kachmar et al. | |
| 2012/0230646 A1 | 9/2012 | Thompson et al. | |

FOREIGN PATENT DOCUMENTS

| | | |
|---|---|---|
| DE | 20 2007 006 6 | 8/2007 |
| EP | 0 115 725 A1 | 8/1984 |
| EP | 0 512 811 A1 | 11/1992 |
| EP | 0 903 604 A2 | 3/1999 |
| EP | 1 361 465 A1 | 11/2003 |
| EP | 1 380 828 A1 | 1/2004 |
| FR | 2 693 805 A1 | 1/1994 |
| GB | 1 483 845 | 8/1977 |
| GB | 2 096 343 A | 10/1982 |
| GB | 2 296 575 A | 7/1996 |
| JP | 58-105114 | 6/1983 |
| JP | 60-169813 | 9/1985 |
| JP | 60-169815 | 9/1985 |
| JP | 61-27510 | 2/1986 |
| JP | 61-190305 | 8/1986 |
| JP | 61-220536 | 9/1986 |
| JP | 62-54204 | 3/1987 |
| JP | 62-59906 | 3/1987 |
| JP | 63-136007 | 6/1988 |
| JP | 63-180915 | 7/1988 |
| JP | 63-287916 | 11/1988 |
| JP | 63-310317 | 12/1988 |
| JP | 1-138828 | 5/1989 |
| JP | 2001-99946 | 4/2001 |
| JP | 2001-116968 | 4/2001 |
| JP | 2002-139651 | 5/2002 |
| JP | 2003-177254 | 6/2003 |
| JP | 2004-219944 | 8/2004 |
| WO | WO 96/15466 | 5/1996 |
| WO | WO 98/15857 | 4/1998 |
| WO | WO 2005/017591 A1 | 2/2005 |
| WO | WO 2005/119322 A1 | 12/2005 |
| WO | WO 2006/044080 A1 | 4/2006 |
| WO | WO 2006/050505 A1 | 5/2006 |
| WO | WO 2006/052355 A1 | 5/2006 |

OTHER PUBLICATIONS

"Cable Assemblies: Molding & Termination," http://www.dgo.com/prodcable.htm, 8 pages (Copyright 2001).

"DAM/BLOK™ Electrical Splice Kit," http://www.pmiind.com/products/damblok.html, 2 pages. (Copyright 2000).

"Factory Installed Termination Systems for Fiber Optic Cable Splices," 1 page (admitted as prior art as of the filed).

Installation Instructions for Pre-Connectorized MIC® Cable (2-6 Fiber) Equipped with Plug & Play™ Systems Pulling Grips, *Corning Cable Systems*, Issue 7, pp. 1-3 (Jul. 2001).

"Pre-Connectorized (4-24 Fiber) Fiber Optic Cables Equipped with Plug & Play™ Systems Pulling Sleeves and Grips," *Corning Cable Systems*, Issue 1, pp. 1-7 (Mar. 2005).

ADC Spec Sheet, Fiber Optic Cable, Ruggedized Simplex and Duplex Cables, ADC®, Oct. 2005, 4 pages.

ADC Spec Sheet, Fiber Optic Cable, Tactical Cables, ADC®, Oct. 2005, 4 pages.

Fiber Optic Cable LCF™ Microcable: Plenum, *ADC Telecommunications, Inc.*, 4 pages. (Copyright 2005).

Superior Essex, FTTP Tight Buffered Indoor/Outdoor Drop, Series W7, RoHS, Product Bulletin, OSP Fiber Products, 2 pages (Nov. 2008).

* cited by examiner

SPLICE ENCLOSURE ARRANGEMENT FOR FIBER OPTIC CABLES

CROSS-REFERENCE TO RELATED APPLICATIONS

This application claims the benefit of U.S. Provisional Patent Application Ser. No. 61/421,353, filed Dec. 9, 2010 and U.S. Provisional Patent Application Ser. No. 61/334,815, filed May 14, 2010, which applications are hereby incorporated by reference in their entireties.

TECHNICAL FIELD

The present disclosure relates generally to a fiber optic data transmission system. More particularly, the present disclosure relates to splice configurations for use with fiber optic data transmission systems.

BACKGROUND

Fiber optic telecommunications technology is becoming more prevalent in part because service providers want to deliver high bandwidth communication capabilities to customers. A typical fiber optic telecommunications system includes a network of fiber optic cables (e.g., distribution cables or branch cables such as drop cables or stub cables) routed from a central location (e.g., a service provider's central office) to remote locations in close proximity to subscribers. The fiber optic telecommunications systems also can include additional components, such as fiber distribution hubs housing optical splitters for splitting optical signals and drop terminals providing interconnect locations for facilitating connecting subscribers to the fiber optic network.

U.S. Pat. No. 7,349,605 A1, which is hereby incorporated herein by reference in its entirety, discloses a fiber optic network including a distribution cable having factory terminated breakout locations. Each factory terminated breakout location includes a tether having a free end connectorized with a factory installed multi-fiber connector. In the field, the multi-fiber connector allows the tether to be quickly connected to a branch cable. One end of the branch cable includes a multi-fiber connector adapted to interconnect with the multi-fiber connector of the tether to provide optical connections between the optical fibers of the branch cable and the optical fibers of the tether. The other end of the branch cable is connected to a drop terminal.

When an optical connector is installed at the end of an optical cable such as a branch cable, it is often desirable to have a certain length of excess fiber that extends beyond a jacketed end portion of the cable to facilitate the connector installation process. For example, the excess fiber length facilitates low pressure polishing of a ferrule of the fiber optic connector and also facilitates mechanically coupling the fiber optic connector to the fiber optic cable. However, due to friction within the fiber optic cable, it can be difficult to withdraw a sufficient length of fiber from the end of the cable for use during the installation process. This is particularly true for longer lengths of cable (e.g., cable longer than 18 feet). Improved techniques for connectorizing fiber optic cables are needed.

SUMMARY

The present disclosure relates to techniques for facilitating installing a fiber optic connector at the end of a fiber optic cable. One aspect of the disclosure involves splicing a first fiber optic cable to a second fiber optic cable. The second fiber optic cable may be pre-connectorized.

In certain embodiments, a plurality of splice enclosure components are positioned to form a splice enclosure that encloses the portion of an optical fiber of the first cable that is spliced (e.g., fusion spliced, mechanically spliced, or otherwise spliced) to an optical fiber of the second cable. The splice enclosure protects the optical fibers at the site of the splice and securely holds the strength members of the fiber optic cables. Furthermore, splice enclosure components are positioned to form a cable enclosure that encloses the splice enclosure and exposed portions of the fiber optic cables.

DETAILED DESCRIPTION

In many circumstances, fiber optic cables may be manufactured in long segments. For example, fiber optic cable may be several hundred meters long. One end of fiber optic cable may be connected to a connector arrangement, e.g., a drop terminal, and the opposite end may be unconnectorized. To attach a connector to the unconnectorized end fiber optic cable, terminal segments of optical fibers preferably extend beyond the end of fiber optic cable. For example, when attaching a multi-fiber connector to fiber optic cable, it may be desirable for the terminal segments of optical fibers to extend approximately seven inches (~18 centimeters) beyond the ends of jacket.

Several issues may arise when attempting to expose terminal segments of optical fibers when attaching a connector to fiber optic cable. For example, friction within fiber optic cable may prevent the exposure of terminal segments of optical fibers by telescopically sliding optical fibers out of an end of buffer tube when fiber optic cable is longer than a certain length. In many instances, optical fibers can only slide within buffer tube when the length of fiber optic cable is less than eighteen feet. Consequently, an operation other than sliding optical fibers within buffer tube must be used to connectorize a fiber optic cable that is longer than eighteen feet.

Figure 1:
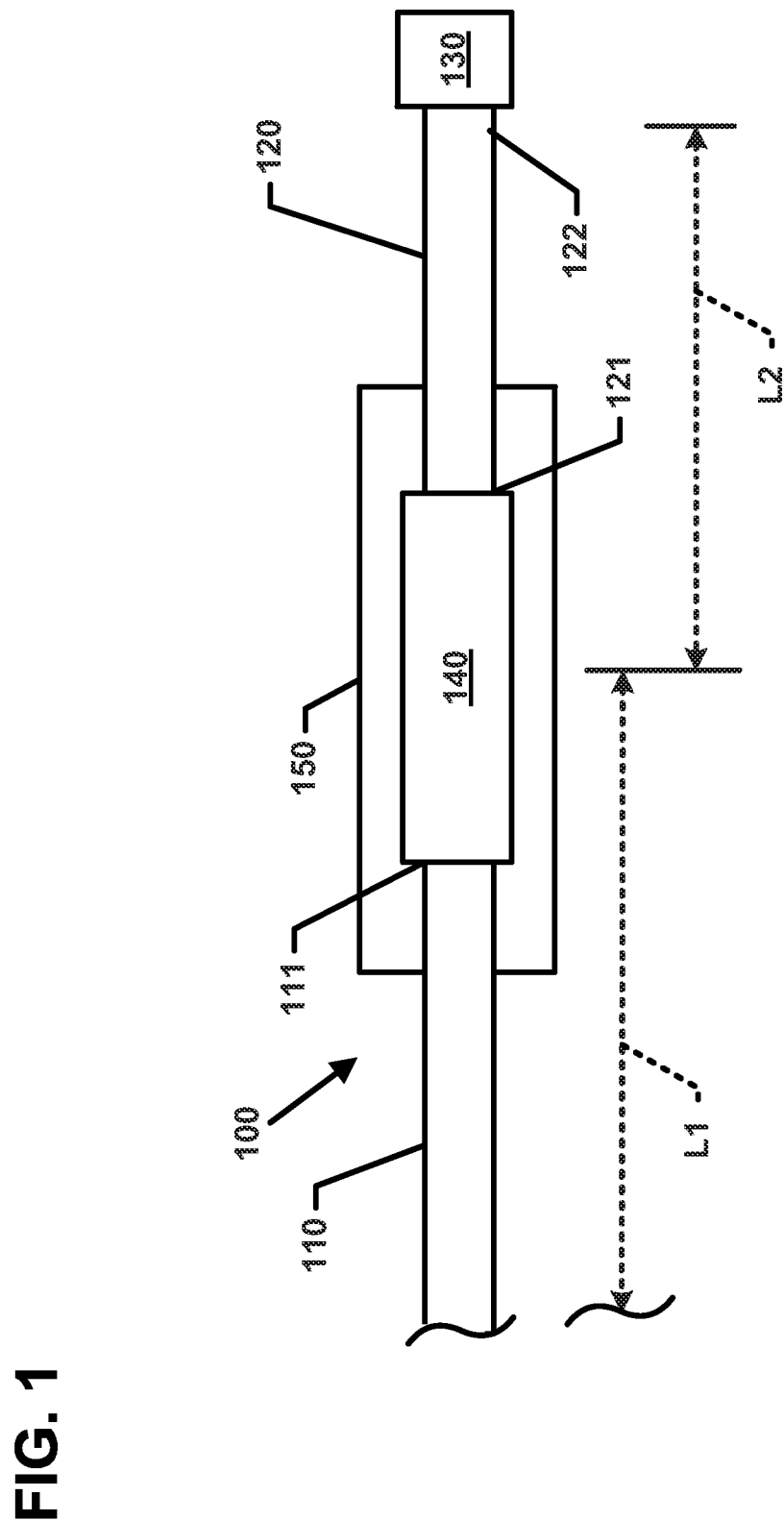
FIG. 1 is a schematic view of a second cable segment optically coupled to a first cable segment at a splice point that is secured within a splice enclosure in accordance with aspects of the disclosure.

In accordance with some aspects, FIG. 1 is a schematic diagram of an example telecommunications cable 100 having a first end terminated at a connector arrangement 130. The example cable 100 includes a first cable segment 110 having a length L1 of at least eighteen feet long and a second cable segment 120 having a length 12 of no more than eighteen feet. A first end 111 of the first cable segment 110 is spliced to a first end 121 of the second cable segment 120 to form the example telecommunications cable 100. In some implementations, the first cable segment 110 has substantially the same characteristics as the second cable segment 120. In other implementations, however, the two cable segments 110, 120 can have different characteristics.

In general, this paper discloses implementation techniques for splicing together at least two optical fibers of at least two cable segments. In accordance with some aspects, this paper discloses techniques for splicing together two different types of fiber optic cable segments. For example, in some implementations of this disclosure, a first optical cable including a first type of strength members can be spliced to a second optical cable including a second type of strength members. In one implementation, the strength members of the first cable segment can be more rigid (i.e., less flexible) than the strength members of the second cable segment.

Referring to FIG. 1, each cable segment 110, 120 includes at least one optical fiber. The optical fibers are preferably silica-based, single mode fibers, but they can be any type of optical fiber including, for example, a multi-mode or dispersion shifted optical fibers. The length L1 of the first cable segment 110 is greater than the length L2 of the second cable segment 120. Accordingly, only a portion of the first cable segment 110 adjacent the first end 111 is shown in FIG. 1.

A second end 129 of the second cable segment 120 is terminated at a fiber optic connector arrangement 130. For example, in some implementations, the optical fibers at the second end 129 of the second cable segment 120 can be terminated at a multi-fiber connector. In other implementations, the optical fibers can be terminated at multiple multi-fiber connectors. In still other implementations, the optical fibers at the second end 129 of the second cable segment 120 can be terminated at multiple single fiber connectors. In certain implementations, the fiber optic connector arrangement 130 is a hardened connector arrangement as will be described in more detail herein.

Splicing the second cable segment 120 to the first cable segment 110 optically couples together the optical fibers of the cable segments 110, 120 at a splice location. The fused optical fibers at the splice location are protected within a splice enclosure arrangement 140, which will be described in more detail herein. In accordance with certain aspects, strength members of the cable segments 110, 120 can be secured to the splice enclosure arrangement 140 to provide strain relief protection to the cable 100. A protection layer 150 surrounds the spice enclosure arrangement 140 and the first ends 111, 121 of the cable segments 110, 120 to protect any exposed optical fibers from dust, dirt, or other contaminants.

Figure 2:
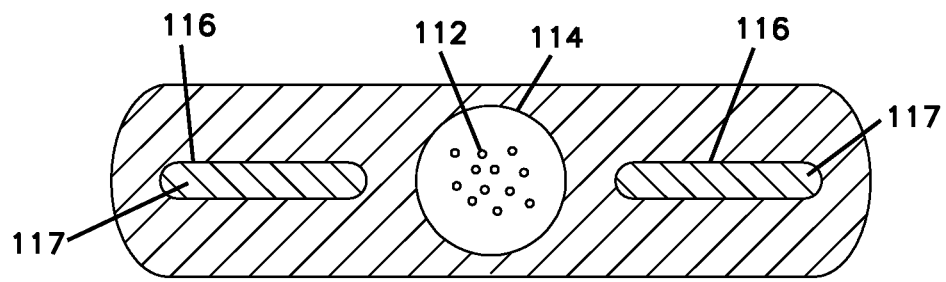
FIG. 2 shows one example implementation of a first cable segment suitable to be spliced to a second cable segment in accordance with aspects of the disclosure.

FIG. 2 shows one example implementation of a first cable segment 110 suitable to be spliced to a second cable segment 120. The example first cable segment 110 includes an outer jacket 118 defining at least a first passage 114 for containing at least one optical fiber 112 and at least a second passage 116 for containing at least one strength member 117. In one implementation, the outer jacket 118 includes a central passage 114 for containing optical fibers 112 and two passages 116 on opposite sides of the central passage 114 for containing strength members 117. In other implementations, the first cable segment 110 can include greater or fewer strength members 117 enclosed within the jacket 118.

In accordance with some aspects, the first cable segment 110 has an elongated transverse cross-sectional profile (e.g., a flattened cross-sectional profile, an oblong cross-sectional profile, an obround cross-sectional profile, etc.) defined by the outer jacket 118. The major axis and the minor axis of the cross-sectional profile intersect perpendicularly at a lengthwise axis of the cable segment 110. The construction of the first cable segment 110 allows the cable segment 110 to be bent more easily along a plane P1 that coincides with the minor axis than along a plane that coincides with the major axis. Such a construction allows the first cable segment 110 to be readily used for applications in which drop cables are normally used and also allows the first cable segment 110 to be wrapped around a cable storage spool having a relatively small diameter without damaging the cable segment 110. Other implementations of the first cable segment 110 can have round, oval, or other transverse cross-sectional profiles, however.

In accordance with some aspects, the outer jacket 118 can be shaped through an extrusion process and can be made by any number of different types of polymeric materials. In certain embodiments, the outer jacket 118 can have a construction the resists post-extrusion shrinkage of the outer jacket 118. For example, the outer jacket 118 can include a shrinkage reduction material disposed within a polymeric base material (e.g., polyethylene). U.S. Pat. No. 7,379,642, which is hereby incorporated by reference in its entirety, describes an exemplary use of shrinkage reduction material within the base material of a fiber optic cable jacket.

In some implementations, the first passage 114 of the outer jacket 118 is sized to receive one or more of the bend insensitive fibers 112. The bend insensitive fibers 112 are preferably unbuffered and in certain embodiments have outer diameters in the range of 230-270 µm. In one implementation, the first passage 114 is sized to receive at least twelve of the bend insensitive fibers 112. When the fibers 112 are positioned within the first passage 114, it is preferred for the fibers 112 to occupy less than 60% of the total transverse cross-sectional area defined by the first passage 114. In some implementations, structures such water-swellable fibers, water-swellable tape, or water-swellable yarn can be provided within the passage 114 to prevent water from migrating along the first passage 114. In other implementations, water-blocking gel may be provided within the first passage 114.

In accordance with some implementations, the strength members 117 of the first cable segment 110 have a transverse cross-sectional profile that matches the transverse cross-sectional profile of the second passage 116. In one implementation, each strength members 117 has a width that is greater than a thickness of the strength member 117. In certain implementations, the strength members 117 are bonded to the outer jacket 118. For example, the bonding between the strength members 117 and the outer jacket 118 can be chemical bonding or thermal bonding.

Figure 3:
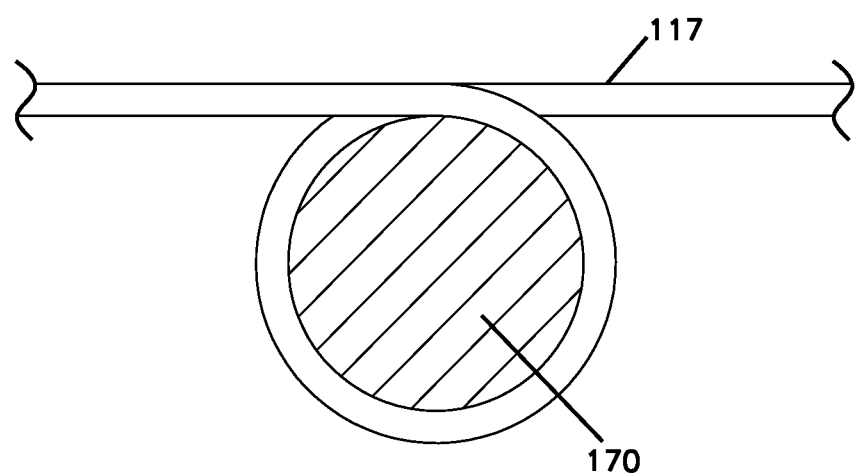
FIG. 3 shows the first cable segment of FIG. 2 being wound around a mandrel in accordance with aspects of the disclosure.

In accordance with some aspects, each strength members 117 has a construction that is highly flexible and highly strong in tension. For example, in certain implementations, the strength members 117 provide the vast majority of the tensile load capacity of the first cable segment 110. In certain implementations, each strength member 117 also has a flexibility that allows the strength member 117 to be wrapped at least 360 degrees around a mandrel 170 (see FIG. 3) having a 10 millimeter outer diameter for one hour without undergoing/experiencing meaningful deterioration/degradation of the tensile strength properties of the strength member 117.

In certain embodiments, the strength member 107 is formed by a generally flat layer of reinforcing elements (e.g., fibers or yarns such as aramid fibers or yarns) embedded or otherwise integrated within a binder to form a flat reinforcing structure (e.g., a structure such as a sheet-like structure, a film-like structure, or a tape-like structure). In one example embodiment, the binder is a polymeric material such ethylene acetate acrylite (e.g., UV-cured, etc.), silicon (e.g., RTV, etc.), polyester films (e.g., biaxially oriented polyethylene terephthalate polyester film, etc.), and polyisobutylene. In other example instances, the binder may be a matrix material, an adhesive material, a finish material, or another type of material that binds, couples or otherwise mechanically links together reinforcing elements.

In other embodiments, the strength member 107 can have a glass reinforced polymer (GRP) construction. The glass reinforced polymer can include a polymer base material reinforced by a plurality of glass fibers such as E-glass, S-glass or other types of glass fiber. The polymer used in the glass reinforced polymer is preferably relatively soft and flexible after curing. For example, in one embodiment, the polymer has a Shore A hardness less than 50 after curing. In other embodiments, the polymer has a Shore A hardness less than 46 after curing. In certain other embodiments, the polymer has a Shore A hardness in the range of about 34-46.

Additional details regarding the example first cable segment 110 can be found in U.S. application Ser. No. 12/607,748, filed Oct. 28, 2009, and titled "Flat Drop Cable," the disclosure of which is hereby incorporated herein by reference in its entirety. Of course, other types of fiber optic cables having different tensile strength and flexibility characteristics can be used as the first cable segment.

Figure 4:
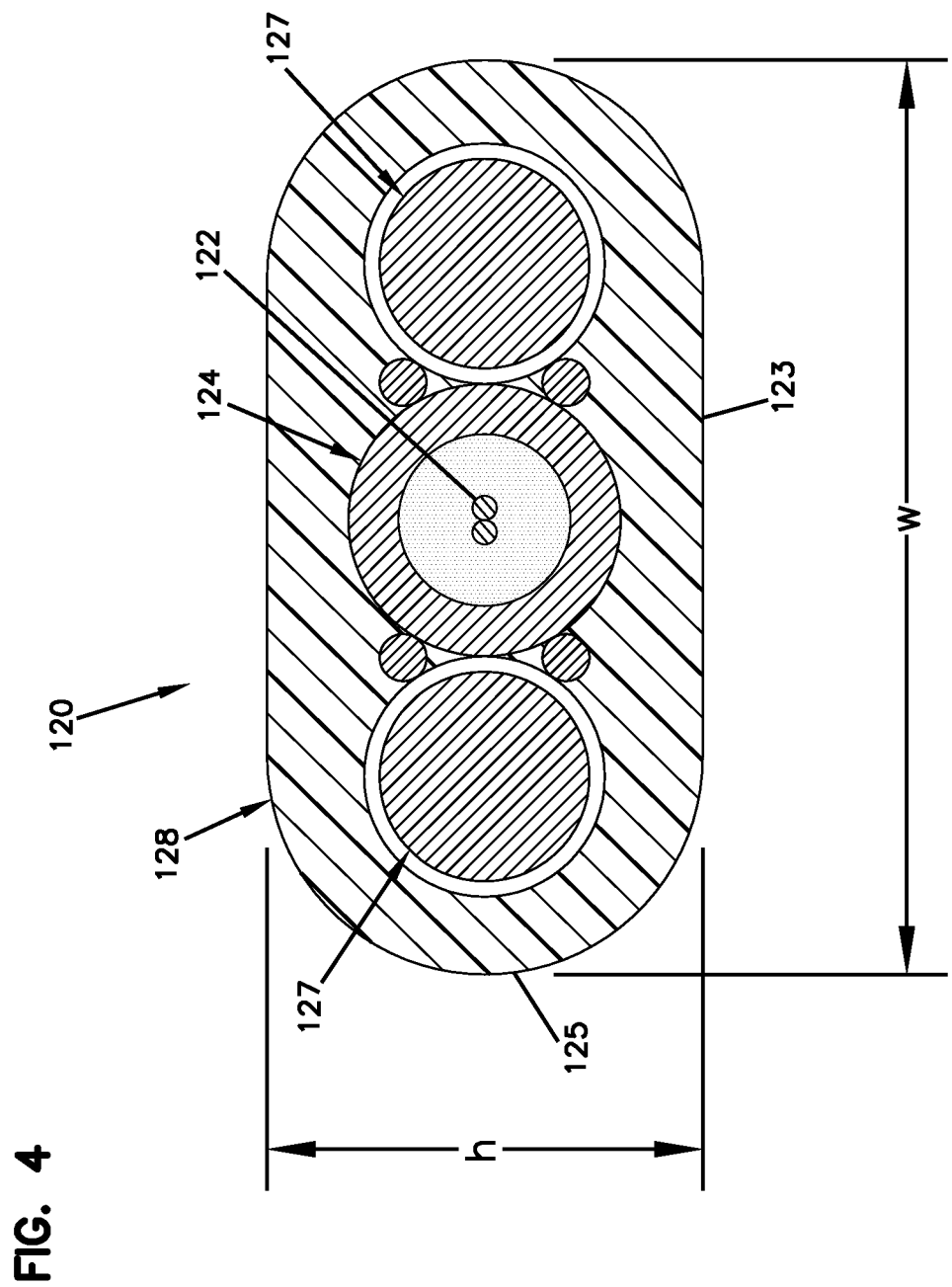
FIG. 4 shows one example implementation of a second cable segment suitable to be spliced to the first cable segment in accordance with aspects of the disclosure.

FIG. 4 shows one example implementation of a second cable segment 120 suitable to be spliced to the first cable segment 110. The second cable segment 120 includes a cable jacket 128 enclosing at least one optical fiber 122. In one implementation, the optical fiber 122 is loosely received within a buffer tube 124. Preferably, buffer tube 124 includes at least one waterblocking substance, for example, a gel, grease, and/or a superabsorbent material. In some implementations, the second fiber cable segment 120 has a generally flat configuration. For example, the jacket 128 can define generally arcuate sections 125 and generally flat-sided sections 123. Other implementations of the second cable segment 120, however, can have round, oval, or other transverse cross-sectional profiles.

The second cable segment 120 also includes at least one strength component 127. In the example shown in FIG. 4, the optical transmission component 122 is disposed between two strength components 127. In other implementations, however, greater or fewer strength components 127 can be used. In accordance with certain aspects, the strength components 127 have both tensile and anti-buckling characteristics. In some implementations, the strength components 127 are solid, rod-like members formed of dielectric materials. For example, in one implementation, a strength component 127 includes glass filaments impregnated and bonded together with a resin to define a single unit having a tensile strength rating of about 500 Newtons @ 0.5% strain.

In some implementations, the cable 120 can include one or more tensile strength members 126 (e.g., a group of fiberglass strands). In other implementations, however, the strength components 127 provide the tensile strength of the second cable segment 120. Additional details regarding the example second cable segment 120 can be found in U.S. Pat. No. 6,542,674, titled "Fiber Optic Cables with Strength Members," and issued Apr. 1, 2003 to Corning Cable Systems, LLC, the disclosure of which is hereby incorporated by reference herein. Of course, other types of fiber optic cables having different tensile strength and flexibility characteristics can be used as the second cable segment.

In some implementations, the connector arrangement 130 terminating the second end 129 of the second cable segment 120 is a plug-type connector. In one implementation, the plug-type connector is configured to interface directly with a receptacle-type connector. In another implementation, the plug-type connector is configured to interface with another plug-type connector at an adapter. In other implementations, the connector arrangement 130 terminating the second end 129 of the second cable segment 120 is a receptacle-type connector.

Figure 5:
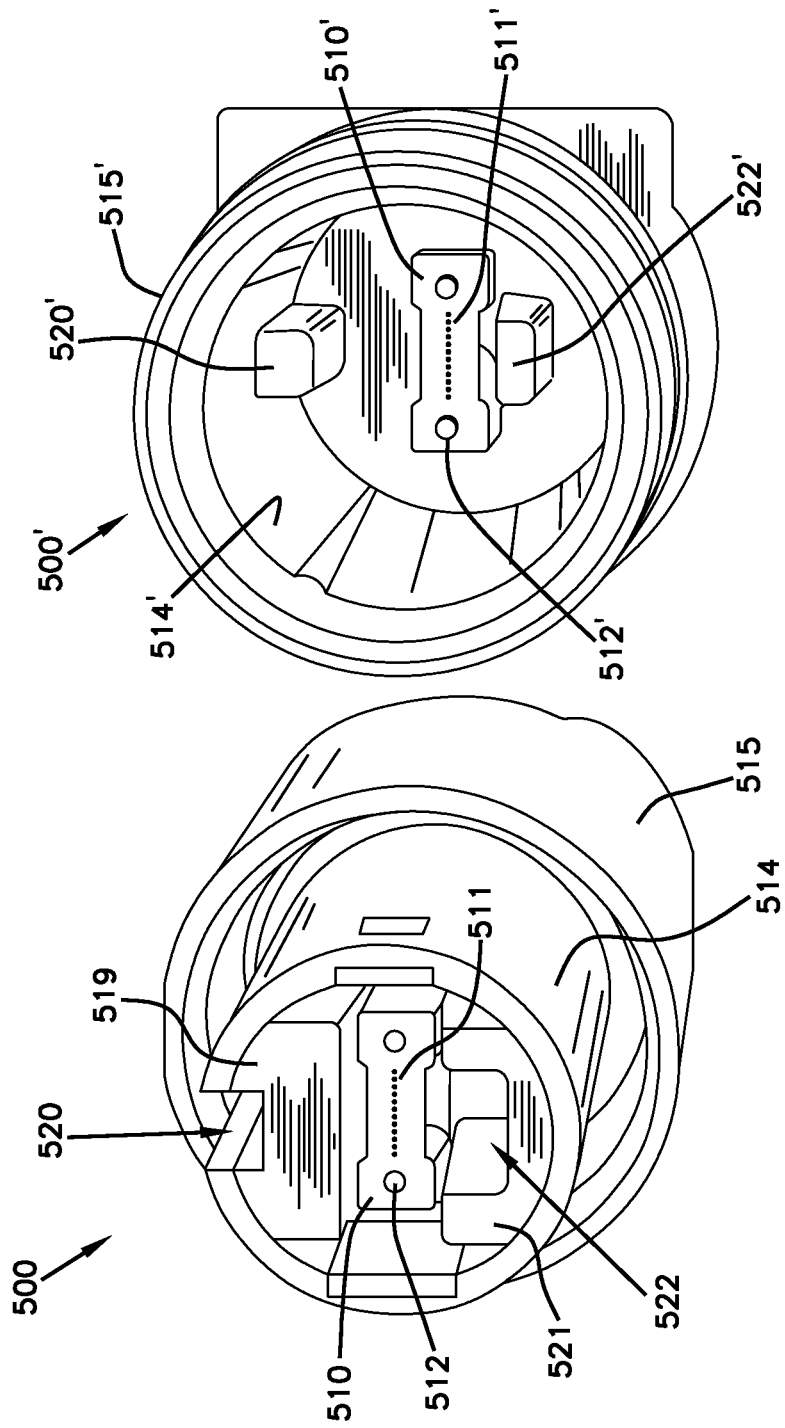
FIGS. 5A and 5B provide one example set of connectors suitable for use with the connector arrangement terminating one end of the second cable segment in accordance with aspects of the disclosure.

FIGS. 5A and 5B provide one example set of connectors suitable for use with the connector arrangement 130. An example plug-type connector 500 is shown in FIG. 5A and an example receptacle-type connector 500' is shown in FIG. 5B. The first example connector 500 is sized and shaped to interface with the second example connector 500' without an adapter. In some implementations, the plug 500 and receptacle 500' are threaded together.

The plug-type connector 500 includes a ferrule 510 at which one or more optical fibers 511 are terminated. In some implementations, the ferrule 510 terminates multiple (e.g., two, eight, twelve, sixteen, twenty-four, forty-eight, seventy-two, etc.) optical fibers 511. In the example shown, the ferrule 510 terminates twelve optical fibers 511. The ferrule 510 defines keying openings 512 at either side of the optical fibers 511. The ferrule 510 is enclosed within a shroud 514 that defines keying and latching features. The shroud 514 and ferrule 510 extend forwardly of a connector base 515. The shroud 514 extends beyond the ferrule 510. The shroud 514 defines a first keying channel 520 and a second keying channel 522 above and below the ferrule 510, respectively.

The receptacle-type connector 500' also includes a ferrule 510' at which one or more optical fibers 511' are terminated. In some implementations, the ferrule 510' terminates multiple (e.g., two, eight, twelve, sixteen, twenty-four, forty-eight, seventy-two, etc.) optical fibers 511. In the example shown, the ferrule 510' terminates twelve optical fibers 511'. The ferrule 510' defines keying projections 512' at either side of the optical fibers 511'. The projections 512' are configured to be inserted into the keying openings 512 of the plug ferrule 510 to facilitate alignment of the ferrules 510, 510'.

The receptacle ferrule 510' is enclosed within a connector body 515' that defines a cavity 514' that is sized and shaped to receive the shroud 514 of the plug 500. The connector base 515' is configured to surround the shroud 514. In some implementations, the connector base 515' latches, screws, or otherwise secures to the shroud 514 to retain the plug 500 and the receptacle 500' in a mated configuration. A first keying projection 520' and a second keying projection 522' are positioned within the cavity 514' above and below the ferrule 510', respectively. In some implementations, the first and second keying projections 520', 522' have different shapes and/or sizes to facilitate finding the correct orientation of the plug and receptacle.

In some implementations, the connectors 500, 500' are hardened fiber optic connectors. For example, hardened connectors 500, 500' may include an environmental seal when interfaced together to protect the ferrules 511, 511' from dust, dirt, or other contaminants. In some implementations, an environmental dust cap can be mounted to the connectors 500, 500' to protect the ferrules 511, 511' prior to deployment of the FDH 200 or prior to connection of the connectors 500, 500'.

Additional details regarding the example connector plug 500 and receptacle 500' can be found in U.S. Pat. No. 7,264,402 to Theuerkorn et al., issued Sep. 4, 2007, and titled Multi-fiber optic receptacle and plug assembly, the disclosure of which is hereby incorporated by reference herein.

Figure 6:
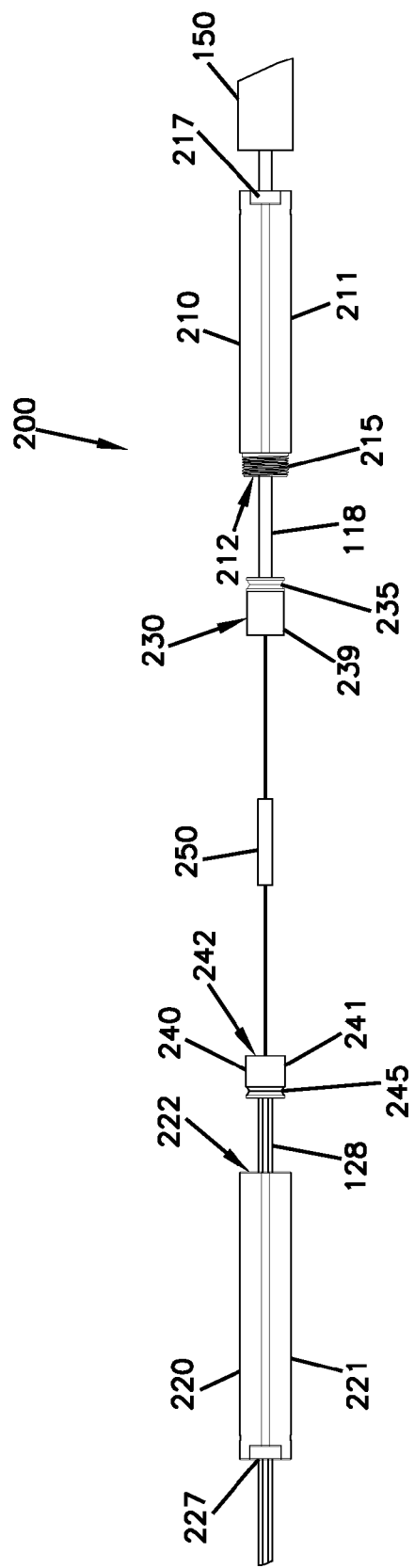
FIG. 6 shows one example implementation of a splice enclosure arrangement suitable for use in coupling together the first ends of the first and second cable segments in accordance with aspects of the disclosure.

Referring to FIGS. 6-29, one example system and process for splicing together the first and second cable segments 110, 120 are shown. FIG. 6 shows one example implementation 200 of a splice enclosure arrangement 140 (FIG. 1) suitable for use in coupling together the first ends 111, 121 of the first and second cable segments 110, 120. The example enclosure arrangement 200 includes a first enclosure assembly 210 (see FIG. 8) and a second enclosure assembly 220 (see FIG. 9) that are configured to attach together to enclose a splice sleeve 250 at a splice location.

The first enclosure assembly 210 includes an enclosure body 211 defining a generally hollow interior 212 having an open end 213 and a closed end 214. The first enclosure assembly 210 also includes a first cable retention member 230 that is sized and shaped to fit within the first enclosure body 211. In certain implementations, the first cable retention member 230 is retained at the closed end 214 of the first enclosure body 211. Strength members 117 of the first cable segment 110 can be secured to the first cable retention member 230 to inhibit damage to the splice from pull on the first cable segment 110.

The second enclosure assembly 220 includes a body 221 defining a generally hollow interior 222 having an open end 223 and a closed end 224. The second enclosure assembly 220 also includes a second cable retention member 240 that is sized and shaped to fit within the second enclosure body 221. In certain implementations, the second cable retention member 240 is retained at the closed end 224 of the second enclosure body 221. Strength components 127 of the second cable segment 120 can be secured to the second cable retention member 240 to inhibit damage to the splice from pull on the second cable segment 120.

The first enclosure body 211 and the second enclosure body 221 are configured to be secured together. The first end 213 of the first enclosure body 211 defines a connection section 215 and the first end 223 of the second enclosure body 221 defines a second connection section 225. For example, in one implementation, the first end 213 of the first enclosure body 211 can define a threaded connection region 215 on an exterior surface of the first body 211 and the first end 223 of the second enclosure body 221 can define a threaded connection region 225 on an inner surface of the body 221 that is configured to engage the threaded surface 215 on the first enclosure body 211.

Figure 7:
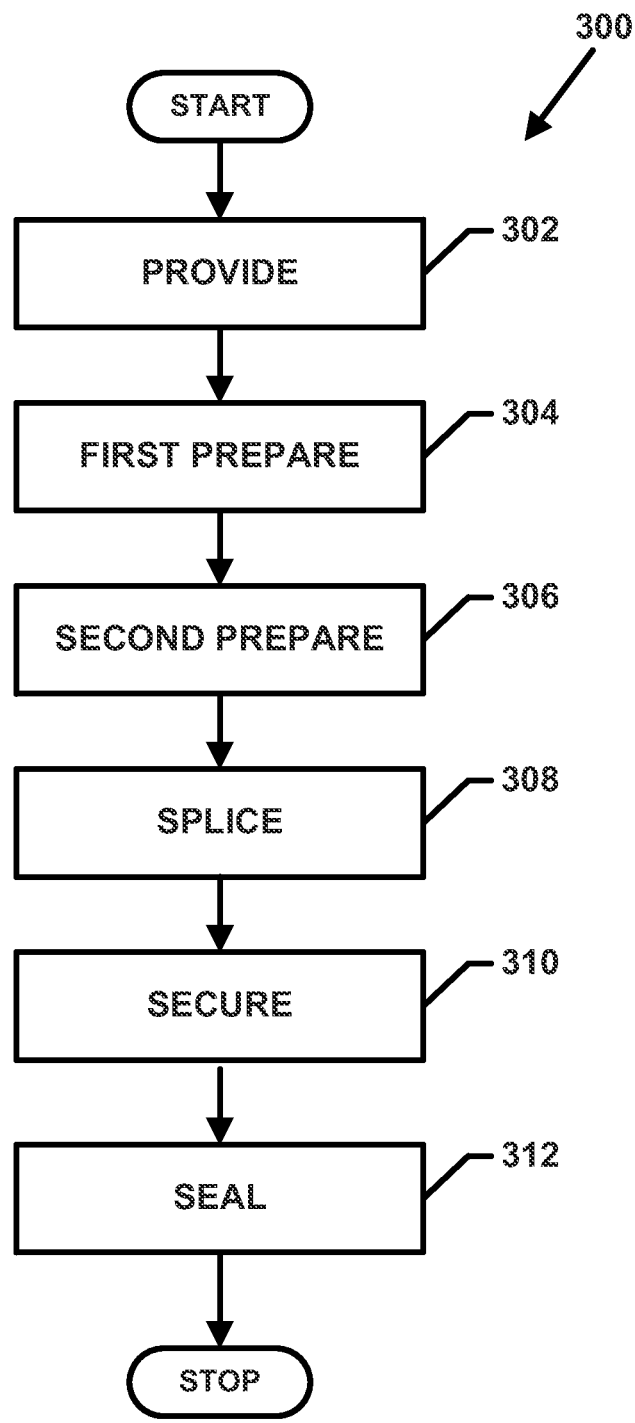
FIG. 7 shows a flowchart illustrating an example splicing process by which the second cable segment can be spliced to the first cable segment using the example enclosure arrangement of FIG. 6 in accordance with aspects of the disclosure.

FIG. 7 shows a flowchart illustrating an example splicing process 300 by which the second cable segment 120 can be spliced to the first cable segment 110 using the example enclosure arrangement 200. It should be appreciated that the operation illustrated in the example of FIG. 7 is provided for explanatory purposes and is not intended to represent a sole way of practicing the techniques of this disclosure. Rather, the techniques of this disclosure may be practiced in many ways.

In the splicing process 300 of FIG. 7, a technician is initially provided 302 with two cable segments, such as the example first and second cable segments 110, 120 described above, and a splice enclosure arrangement, such as the enclosure arrangement 200 shown in FIG. 6. The technician prepares 304 the first cable segment 110 and also prepares 306 the second cable segment 120 as will be described in more detail herein. For example, the technician can mount the first and second enclosure assemblies 210, 220 onto the first ends 111, 121 of the first and second cable assemblies 110, 120.

The technician splices 308 together the optical fibers 112, 122 of the prepared first and second cable segments 110, 120. For example, in some implementations, the technician can splice together two ribbonized sets of fibers 112, 122. In certain implementations, the technician mounts a splice sleeve 250 onto one of the cable segments 110, 120 prior to splicing 308 the fibers. When the fibers 112, 122 have been fused together, the technician positions the splice sleeve 250 over the splice.

The technician secures 310 the splice enclosure arrangement 200 to the cable 100 at the splice location. For example, the technician connects the first and second cable segments 110, 120 to the first and second cable retention members 230, 240, respectively. The technician also attaches the first and second enclosure assemblies 210, 220 to each other (e.g., see FIG. 8) to enclose and protect the splice location. The technician seals 312 the splice enclosure 200 and the stripped ends of the cable segments 110, 120 at the splice location (see FIG. 9). For example, in one implementation, the technician can seal the cable 100 using a heat-shrink tube 150. In another implementation, the technician can overmold the cable 100 at the splice location.

Figure 10:
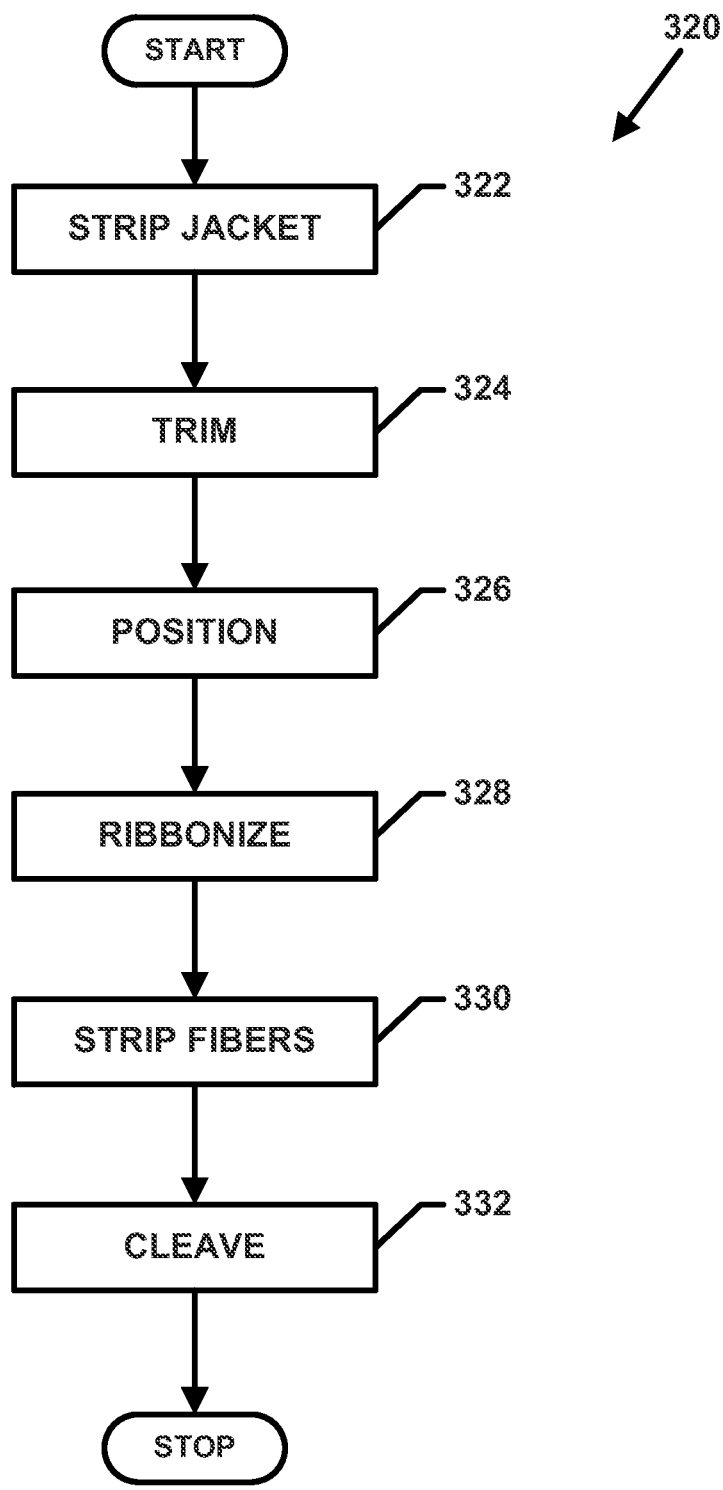
FIG. 10 provides one example first preparation process by which the technician can implement preparing the first cable segment for splicing in accordance with aspects of the disclosure.
Figure 11:
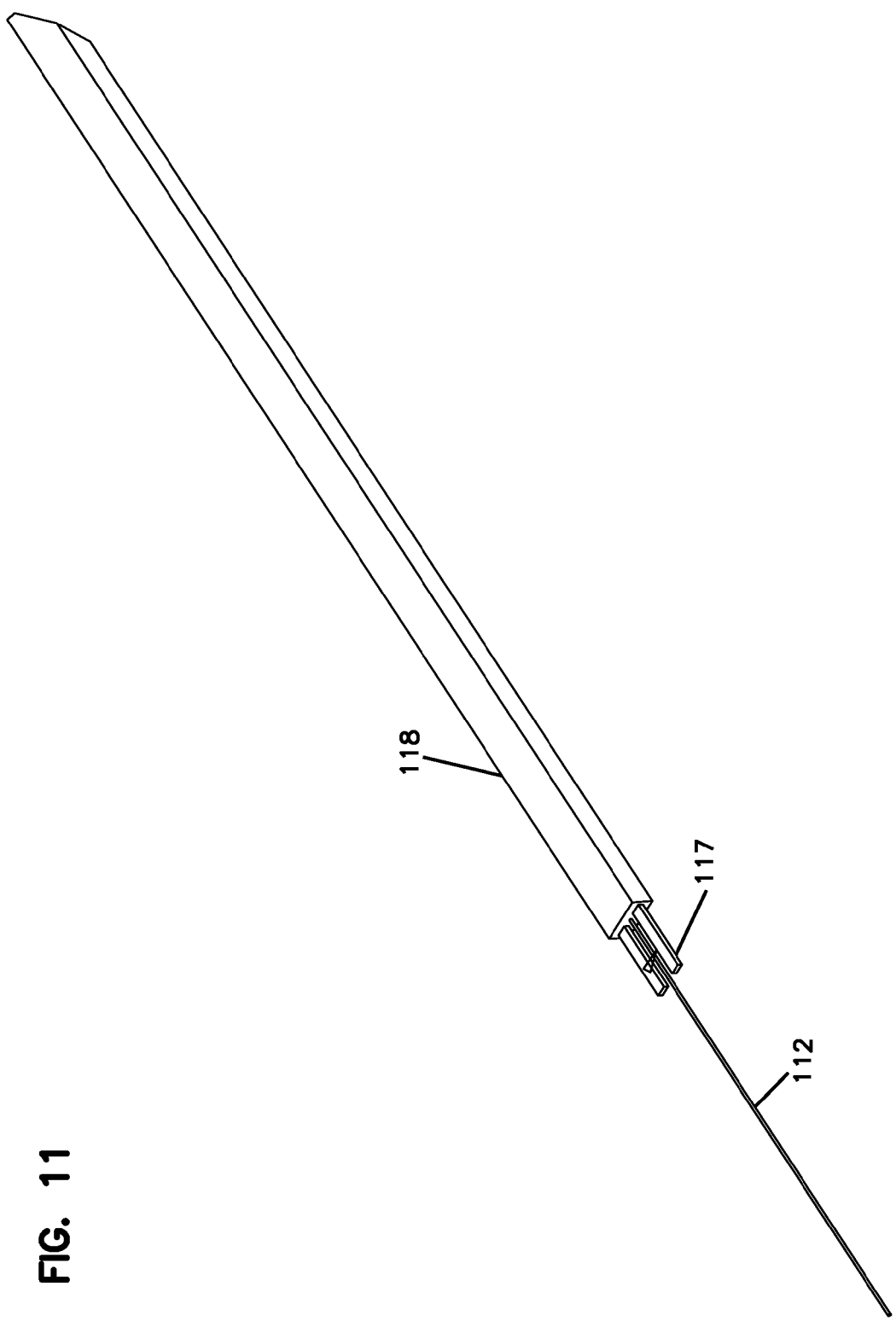
FIGS. 11 and 12 illustrate the steps of the first preparation process of FIG. 10 in accordance with aspects of the disclosure.
Figure 12:
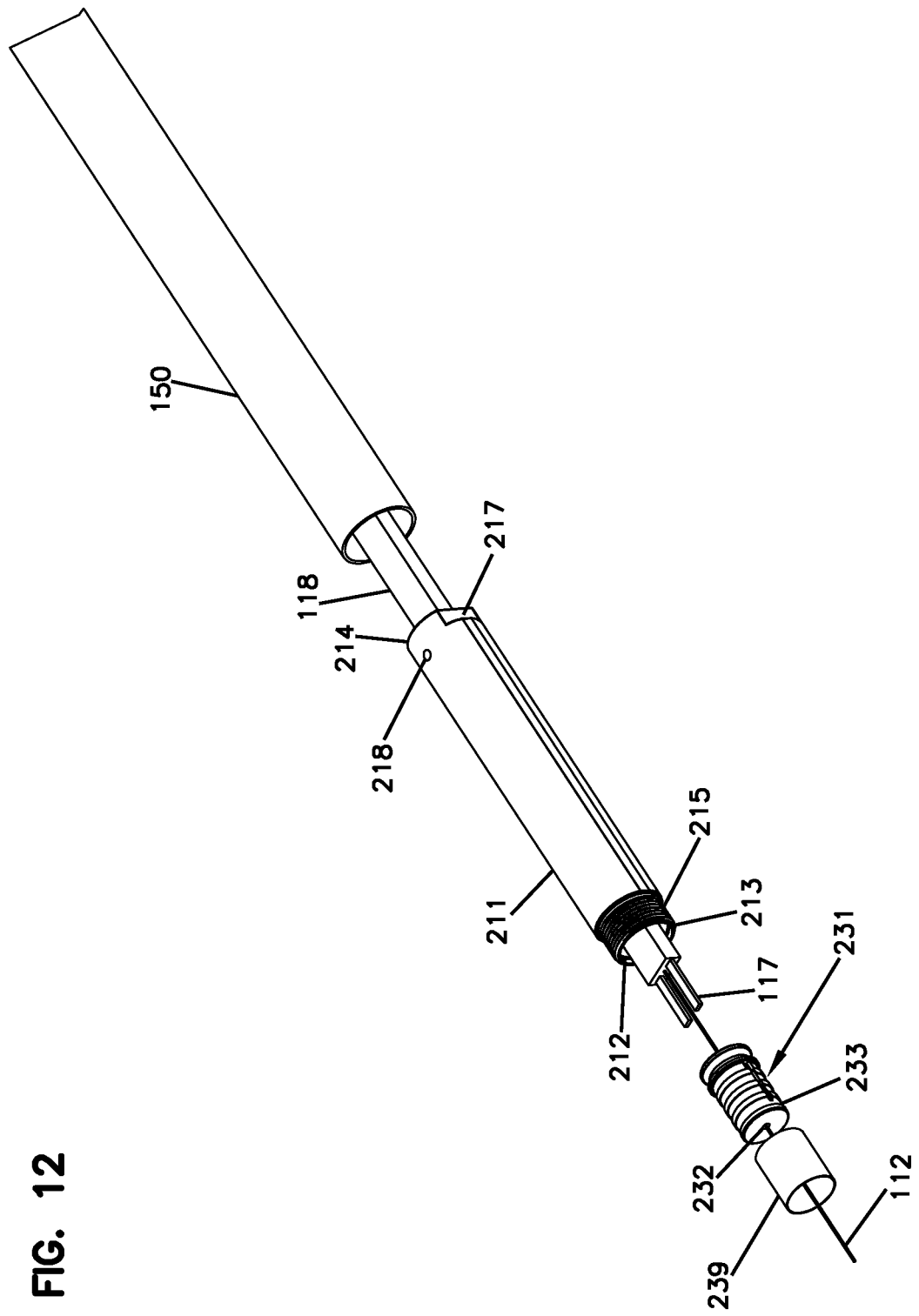

FIG. 10 provides one example first preparation process 320 by which the technician can implement preparing 304 the first cable segment 110 for splicing. FIGS. 11 and 12 illustrate the steps of the first preparation process 320. In the example first preparation process 320, the technician removes 322 the outer jacket 118 to expose the optical fibers 112 and the strength members 117. The technician trims 324 the strength members 117 to an appropriate length (see FIG. 11).

The technician positions 326 the first enclosure assembly 210 on the first cable segment 110. For example, the technician can slide the first enclosure body over the first cable segment 110 so that the optical fibers 112 and trimmed strength members 117 extend through the first end 213 of the first enclosure body 211. The first cable retention member 230 also can be threaded onto the optical fibers 112 of the first cable segment 110 (see FIG. 12). In certain implementations, the technician also can slide a heat shrink tube 150 over the first cable segment 110 to be used subsequently in sealing the splice location.

The technician prepares the optical fibers 112 of the first cable segment 110 for splicing to the optical fibers 122 of the second cable segment 120. For example, in one implementation, the technician ribbonizes 350 the fibers, strips 352 off any outer coating, and cuts 354 the terminal ends of the optical fibers 112 of the first cable segment 110. In other implementation, however, the technician may otherwise prepare the second cable segment 120. For example, in one implementation, the fibers 112 can be spliced without being ribbonized.

Figure 13:
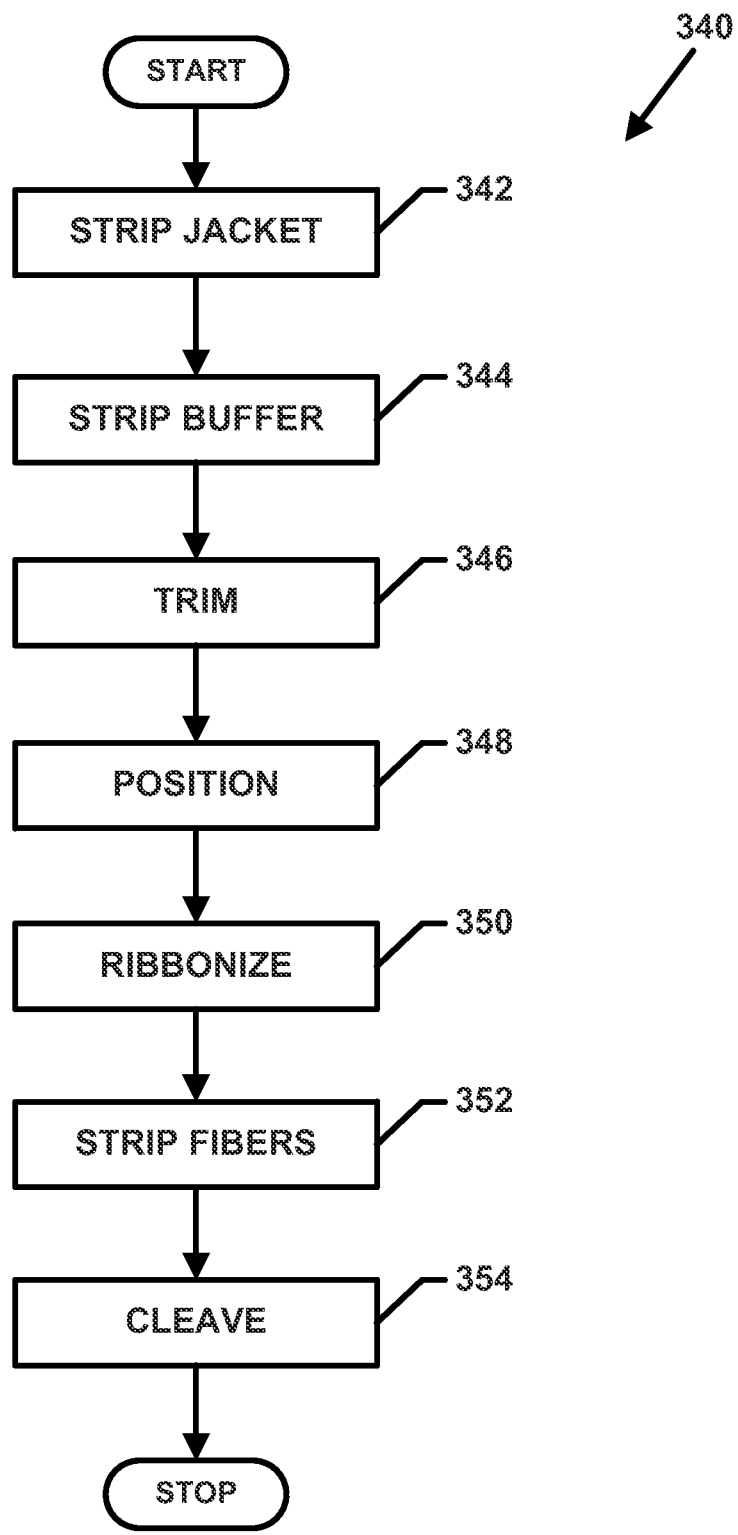
FIG. 13 provides one example second preparation process by which the technician can implement preparing the second cable segment for splicing in accordance with aspects of the disclosure.
Figure 14:
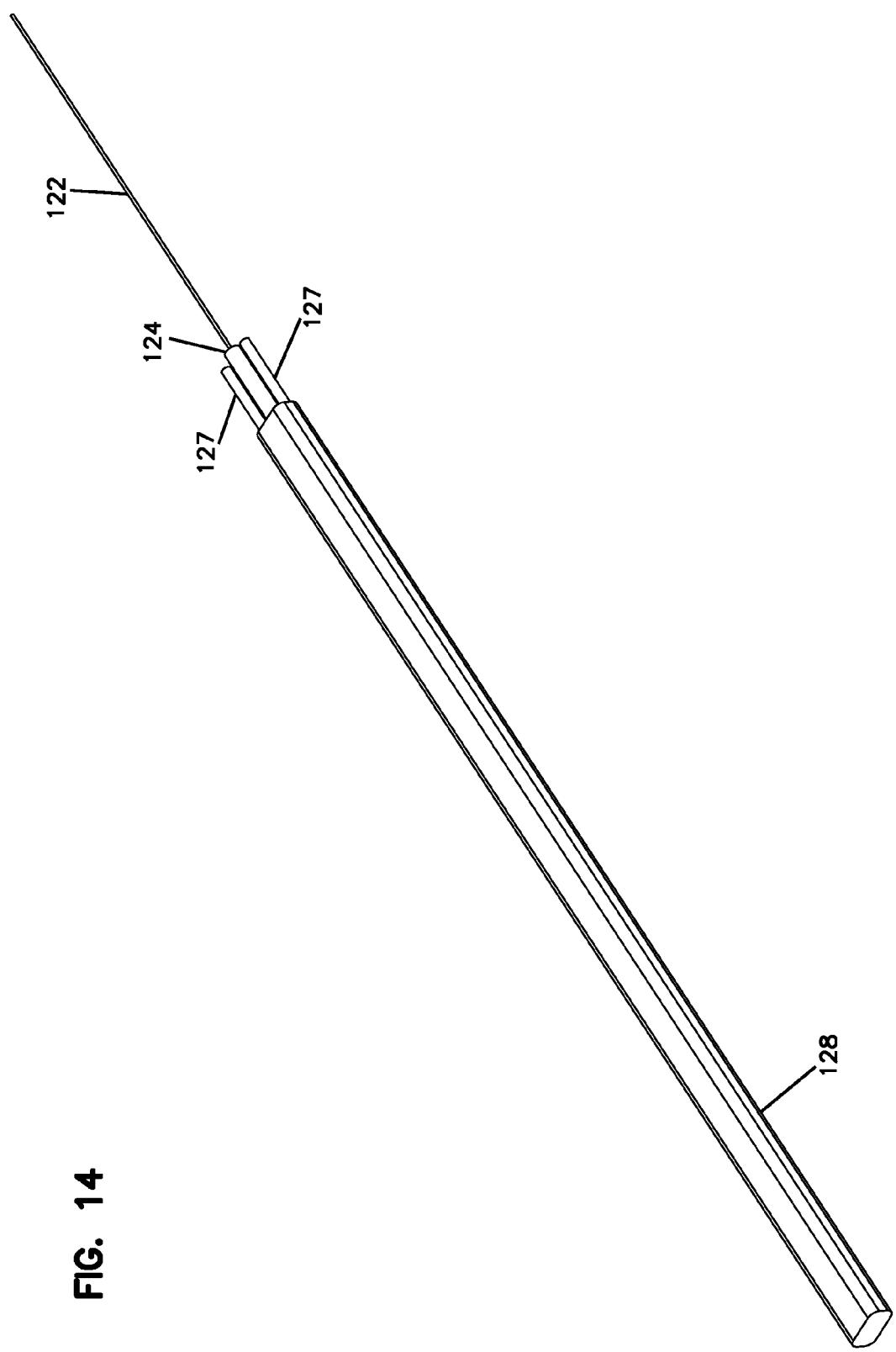
FIGS. 14 and 15 illustrate the steps of the second preparation process of FIG. 13 in accordance with aspects of the disclosure.
Figure 15:
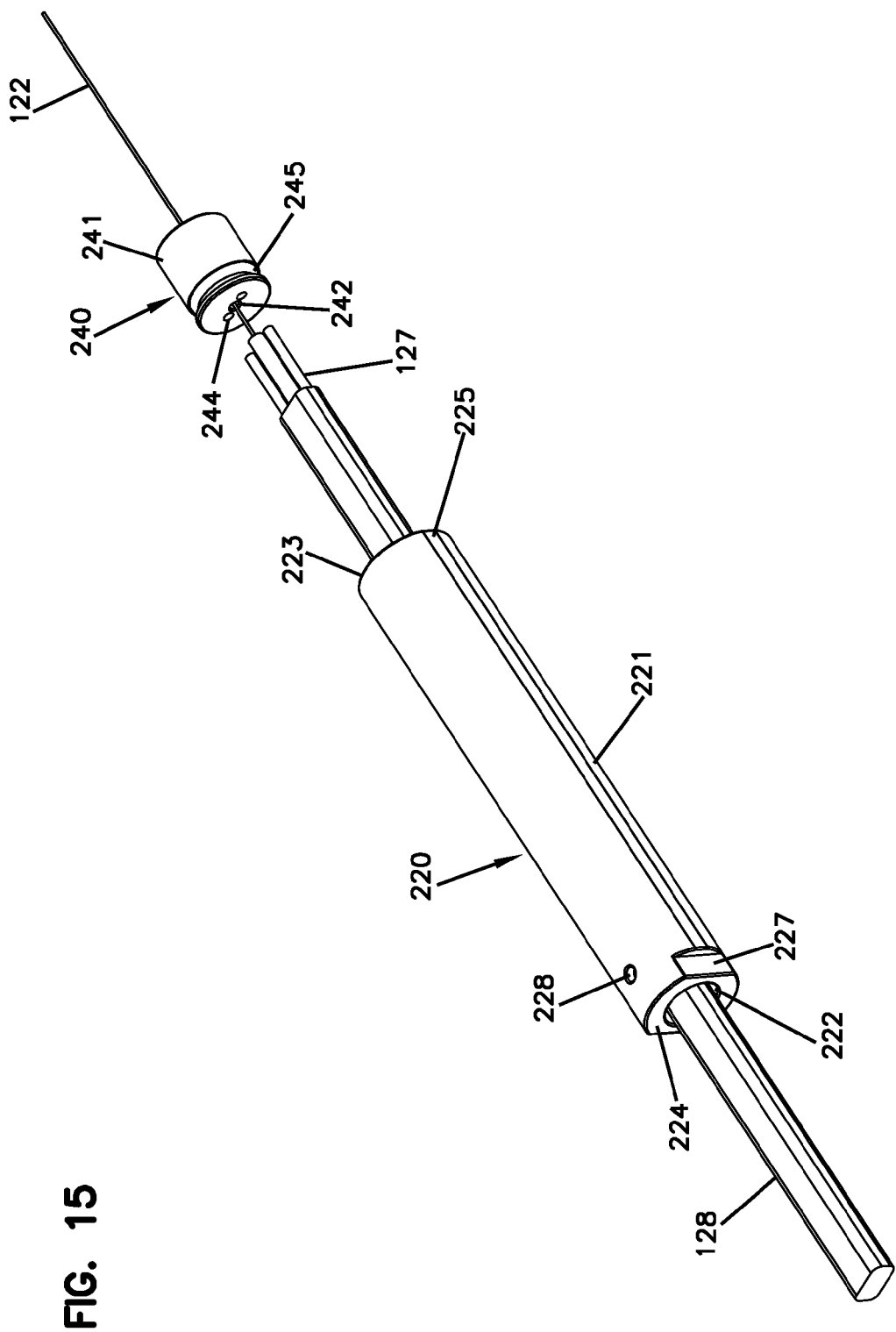

FIG. 13 provides one example second preparation process 340 by which the technician can implement preparing 306 the second cable segment 120 for splicing. FIGS. 14 and 15 illustrate the steps of the second preparation process 340. In the example second preparation process 340, the technician removes 342 the outer jacket 128 of the second cable segment 120 to expose the buffer tube 124 and the strength components 127. The technician also strips 344 the buffer tube 124 to expose the optical fibers 122. The technician trims 346 the strength components 127 to an appropriate length (see FIG. 14).

The technician positions 348 the second enclosure assembly 220 on the second cable segment 120. For example, the technician can slide the second enclosure body 221 over the second cable segment 120 so that the optical fibers 122 and trimmed strength components 127 extend through the first end 223 of the second enclosure body 221. The second cable retention member 240 also can be threaded onto the optical fibers 122 of the second cable segment 120 (see FIG. 15).

The technician prepares the optical fibers 122 of the second cable segment 120 for splicing to the optical fibers 112 of the first cable segment 110. For example, in one implementation, the technician ribbonizes 350 the fibers, strips 352 off any outer coating, and cuts 354 the terminal ends of the optical fibers 122 of the second cable segment 120 to provide a fusion-ready surface. In other implementation, however, the technician may otherwise prepare the second cable segment 120. For example, in one implementation, the fibers 112 can be spliced without being ribbonized.

Additional details regarding preparation of optical fiber cables for splicing and splicing techniques can be found in U.S. application Ser. No. 12/548,600, filed Aug. 27, 2009, titled "Splice of Fiber Optic Cables," now published as U.S. Publication No. 2010/0086266, the disclosure of which is hereby incorporated by reference herein in its entirety.

Figure 16:
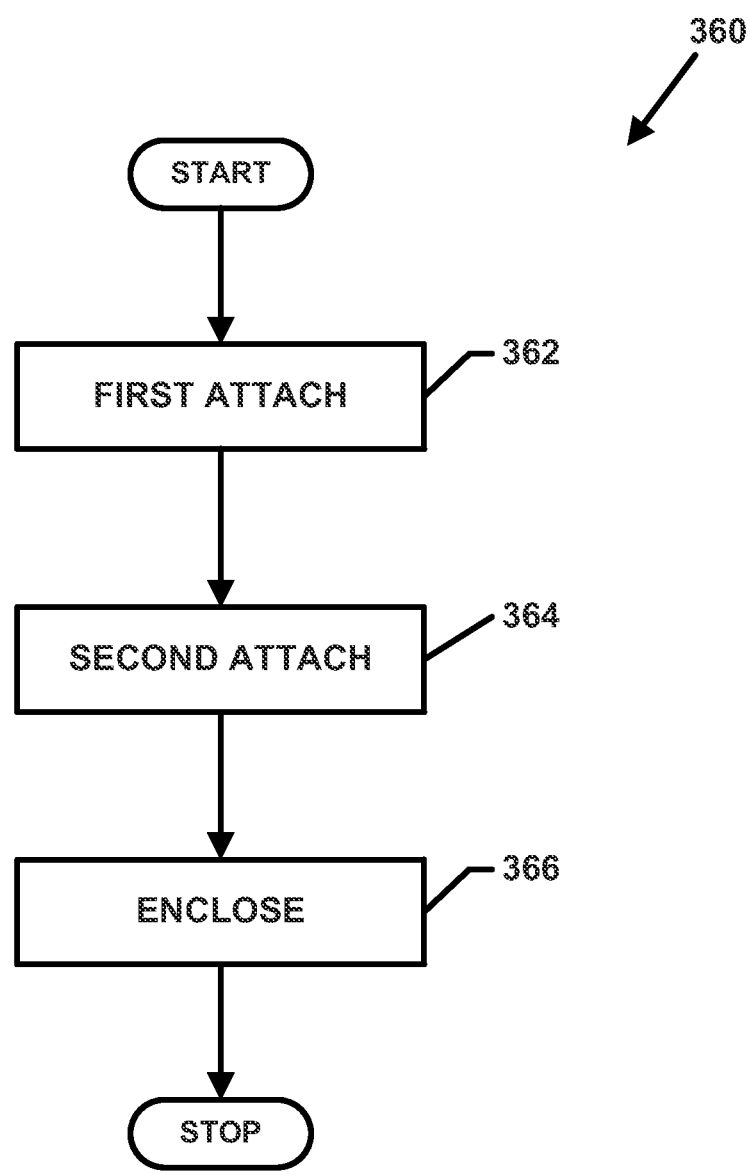
FIG. 16 provides one example mounting process by which the technician can implement securing the enclosure arrangement of FIG. 6 to the cable at the splice location in accordance with aspects of the disclosure.
Figure 17:
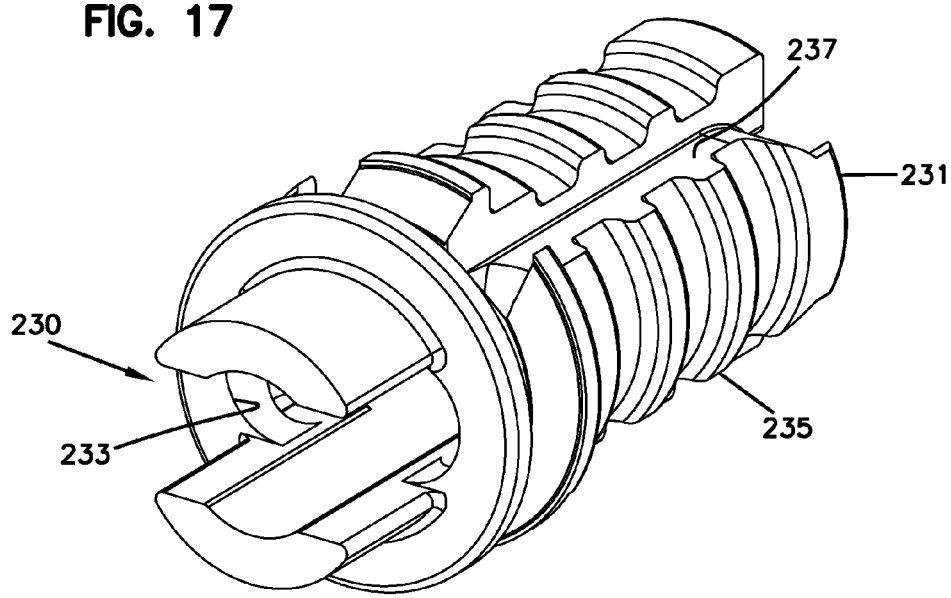
FIGS. 17-23 show one example embodiment of a cable retention member suitable for use in implementing the attachment step of the mounting process of FIG. 16 in accordance with aspects of the disclosure.
Figure 18:
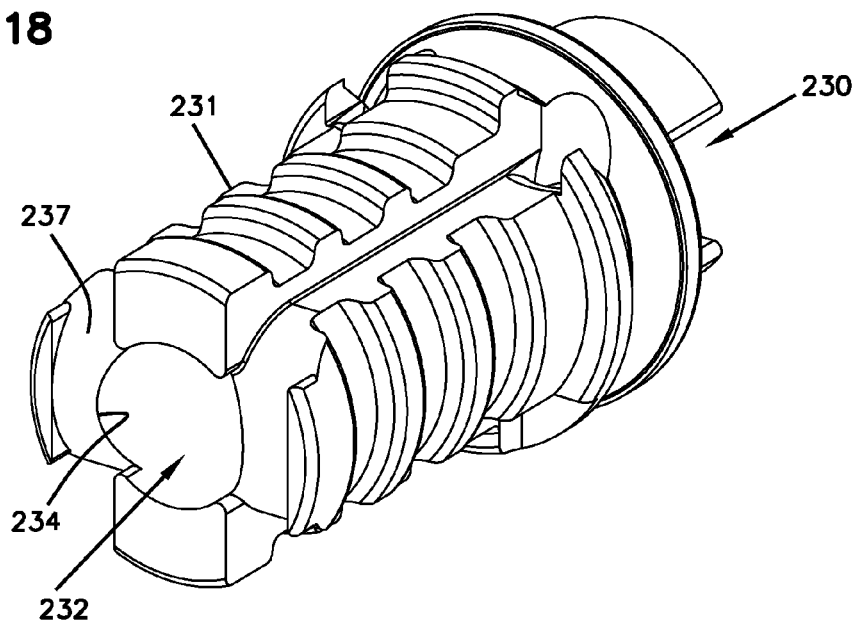
Figure 21:
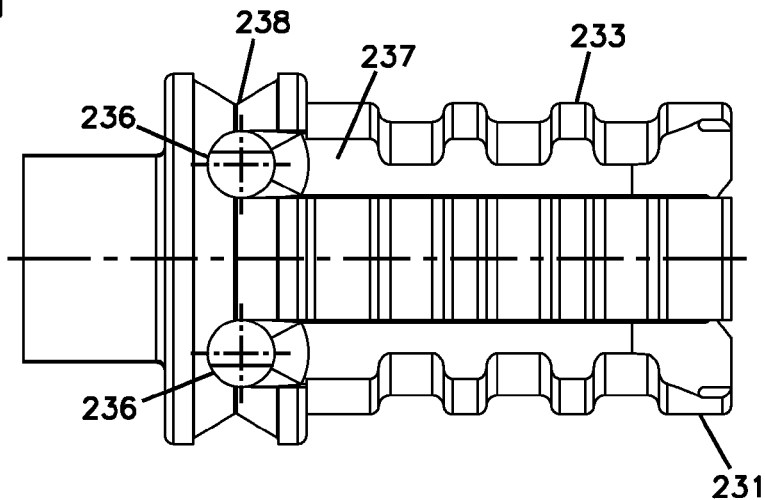
Figure 20:
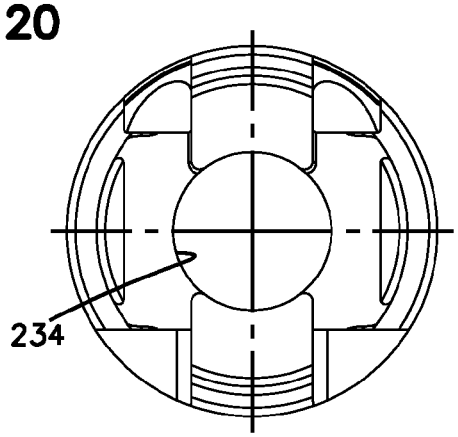
Figure 19:
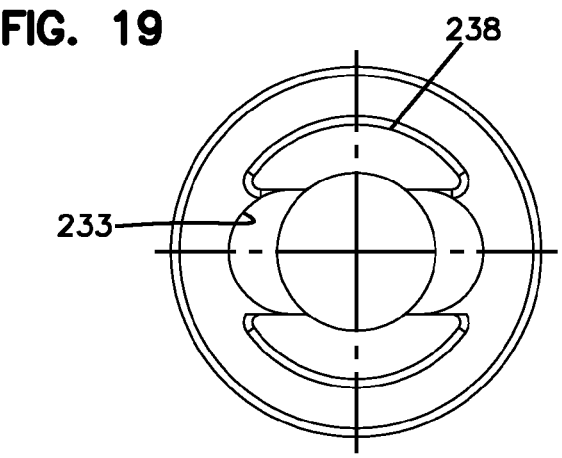

FIG. 16 provides one example mounting process 360 by which the technician can implement securing 310 the enclosure arrangement 200 to the cable 100 at the splice location. The technician first attaches 362 the first cable retention member 230 to the first cable segment 110. For example, in one implementation, the technician can crimp the strength members 117 of the first cable segment 110 to the cable retention member 230.

FIGS. 17-23 show one example embodiment of a cable retention member 230 suitable for use in implementing the attachment step 362 of the mounting process 360. In accordance with some aspects, the first cable retention member 230 includes a crimp body 231 and a crimp sleeve 239. The crimp body 231 defines a ribbed or threaded section 235. The crimp sleeve 239 mounts over the ribbed section 235 to crimp a portion of the first cable segment (e.g., the strength members 117) to the first cable retention member 230.

The crimp body 231 defines a through-opening 232 extending through the crimp body 231. The crimp body 231 has a first port 233 at a first end of the crimp body 231 and a second port 234 at a second end of the crimp body 231 to access the through-opening 232. The first port 233 is sufficiently sized to enable the optical fibers 112 and the strength members 117 of the first cable segment 110 to enter the through opening 232 of the crimp body 231 (see FIG. 19). The second port 234 is sized to enable only the optical fibers 112 to exit the crimp body 231 (see FIG. 20).

The crimp body 231 also defines at least one opening 236 at the first end of the crimp body 231 and at least one channel 237 extending along an exterior surface of the crimp body 231. For example, the channel 237 can extend axially from the opening 236 along the ribbed section 235 of the crimp body 231. In some implementations, one or more channels 237 also can extend along the second end of the crimp body 231 to connect pairs of the axial channels 237 (e.g., see FIGS. 17 and 18). In the example shown, the crimp body 231 defines two openings 236 and four channels 237. In other implementations, however, the crimp body 231 can define greater or fewer openings 236 and/or greater or fewer channels 237.

To secure the first cable segment 110 to the first cable retention member 230, the technician inserts the optical fibers 112 and the strength members 117 of the first cable segment 110 into the first port 233 of the crimp body 231. The technician threads the optical fibers 112 along the through-opening 232 and out the second port 234. The technician also routes the strength members 117 through the openings 236 and along the channels 237. The crimp sleeve 239 is slid over the ribbed section 235 of the crimp body 231 when the strength members 117 are positioned in the channels 237. The technician uses a tool to apply sufficient force to the crimp sleeve 239 to form the crimp.

Figure 22:
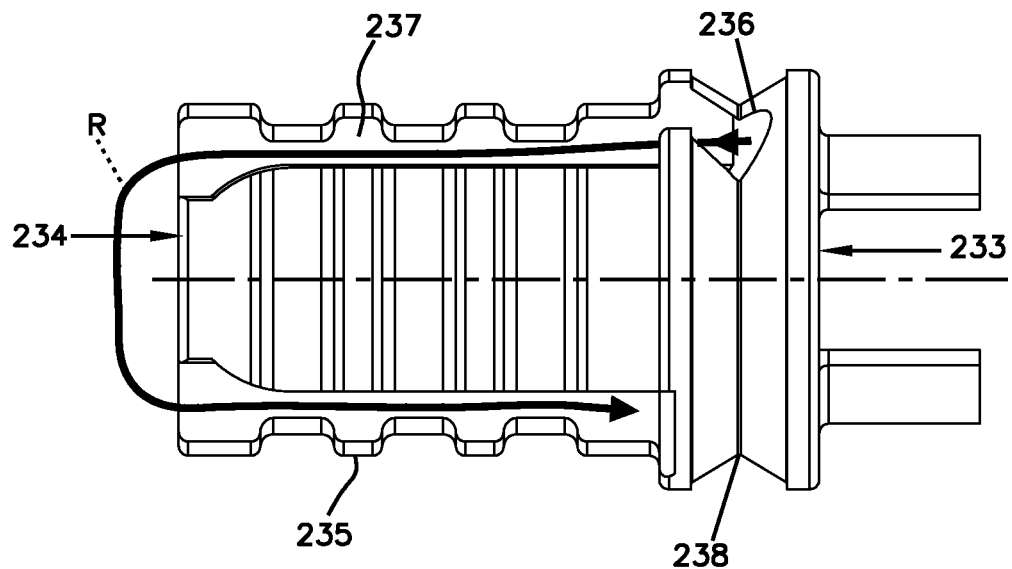
Figure 23:
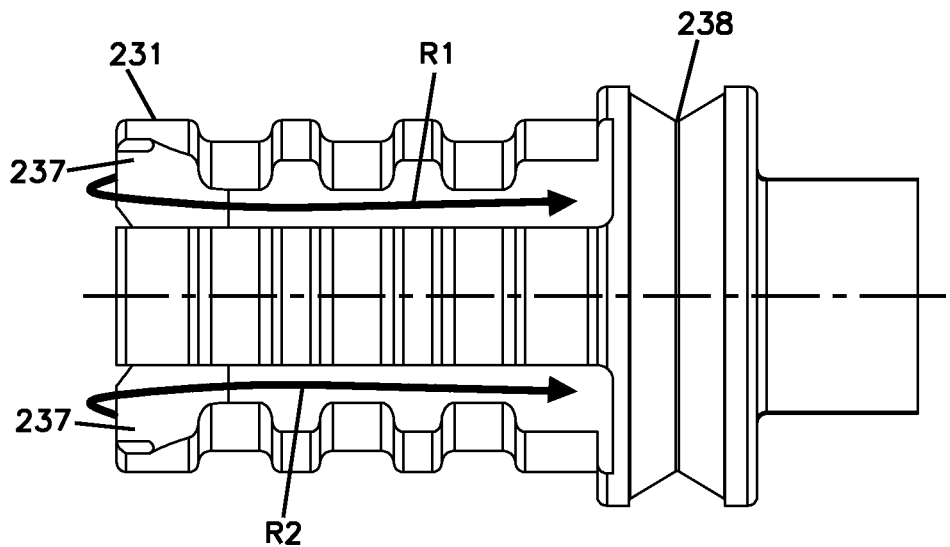
Figure 24:
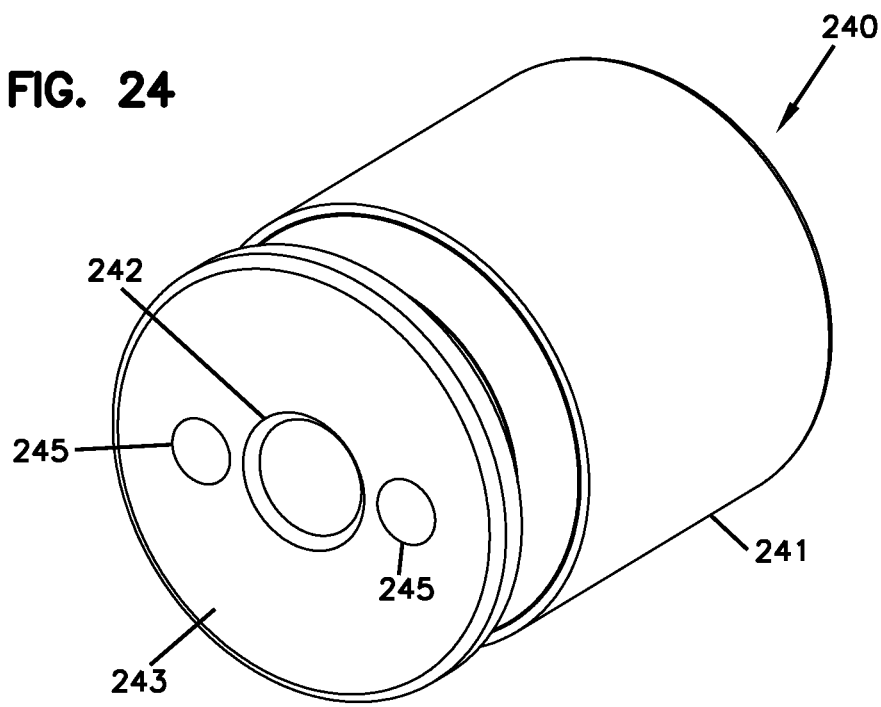
FIGS. 24-29 show one example embodiment of a second cable retention member suitable for use in implementing the attachment step of the mounting process of FIG. 16 in accordance with aspects of the disclosure.
Figure 25:
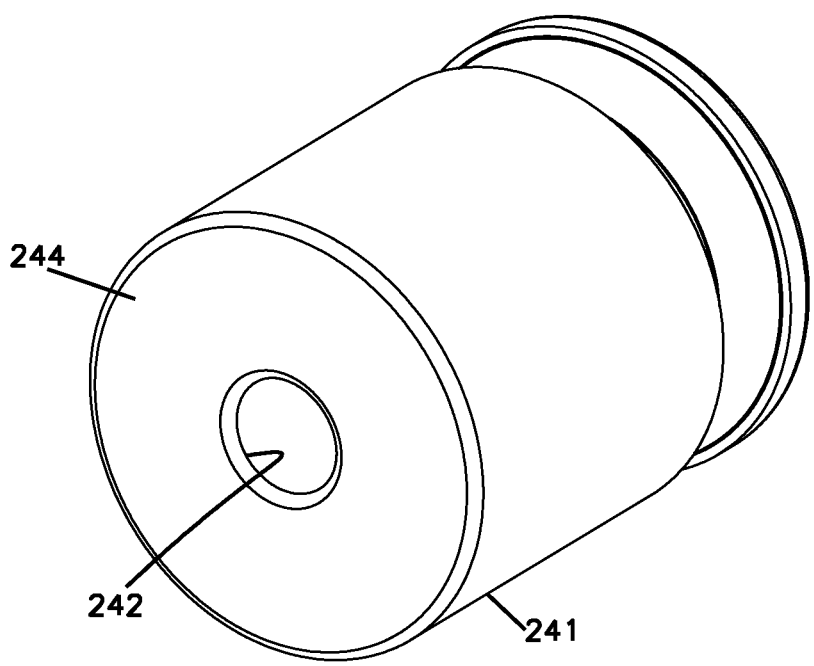
Figure 26:
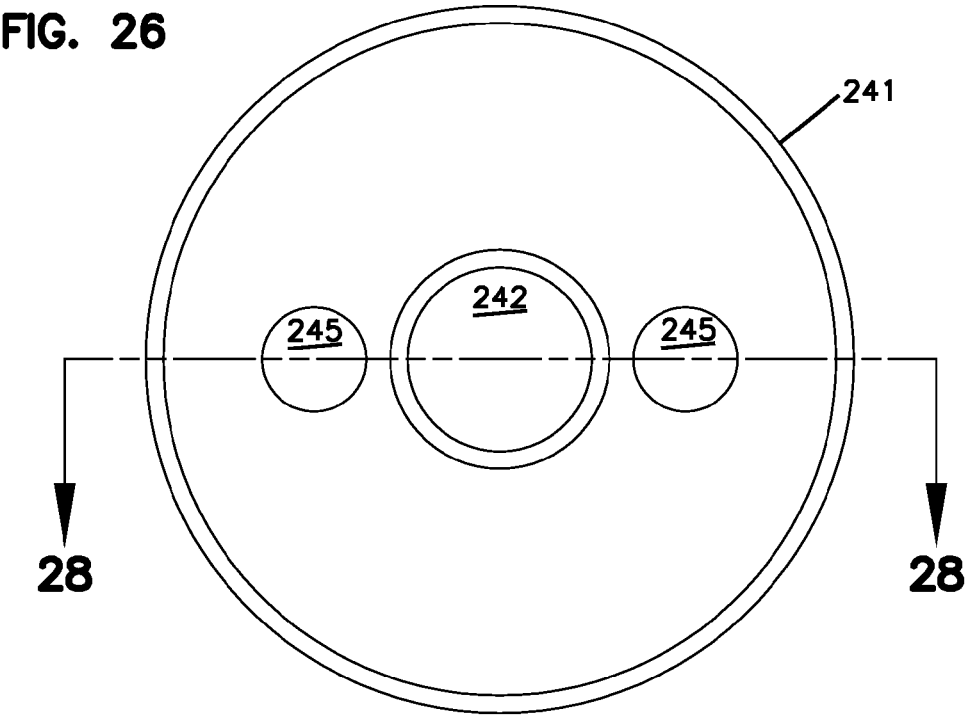
Figure 27:
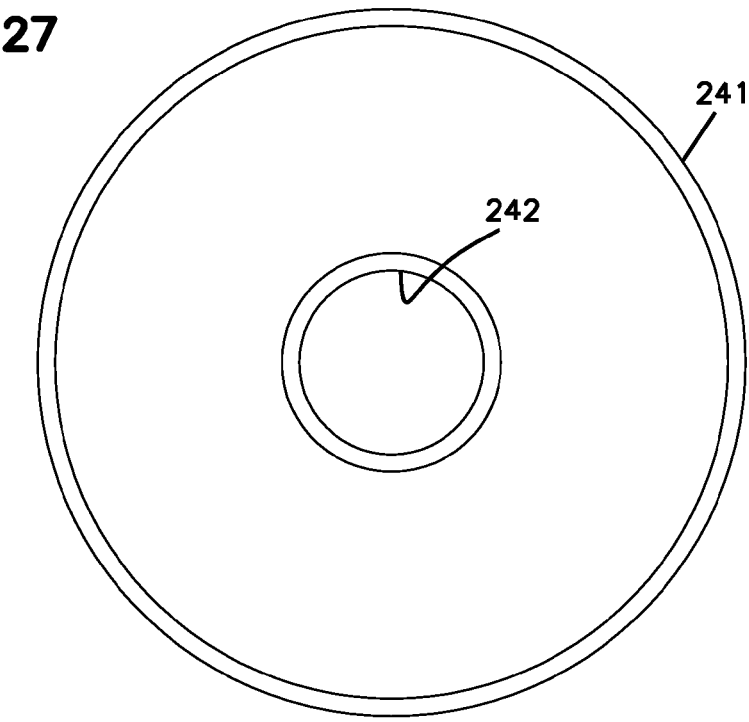
Figure 28:
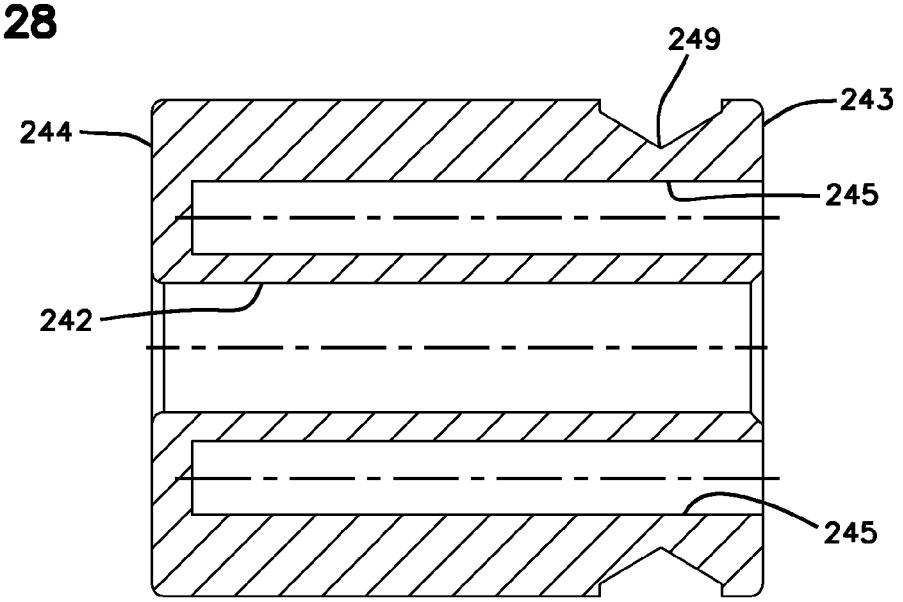
Figure 29:
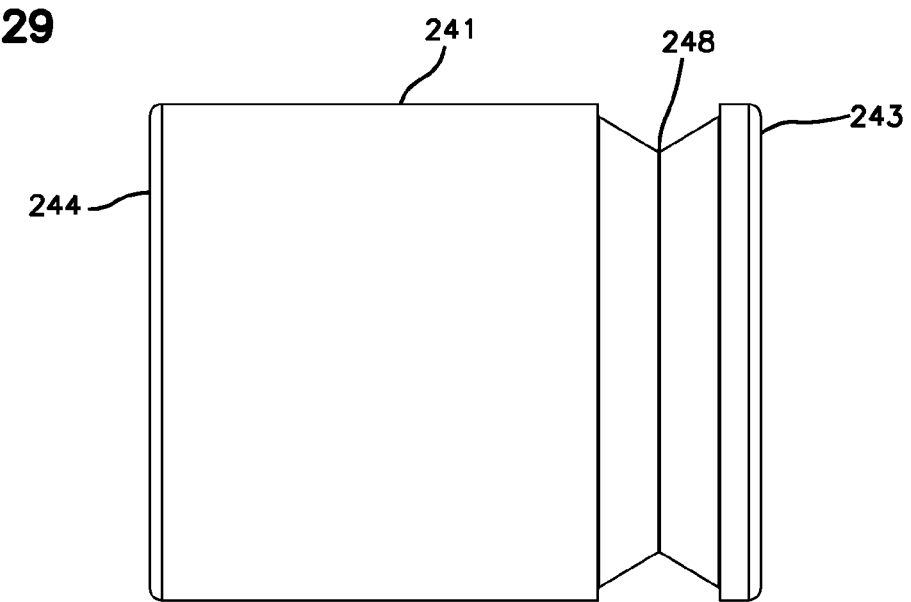

One example routing path R along which each strength member 117 can be routed is shown in FIG. 22. The example routing path R extends axially from one of the openings 236, along an exterior surface of the ribbed section 235 toward the second end of the crimp body 231, over the second end of the crimp body 231, and axially along the exterior surface of the ribbed section 235 toward the first end of the crimp body 231. In some implementations, the two axial portions of the routing path R are located on opposite sides of the crimp body 231. In certain implementations, each strength member 117 follows its own routing path (e.g., path R1 and path R2 of FIG. 23) without crossing another strength member.

Continuing with the example mounting process 360, the technician attaches 364 the second cable retention member 240 to the second cable segment 120. For example, in one implementation, the technician can glue or otherwise affix the strength components 127 of the second cable segment 120 to the second cable retention member 240.

FIGS. 24-29 show one example embodiment of a second cable retention member 240 suitable for use in implementing the attachment step 364 of the mounting process 360. The example second cable retention member 240 includes a body 241 defining a through opening 242 sized and configured to receive the optical fibers 122 o the second cable segment 120. In some implementations, the through-opening 242 can have a round cross-sectional profile. In other implementations, the transverse cross-sectional profile of the through-opening 242 can match the transverse cross-sectional profile of the buffer tube 124 of the second cable segment 120.

The body 241 of the second cable retention member 240 has a first end 243 and a second end 244. The body 241 defines receiving passages 245 within which the strength components 127 of the second cable segment 120 can be inserted. In some implementations, the receiving passages 245 extend along only a portion of the length of the retention body 241 (e.g., see FIG. 28). Accordingly, only the first end 243 of the retention body 241 defines a port to each passage 245 (compare FIGS. 26 and 27).

In accordance with some aspects, to secure the second cable segment 120 to the second cable retention member 240, the technician coats the trimmed strength components 127 in glue, epoxy, or other adhesive. The technician inserts the coated strength components 127 into the receiving passages 245 from the first end 243 of the retention body 241. In accordance with other aspects, the technician can insert the adhesive into the receiving passages 245 instead of, or in addition to, coating the strength components 127.

Figure 8:
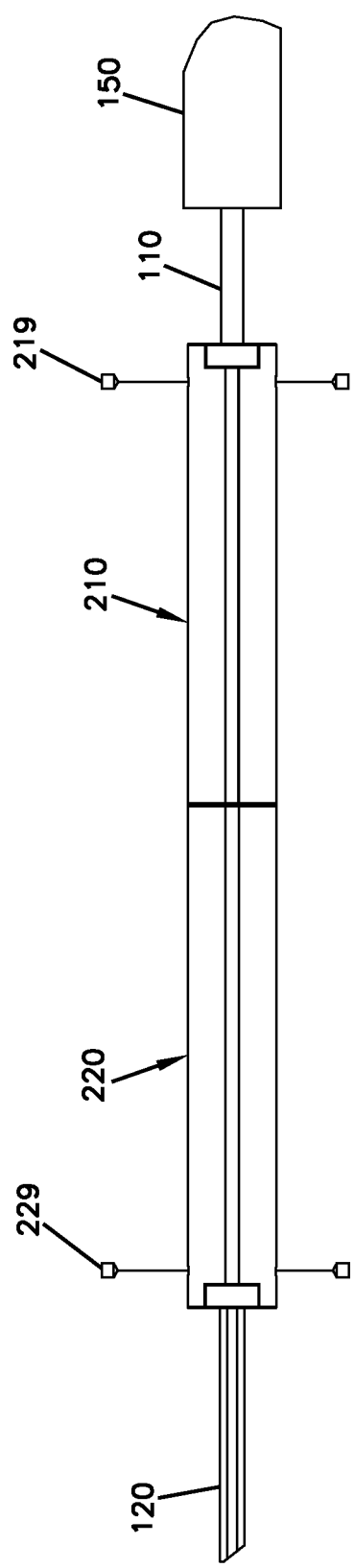
FIG. 8 shows the splice enclosure arrangement of FIG. 6 with first and second enclosure bodies secured together in accordance with aspects of the disclosure.
Figure 9:
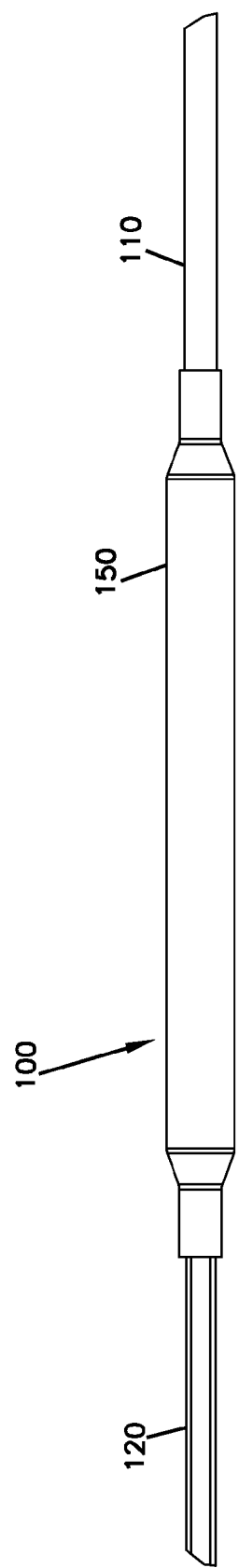
FIG. 9 shows the splice enclosure arrangement of FIG. 6 sealed within a heat shrink tube in accordance with aspects of the disclosure.

Continuing with the example mounting process 360, the technician encloses 366 the splice location by securing the first enclosure body 211 to the second enclosure body 221 with the first and second cable retention members 230, 240 positioned within the enclosure bodies 211, 221 (see FIG. 8). By repositioning the enclosure assemblies 210, 220 in this manner, substantially all exposed segments of the optical fibers of the first cable segment 110 and substantially all exposed segments of the optical fibers of the second cable segment 120 may be covered by cable jackets 118, 128 and the enclosure arrangement 200.

In some implementations, the enclosure bodies 211, 221 are secured together by threading the bodies 211, 221 together. In certain implementations, each enclosure body 211, 221 defines at least one shoulder 217, 227 at the second end 214, 224 to facilitate positioning and movement of the enclosure body 211, 221 (e.g., via a wrench or other tool). Each cable retention member 230, 240 is sized and shaped to fit within the hollow interior 212, 222 of the respective enclosure body 211, 221 (e.g., see FIG. 6). For example, the first cable retention member 230 can be sized and shaped to enter the first enclosure body 211 at the first end 213 and to abut the surface at the second end 214 of the first enclosure body 211.

The second cable retention member 240 can be sized and shaped to enter the second enclosure body 221 at the first end 223 and to abut the surface at the second end 224 of the second enclosure body 221.

The technician also locks 368 the cable retention members 230, 240 at fixed positions within the enclosure bodies 211, 221. For example, in accordance with some aspects, each retention member 230, 240 can be secured within the respective enclosure body 211, 221 via a set screw 219, 229 or other fasteners (FIG. 8). The set screws 219, 229 can be inserted through the enclosure bodies 211, 221 to interact with the cable retention members 230, 240 held within the enclosure bodies 211, 221. Locking the cable retention members 230, 240 within the enclosure bodies 211, 221 inhibits force applied to the cable segments 110, 120 from translating to the fusion splice.

In the examples shown in FIGS. 12 and 15, the circumferential wall of each enclosure body 211, 221 defines an opening 218, 228 through which the set screw 219, 229 can be inserted (see FIGS. 12 and 15). In certain implementations, the openings 218, 228 are defined at the closed ends of the bodies 211, 221. In some implementations, each of the retention members 230, 240 defines a reduced diameter section 238, 248 that is configured to align with the opening 218, 228 defined in the corresponding enclosure body 211, 221 when the retention member 230, 240 is enclosed within the enclosure body 211, 221. Inserting the set screws 219, 229 into the openings 218, 228 causes the set screws 219, 229 to extend into the reduced diameter section 238, 248 to lock the cable retention member 230, 240 at an axially fixed location within the enclosure body 211, 212. In other implementations, the set screws 219, 229 can interact with other portions of the retention members 230, 240.

Figure 30:
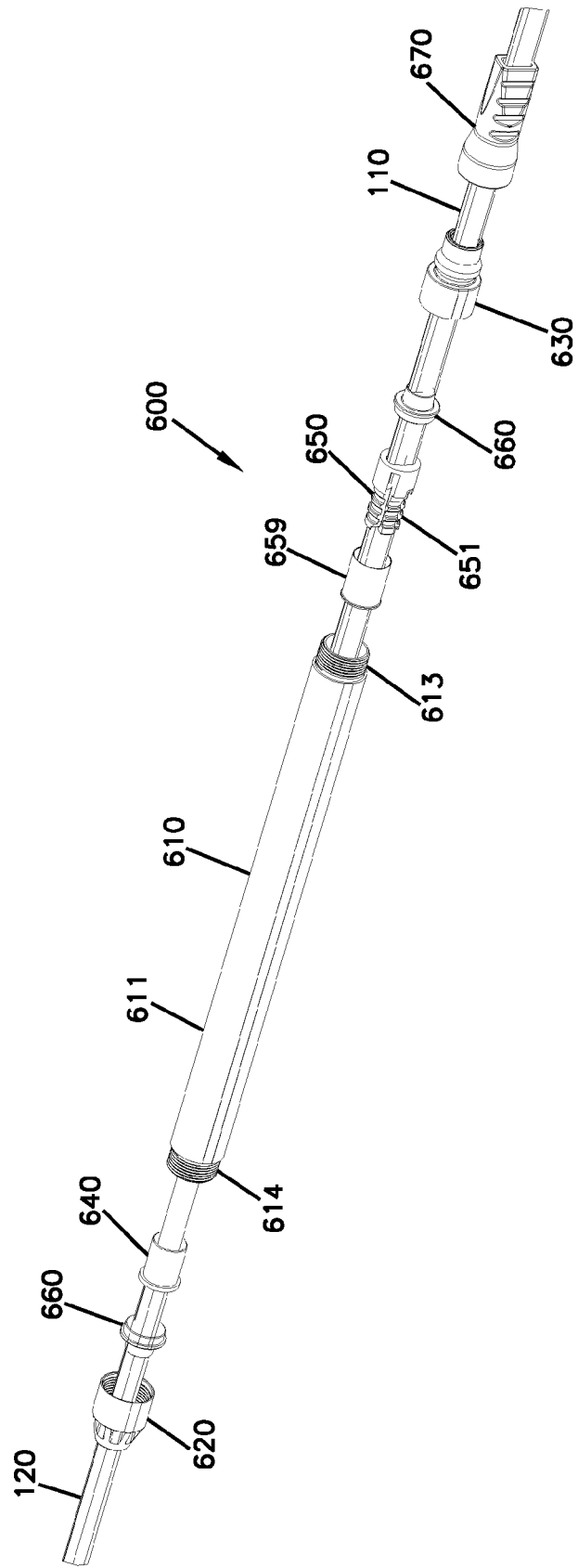
FIG. 30 shows another example implementation of a splice enclosure arrangement suitable for use in coupling together the first ends of the first and second cable segments to form the cable of FIG. 1 in accordance with aspects of the disclosure.

Referring to FIGS. 30-64, another example system and process for splicing together the first and second cable segments 110, 120 are shown. FIG. 30 shows another example implementation 600 of a splice enclosure arrangement 140 (FIG. 1) suitable for use in coupling together the first ends 111, 121 of the first and second cable segments 110, 120 to form a cable 100. The example enclosure arrangement 600 includes an enclosure tube 610 (see FIGS. 31-33), a first end cap 630 (see FIGS. 34-38) and a second end cap 620 (see FIG. 39-43) that are configured to attach together to enclose a splice sleeve 250 at a splice location.

Cable retention members 650, 640 are configured to retain the strength members 117, 127 of the cable segments 110, 120, respectively. The cable retention members 640, 650 are sized and shaped to fit within the enclosure tube 610. In certain implementations, gaskets 660 can be positioned between the cable retention members 640, 650 and the end caps 620, 630 to aid in sealing the interior of the enclosure arrangement 600 from dirt, dust, and other contaminants.

In some implementations, a cable strain relief device (e.g., a boot) 670 can be mounted to at least the first end cap 630 to protect the first cable segment 110. The cable strain relief device 670 inhibits bending of the optical fibers 112 of the first cable segment 110 beyond a maximum bend radius. The cable strain relief device 670 also aids in transferring side loads. In other implementations, a cable strain relief device also can be provided on or mounted to the second end cap 620 to protect the second cable segment 120.

Figure 31:
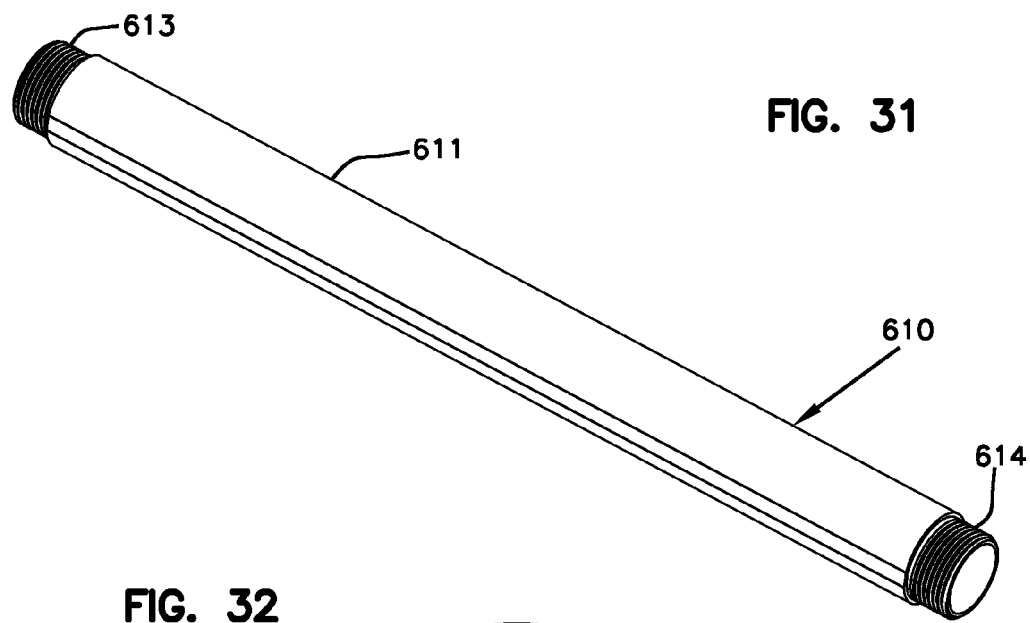
FIGS. 31-33 show an example enclosure tube of the splice enclosure arrangement of FIG. 30 in accordance with aspects of the disclosure.
Figure 32:
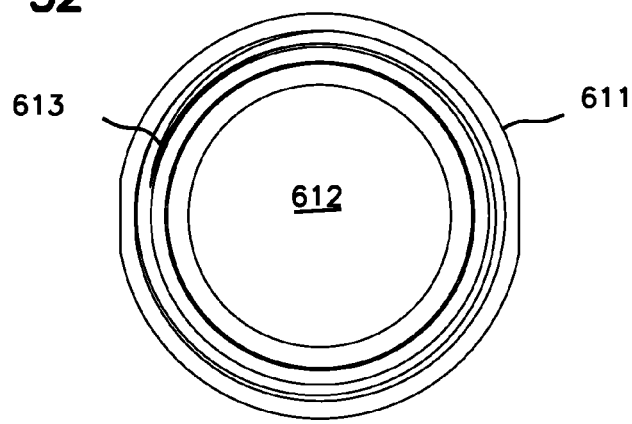
Figure 33:
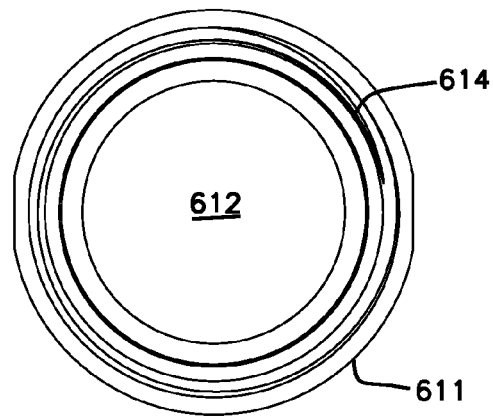
Figure 34:
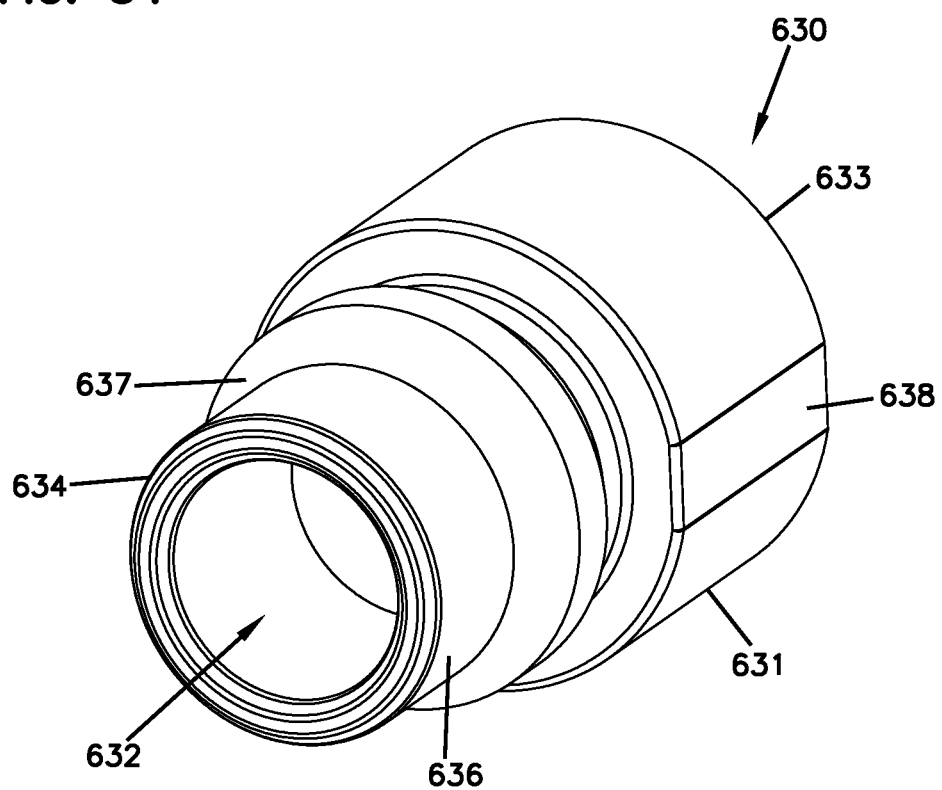
FIGS. 34-38 show an example first end cap of the splice enclosure arrangement of FIG. 30 in accordance with aspects of the disclosure.

FIGS. 31-33 show an example enclosure tube 610 having a generally cylindrical body 611 defining a hollow interior 612. A first end of the tube body 611 defines a first connection region 613 and a second end of the tube body 611 defines a second connection region 614. In some implementations, each connection region 613, 614 has a threaded exterior surface. In other implementations, however, one or both connection regions 613, 614 can define a threaded interior surface.

FIGS. 34-38 show an example first end cap 630 having a body 631 extending from a first end 633 to a second end 634. The first end cap body 631 defines a through-passage 632 extending between the first and second ends 633, 634. In general the through-passage 632 has a sufficient diameter to receive and slide along a jacketed portion of the first cable segment 110.

Figure 36:
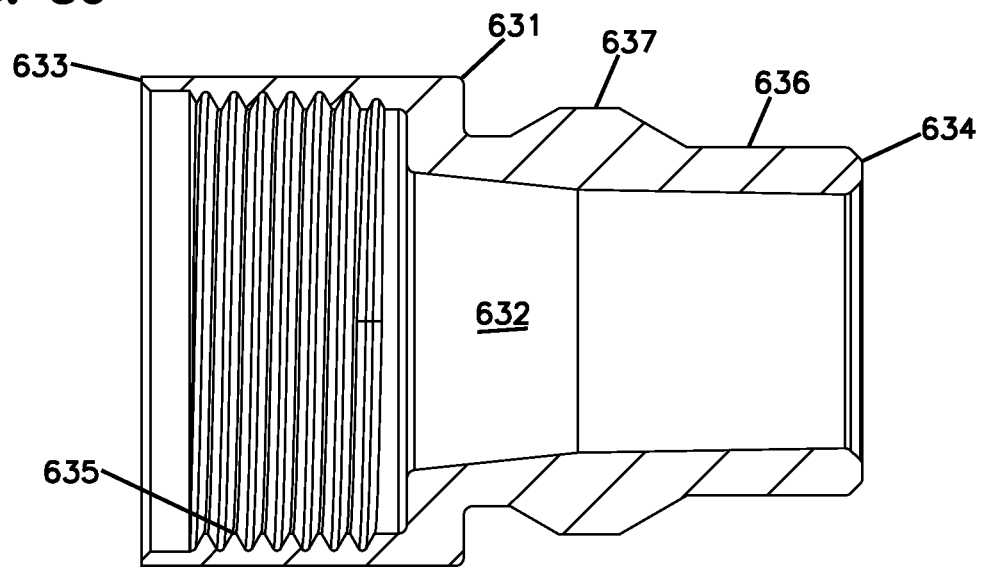

The interior surface of the first end cap body 631 defines a threaded region 635 at the first end 633 (FIG. 36). The threaded region 635 is configured to screw onto the first connection region 613 of the enclosure tube 610 to mount the first end cap 630 to the enclosure tube 610. Accordingly, the diameter of the first end 633 of the first end cap body 631 is sufficiently large to fit over the first connection region 613. In other implementations, however, the first end cap 630 can define a narrower first end having a threaded exterior surface that screws into interior threading at the second end of the enclosure tube.

Figure 35:
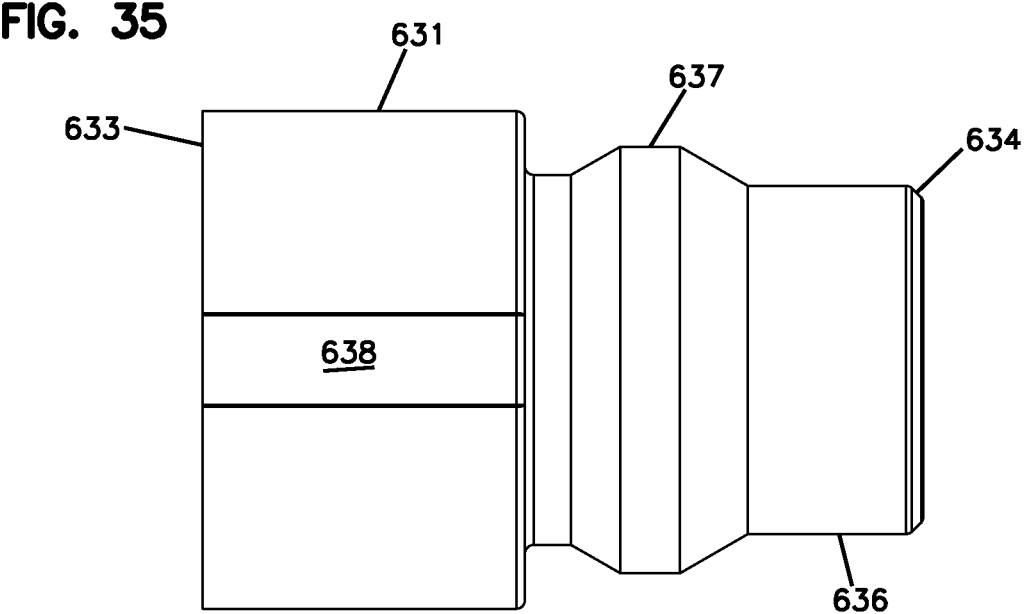
Figure 37:
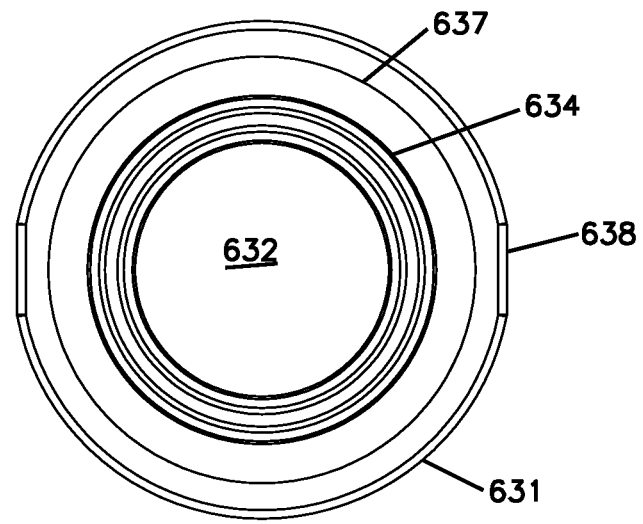
Figure 38:
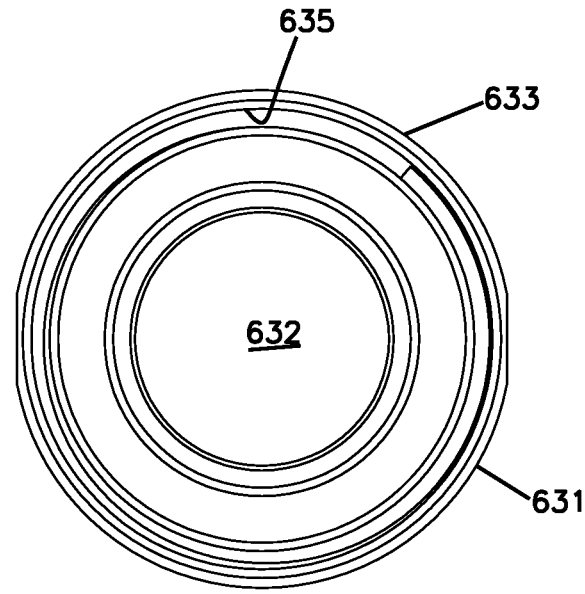
Figure 39:
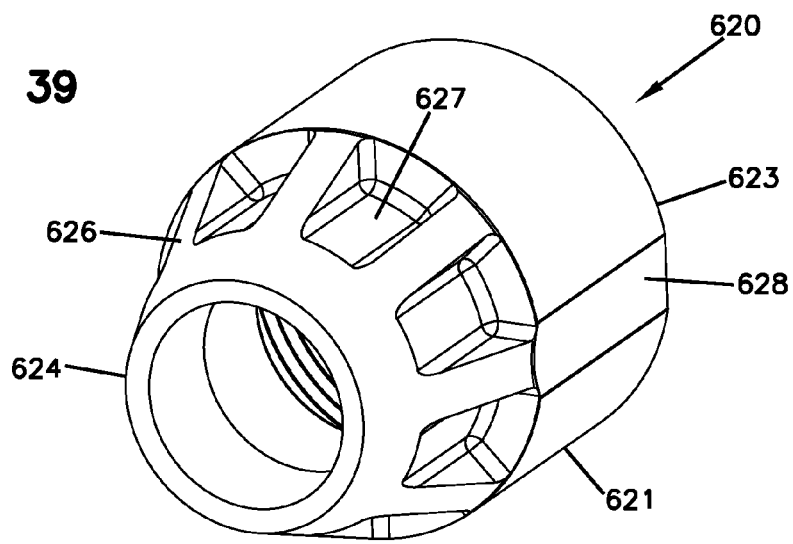
FIGS. 39-43 show an example second end cap of the splice enclosure arrangement of FIG. 30 in accordance with aspects of the disclosure.
Figure 42:
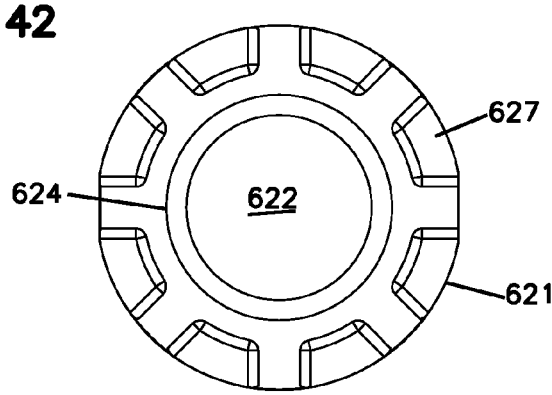
Figure 43:
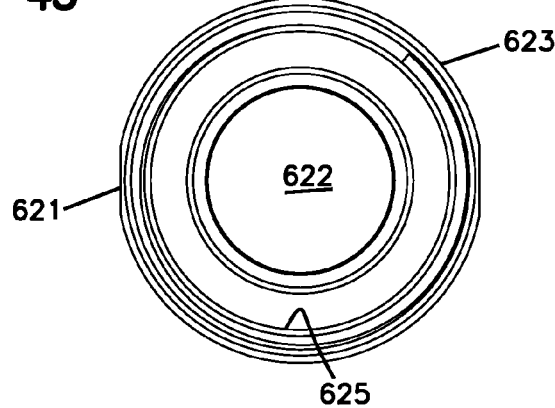

The first end cap body 631 also includes a reduced diameter portion 636 that extends from the threaded region 635 to the second end 634 of the body 631. An annular bulge portion 637 extends circumferentially around the reduced diameter portion 636. In one implementation, the bulged portion 637 defines a flat intermediate portion that tapers radially inwardly on each side to the reduced diameter portion 636 (FIGS. 35-36). In certain implementations, a channel or groove 638 extends axially along the exterior of the threaded section 635 of the first end cap body 631 (see FIG. 34).

FIGS. 39-43 show an example second end cap 620 having a body 621 extending from a first end 623 to a second end 624. The second end cap body 621 defines a through-passage 622 extending between the first and second ends 623, 624. In general the through-passage 622 has a sufficient diameter to receive and slide along a jacketed portion of the second cable segment 120.

Figure 41:
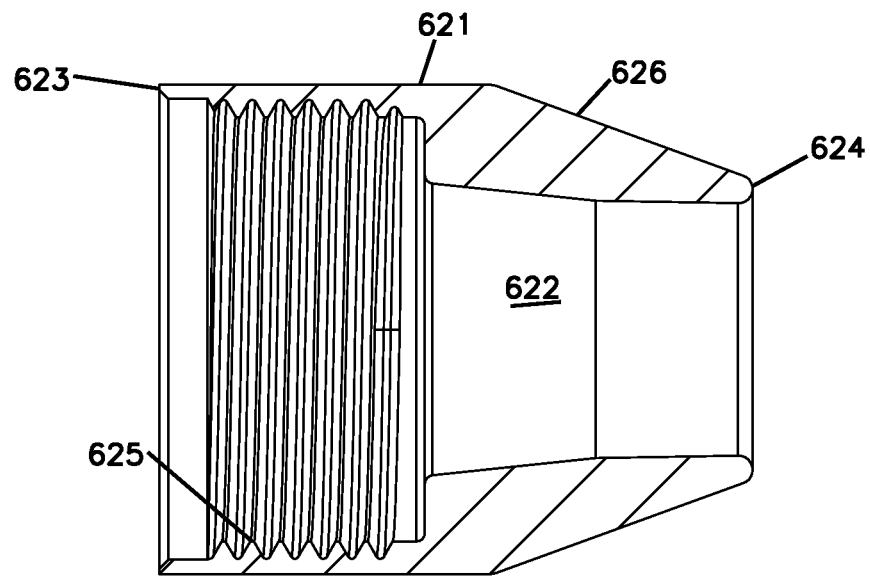
Figure 40:
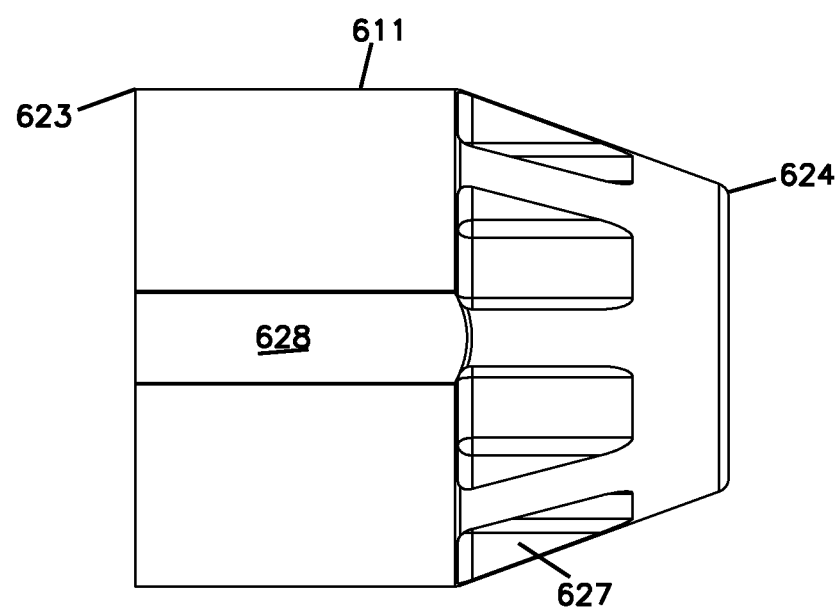
Figure 44:
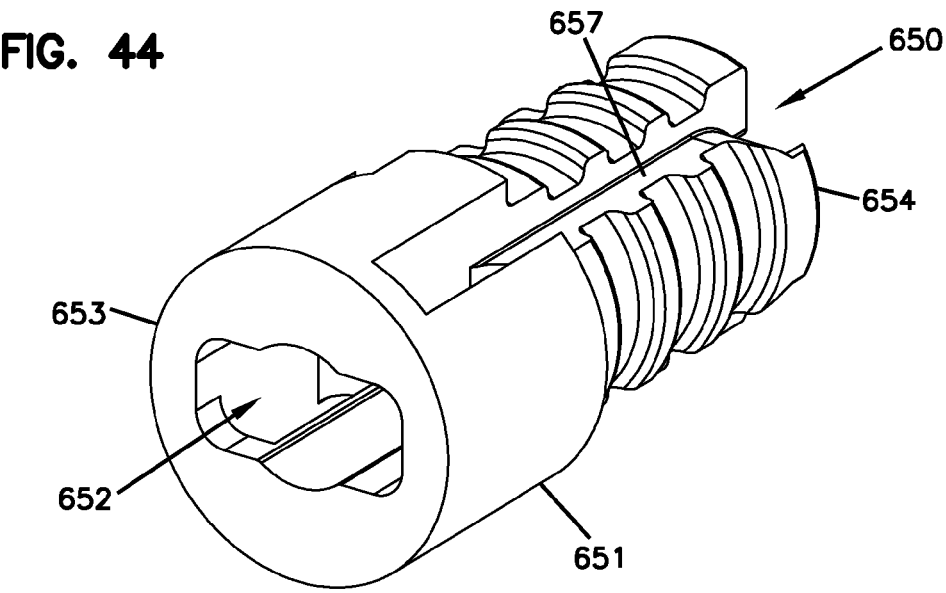
FIGS. 44-49 show one example embodiment of a first cable retention member suitable for use in securing the first cable segment to the splice enclosure arrangement of FIG. 30 in accordance with aspects of the disclosure.
Figure 45:
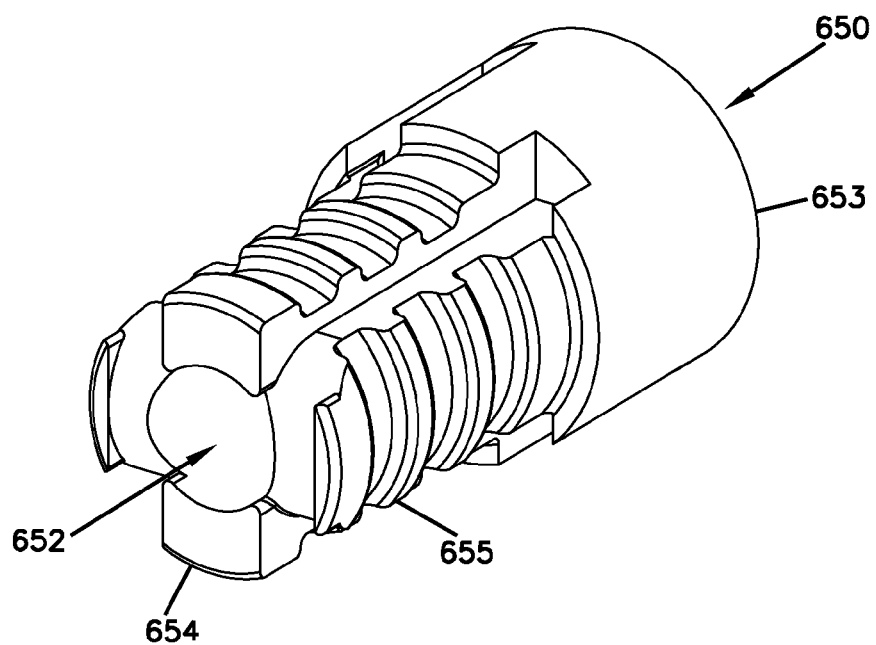
Figure 47:
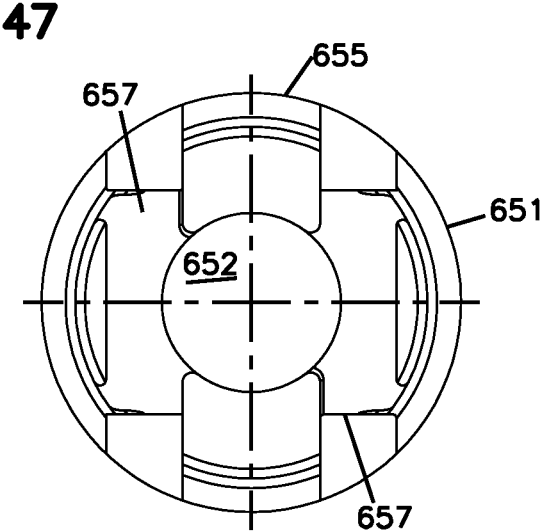
Figure 46:
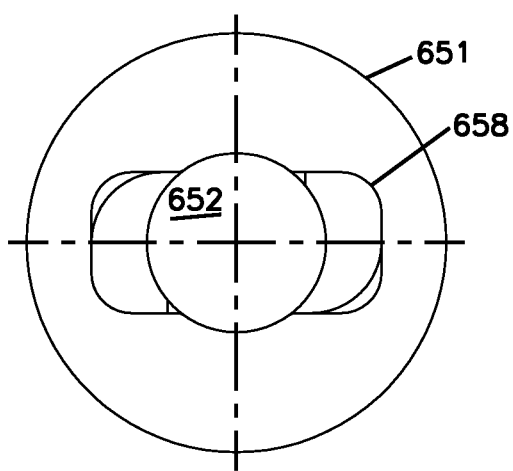

The interior surface of the second end cap body 621 defines a threaded region 625 at the first end 623 (FIG. 41). The threaded region 625 is configured to screw onto the second connection region 614 of the enclosure tube 610 to mount the second end cap 620 to the enclosure tube 610. Accordingly, the diameter of the first end 623 of the second end cap body 621 is sufficiently large to fit over the second connection region 614. In other implementations, however, the second end cap 620 can define a narrower first end having a threaded exterior surface that screws into interior threading at the first end of the enclosure tube.

The second end 624 of the second end cap body 621 defines a tapered section 626 that tapers radially inwardly (FIG. 35). In certain implementations, depressions 627 are provided at spaced intervals along the circumference of the second end cap body 621 (see FIG. 39). The depressions 627 aid in screwing the second end cap 620 to the enclosure tube 610. In certain implementations, a channel or groove 628 extends axially along the non-tapered section of the second end cap body 621 (see FIG. 40).

FIGS. 44-49 show one example embodiment of a first cable retention member 650 suitable for use in securing the first cable segment 110 to the splice enclosure arrangement 600. In accordance with some aspects, the first cable retention member 650 includes a crimp body 651 and a crimp sleeve 659 (FIG. 30). The crimp body 651 has a first end 653 and a second end 654 (see FIGS. 44 and 45). The crimp body 651 defines a ribbed or threaded section 655. The crimp sleeve 659 mounts over the ribbed section 655 to crimp a portion of the first cable segment (e.g., the strength members 117) to the first cable retention member 650.

The crimp body 651 defines a through-passage 652 extending through the crimp body 651. The opening to the through-passage 652 at the first end 653 of the crimp body 651 is sufficiently sized to enable the optical fibers 112 and the strength members 117 of the first cable segment 110 to enter the through-passage 652 (see FIG. 44). The opening to the through-passage 652 at the second end 654 of the crimp body 651 is sized to enable only the optical fibers 112 to exit the crimp body 651 (see FIG. 45).

The crimp body 651 also defines at least one opening 656 at the first end of the crimp body 651 and at least one channel 657 extending axially along an exterior surface of the crimp body 651. For example, the channels 657 can extend axially through the ribbed section 655 of the crimp body 651. In some implementations, the channels 657 also extend along the second end 654 of the crimp body 651 to connect pairs of channels 657 provided on different sides of the crimp body 651 (e.g., see FIGS. 45 and 47). In the example shown, the crimp body 651 defines two openings 656 and two channels 657. In other implementations, however, the crimp body 651 can define greater or fewer opening 656 and/or channels 657. In one implementation, each opening 656 defines or includes a slot in the crimp body 651 (e.g., see FIG. 48).

To secure the first cable segment 110 to the first cable retention member 650, the technician inserts the optical fibers 112 and the strength members 117 of the first cable segment 110 into the through-passage 652 at the first end 653 of the crimp body 651. The technician threads the optical fibers 112 along the through-opening 652 and out the second end 654 of the crimp body 651. The technician routes the strength members 117 through the openings 656 in the crimp body 651 and along the exterior channels 657. The crimp sleeve 659 is slid over the ribbed section 655 of the crimp body 651 when the strength members 117 are positioned in the channels 657. The technician uses a tool to apply sufficient force to the crimp sleeve 659 to form the crimp.

Figure 49:
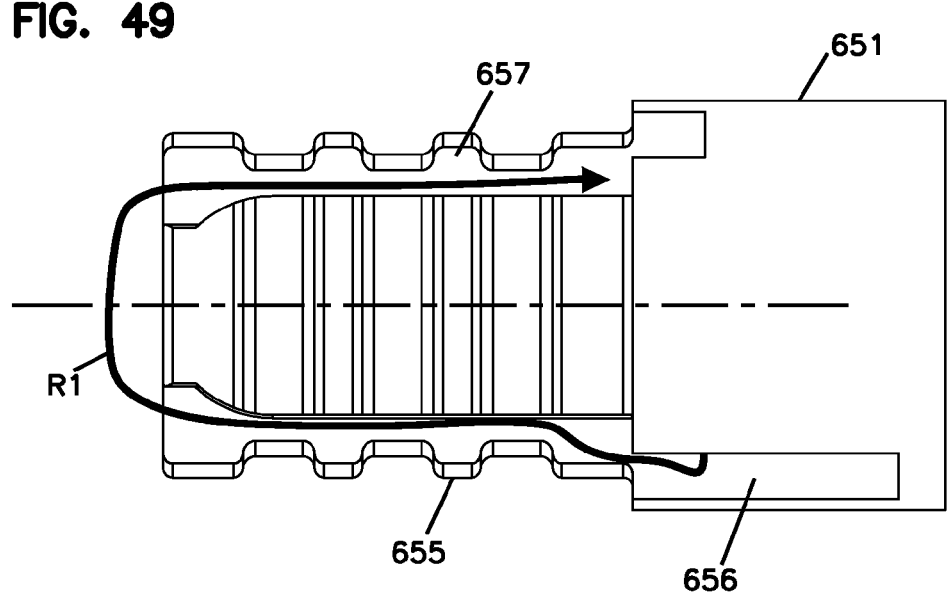
Figure 48:
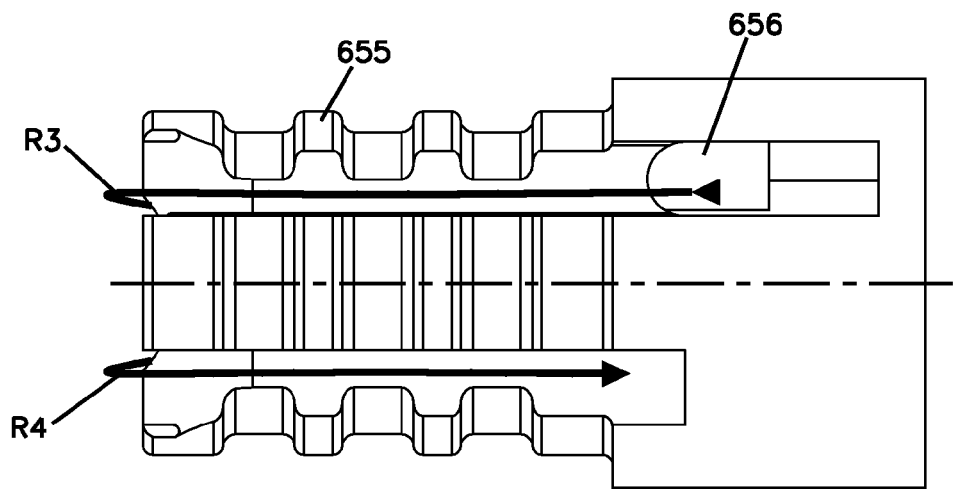
Figure 50:
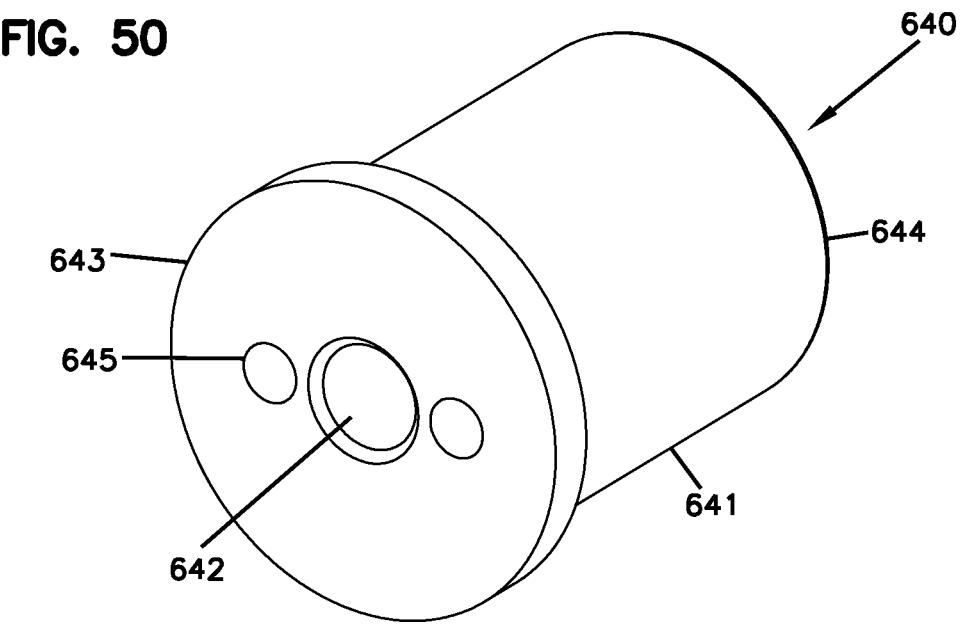
FIGS. 50-55 show one example second cable retention member suitable for use in securing the second cable segment to the splice enclosure arrangement of FIG. 30 in accordance with aspects of the disclosure.
Figure 51:
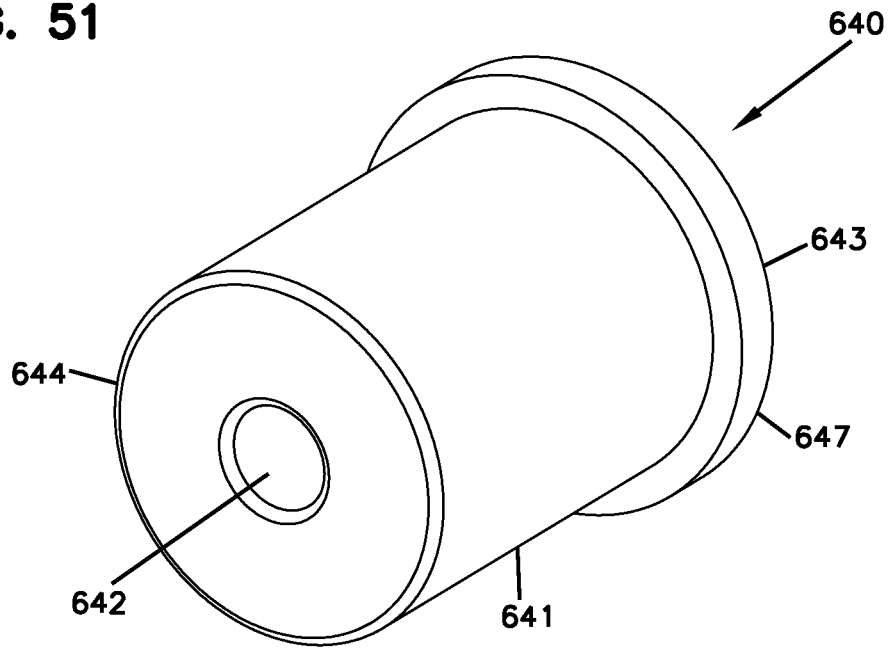
Figure 55:
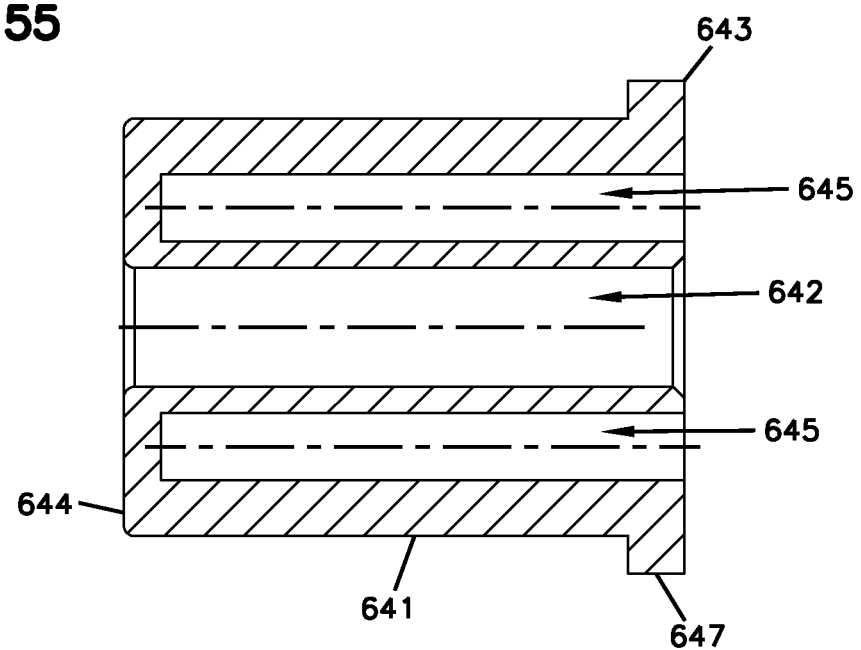
Figure 52:
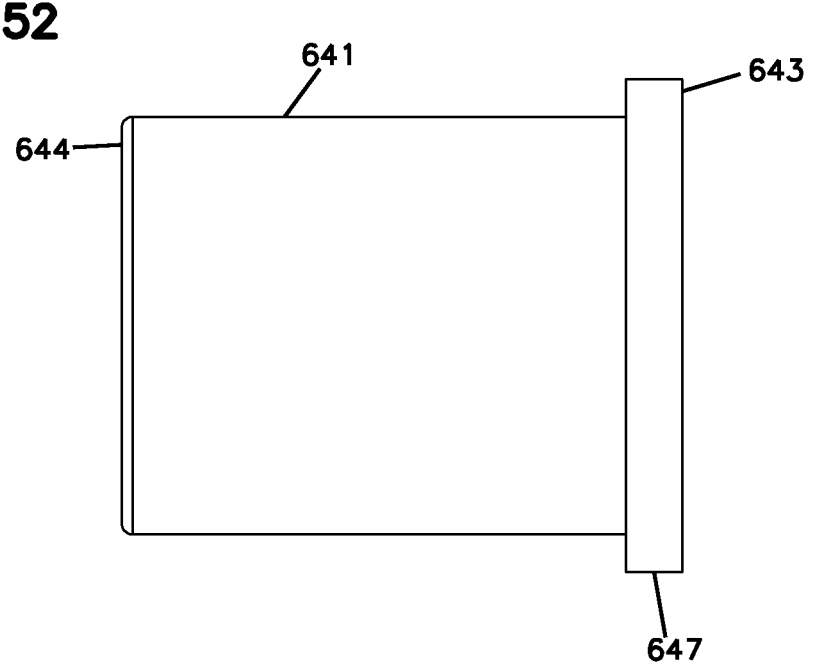
Figure 53:
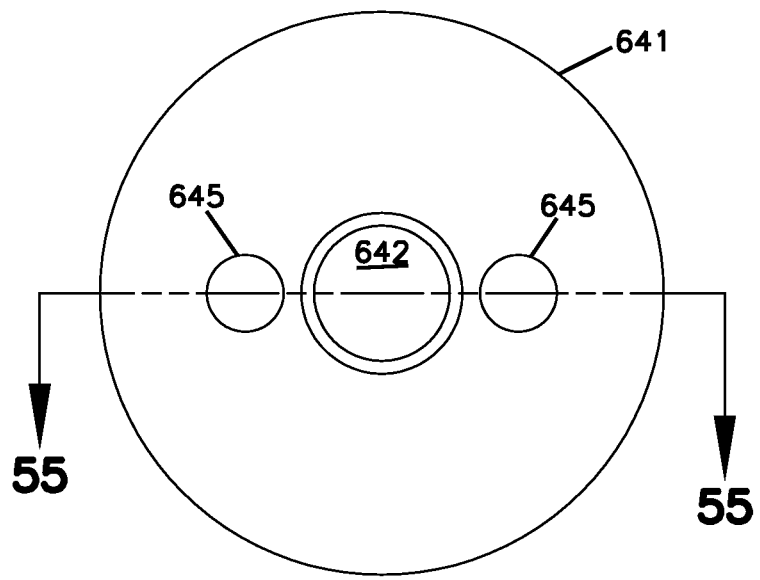
Figure 54:
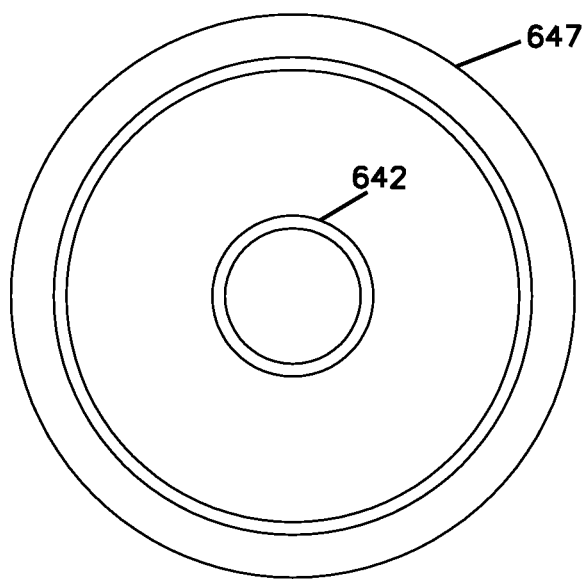

One example routing path R' along which each strength member 117 can be routed is shown in FIG. 49. The example routing path R' extends axially from one of the openings 656, along a grooved exterior surface 657 of the ribbed section 655 toward the second end 654 of the crimp body 651, over the second end 654 of the crimp body 651, and axially along the grooved exterior surface 657 of the ribbed section 655 toward the first end 653 of the crimp body 651. In some implementations, the two axial portions of the routing path R' are located on opposite sides of the crimp body 651 (e.g., see FIG. 48). In certain implementations, each strength member 117 follows its own routing path (e.g., path R3 and path R4 of FIG. 48) without crossing.

FIGS. 50-55 show one example second cable retention member 640 including a body 641 having a first end 643 and a second end 644. The outer diameter of the second cable retention member body 641 is substantially constant. The first end 643 of the second retention body 641 includes a rim 647 having a diameter that is larger than the diameter of the rest of the second retention body 641.

The second retention body 641 defines a through-passage 642 extending between the first and second ends 643, 644. In general the through-passage 642 has a sufficient diameter to receive and slide along the optical fibers 122 of the second cable segment 120. In certain implementations, the through-passage 642 has sufficient diameter to receive and slide along a buffer tube 124 enclosing the optical fibers 122. In one implementation, the ports into the through-passage 642 are tapered.

The second retention body 641 also defines receiving passages 645 that extend into the body 641 from the first end 643. In some implementations, the receiving passages 645 extend only partially through the body 641. In other implementations, however, the receiving passages 645 can extend completely through the body 641. The receiving passages 645 are configured to receive strength components 127 of the second cable segment 120.

In certain implementations, the strength components 127 are glued, expoxied, or otherwise affixed within the receiving passages 645. In one implementation, the strength components 127 are coated with glue prior to being inserted into the passages 645. In another implementation, glue is inserted into the receiving passages 645 prior to inserting the strength members 127. In another implementation, glue is applied both to the strength components 127 and to the receiving passages 645.

Figure 56:
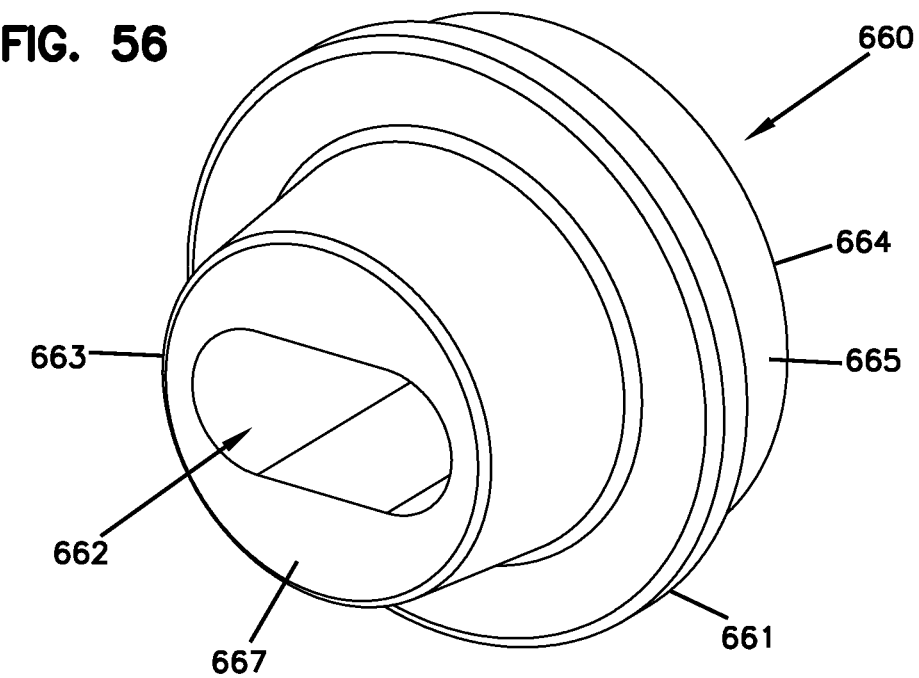
FIGS. 56-58 show one example gasket suitable for use in sealing the ends of the enclosure tube of the splice enclosure arrangement of FIG. 30 in accordance with aspects of the disclosure.
Figure 57:
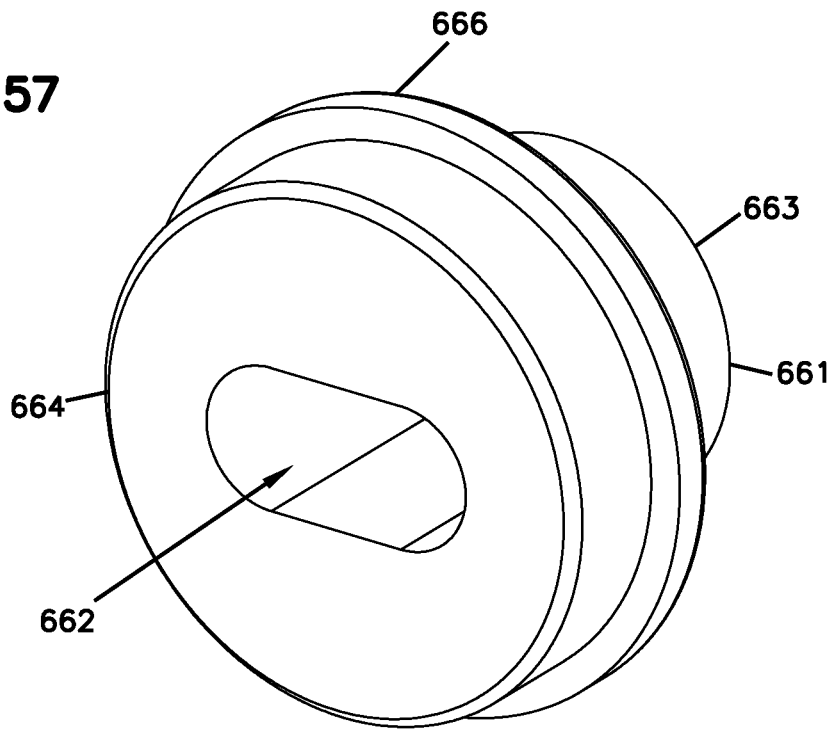
Figure 58:
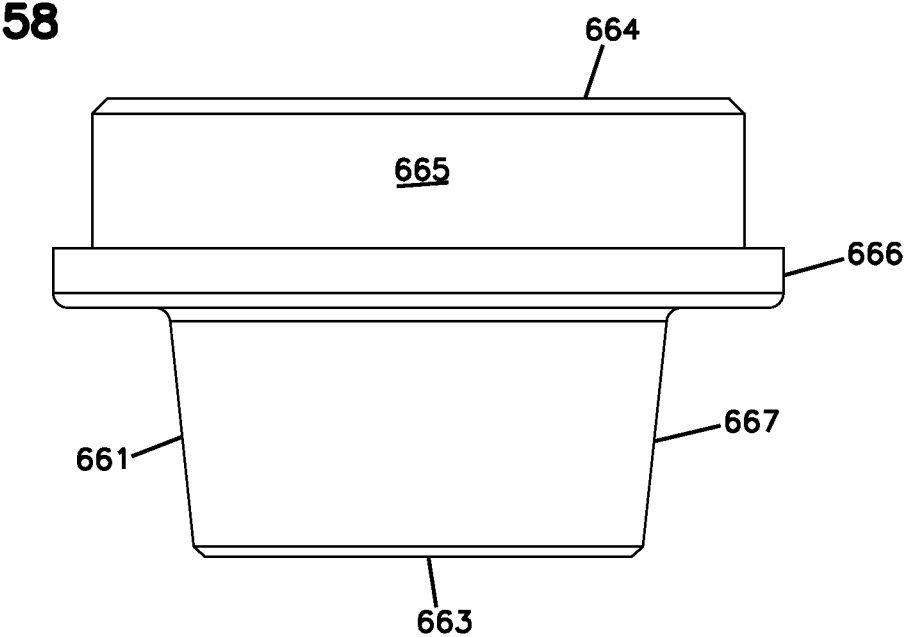
Figure 59:
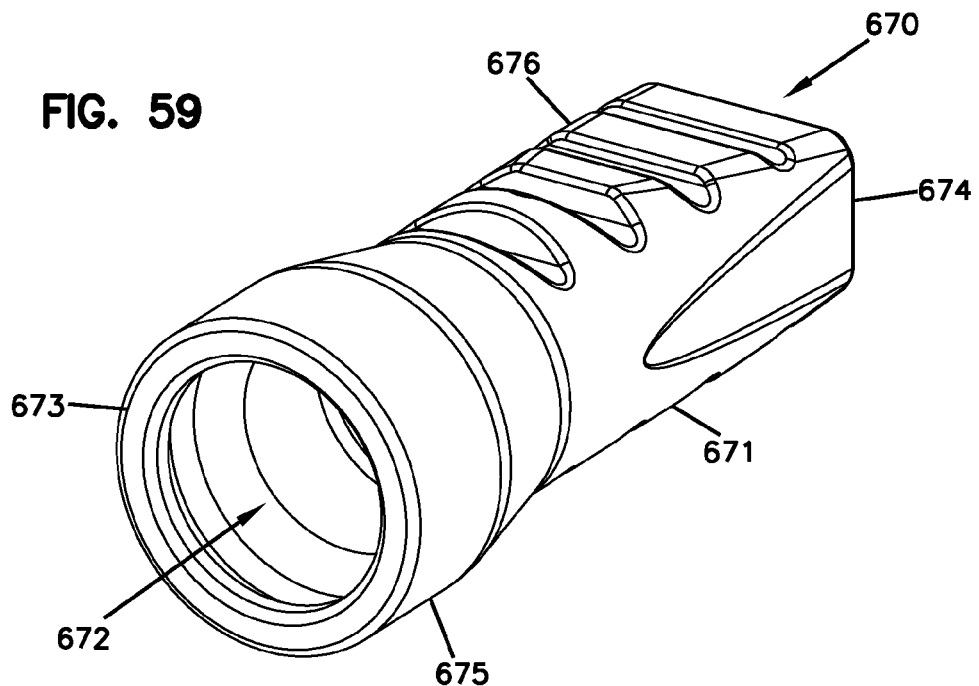
FIGS. 59-63 show one example strain relief device suitable for providing strain relief to at least the first cable segment in accordance with aspects of the disclosure.
Figure 60:
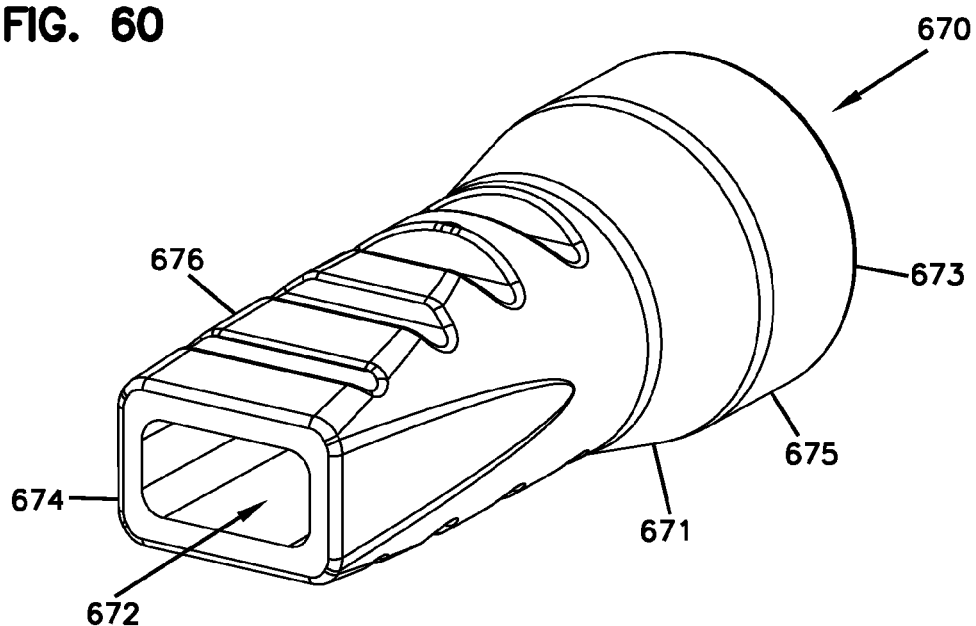
Figure 61:
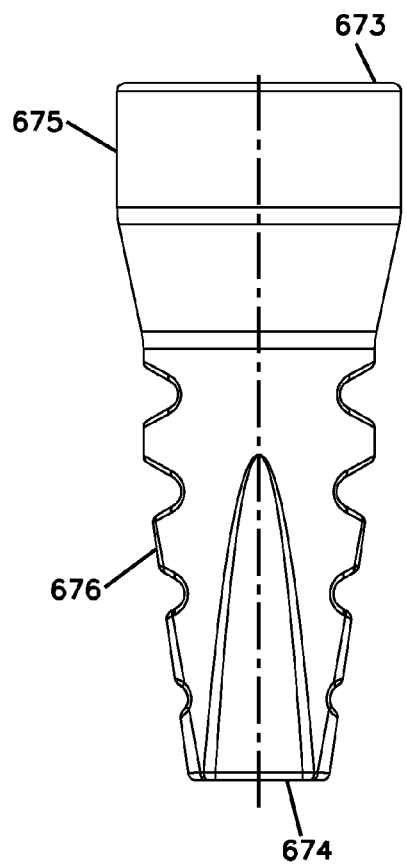
Figure 62:
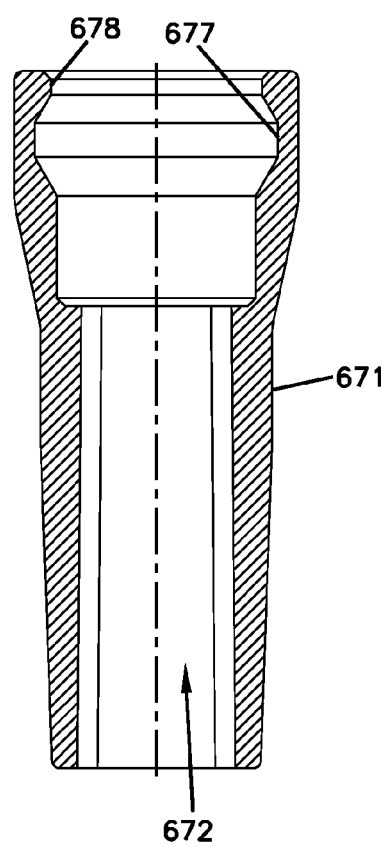
Figure 63:
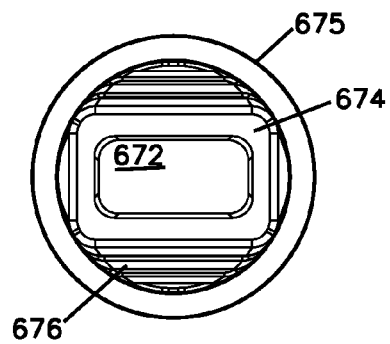

FIGS. 56-58 show one example gasket 660 suitable for use in sealing the ends of the enclosure tube 610. The example gasket 660 includes a body 661 having a first end 663 and a second end 664. The gasket body 661 defines a through-passage 662 extending between the first and second ends 663, 664. The through-passage 662 is sized and shaped to enable at least the optical fibers of the respective cable segment to extend through the passage 662. In certain implementations, the through-passage 662 is sized and shaped to enable a jacketed portion of the respective cable segment to extend through.

In certain implementations, each gasket 660 is mounted between one of the cable retention members 640, 650 and one of the end caps 620, 630. The gaskets 660 inhibit dust, dirt, or other contaminants from entering the enclosure tube 610. The gasket body 661 also includes a sealing ridge 666 having a transverse cross-sectional profile with sufficient diameter to press in sealing engagement against the threaded region of the respective end cap 620, 630. When the gasket 660 is mounted to the cable 100, the first end 663 of the gasket body 661 faces and extends into the respective end cap 620, 630. Accordingly, the first end 663 of the gasket body 661 tapers radially inwardly so that the first end 663 has a transverse cross-sectional profile that will fit within the respective end caps 620, 630.

When the gasket 660 is mounted to the cable 100, the second end 664 of the gasket body 661 is configured to face toward the enclosure tube 610. In certain implementations, the second end 664 of the gasket body 661 engages the respective cable retention element 640, 650. In the example shown, the cross-sectional profile of the second end 664 of the gasket body 661 is larger than the cross-sectional profile of the first end 663.

In some implementations, the same type of gasket 660 is used at both ends of the enclosure tube 610. In other implementations, however, different types of gaskets can be used. For example, in one implementation, the through-passage 662 of each gasket 660 can be sized and shaped to match the transverse cross-sectional profile of the cable segment over which the gasket 660 is mounted.

FIGS. 59-63 show one example strain relief device 670 suitable for providing strain relief to at least the first cable segment 110. The strain relief device 670 includes a body 671 having a first end 673 and a second end 674. A through-passage 672 extends through the body 671 between the first and second ends 673, 674. The second end 674 of the body 671 is sized and shaped to enable a jacketed portion of the first cable segment 110 to extend therethrough. In one implementation, the second end 674 can have a transverse cross-sectional profile that matches a transverse cross-sectional profile of the first cable segment 110.

The first end 673 of the strain relief body 671 includes a mounting section 675 that is configured to mount to the first end cap 630 of the enclosure arrangement 600. For example, the mounting section 675 can define an annular groove 677 along an interior surface of the body 671. The mounting section 675 also can define a lip 677 that is sufficiently flexible to enable a portion of the first end cap 630 to push past the lip 677 to the groove 677. For example, in one implementation, the bulged portion 637 of the first end cap 630 can snap-fit into the annular groove 677 of the strain relief body 671 to mount the strain relief device 670 to the first end cap 630. The second end 674 of the strain relief body 671 provides a boot section 676 that inhibits bending of the first cable segment 110 beyond a maximum bend radius.

In accordance with some aspects, the splicing process 300 shown in FIG. 7 can be implemented using the enclosure arrangement 600. For example, a technician is initially provided 302 with a first cable segment 110, a second cable segment 120, and the enclosure arrangement 600. The technician prepares 304 the first cable segment 110 and prepares 306 the second cable segment 120. For example, the technician can prepare the cable segments 110, 120 as discussed above.

At the end of the preparation steps, the first end 111 of the first cable segment 110 will have the strain relief device 670, the first end cap 630, a gasket 660, the first cable retention member 650, and the enclosure tube 610 threaded onto the optical fibers 112/strength members 117 as appropriate. The first end 121 of the second cable segment 120 will have the second end cap 620, a gasket 660, and the second cable retention member 640 threaded onto the optical fibers 122/strength components 127 as appropriate.

The technician splices 308 the optical fibers 112 of the first cable segment 110 to the optical fibers 122 of the second cable segment 120, e.g., as discussed above. The technician then secures 310 the spliced fibers within the splice enclosure arrangement 600 and seals 312 the splice enclosure arrangement 600. For example, the technician can attach the strength members 117 of the first cable segment 110 to the first cable retention member 650 and attach the strength components 127 of the second cable segment 120 to the second cable retention member 640. The technician also can position the enclosure tube 610 over the spliced fibers.

Figure 64:
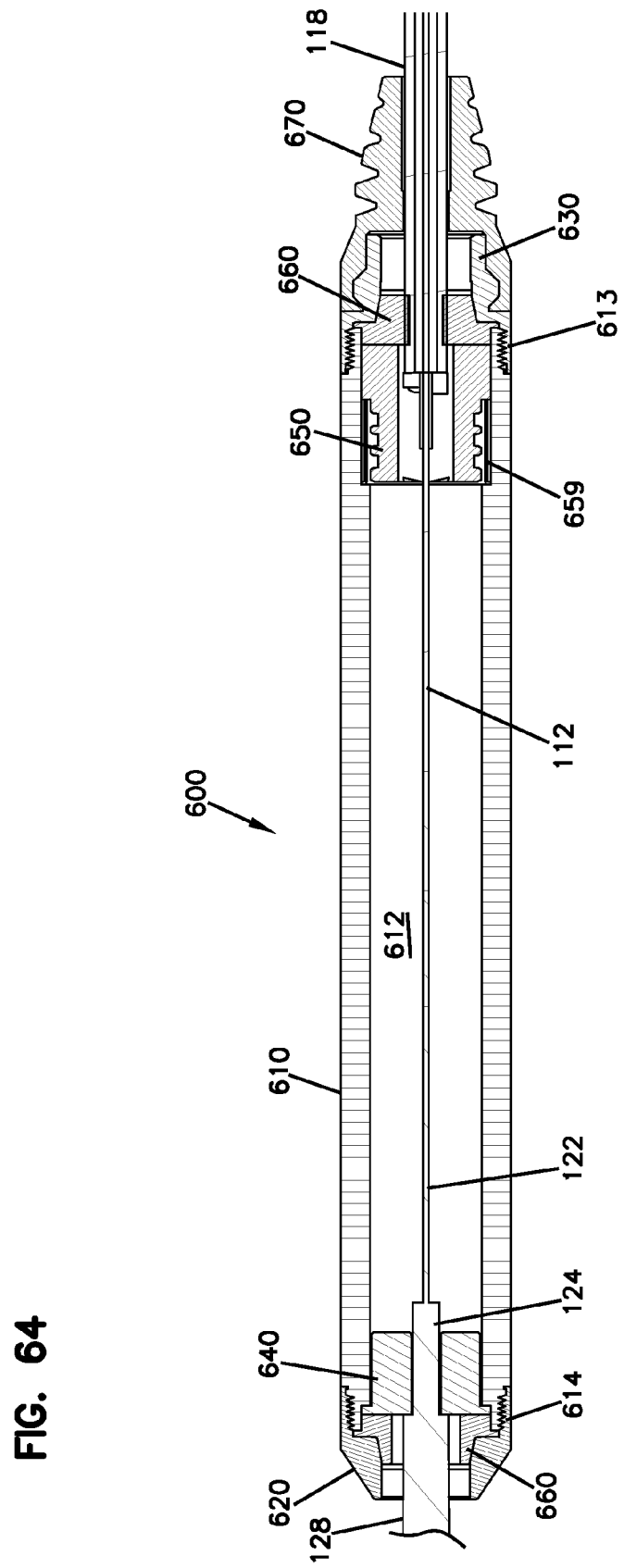
FIG. 64 is a cross-sectional view of the enclosure arrangement of FIG. 30 mounted over an example spliced optical fiber cable in accordance with aspects of the disclosure.

As shown in FIG. 64, the enclosure tube 610 defines a first inner shoulder 615 and a second inner shoulder 616. When the technician secures the splice, the first cable retention member 650 is pushed within the enclosure tube 610 until the second end 654 of the cable retention member abuts the first inner shoulder 615 of the enclosure tube 610. The first end cap 630 threads onto the first connection region 613 of the enclosure tube 610 to hold the first cable retention member 650 in an axially fixed position relative to the enclosure tube 610.

The second cable retention member 640 is pushed into the enclosure tube 610 until the rim 647 at the first end 643 of the second cable retention member 640 abuts the second inner shoulder 616. The second end cap 640 threads onto the second connection region 614 of the enclosure tube 610 to hold the second cable retention member 640 in an axially fixed position relative to the enclosure tube 610. The gaskets 660 provide sealing protection for the bare optical fibers 112, 122 at the splice location. Accordingly, in certain implementations, neither a heat shrink tube nor an overmolding enclosure is applied to the cable 100.

Figure 65:
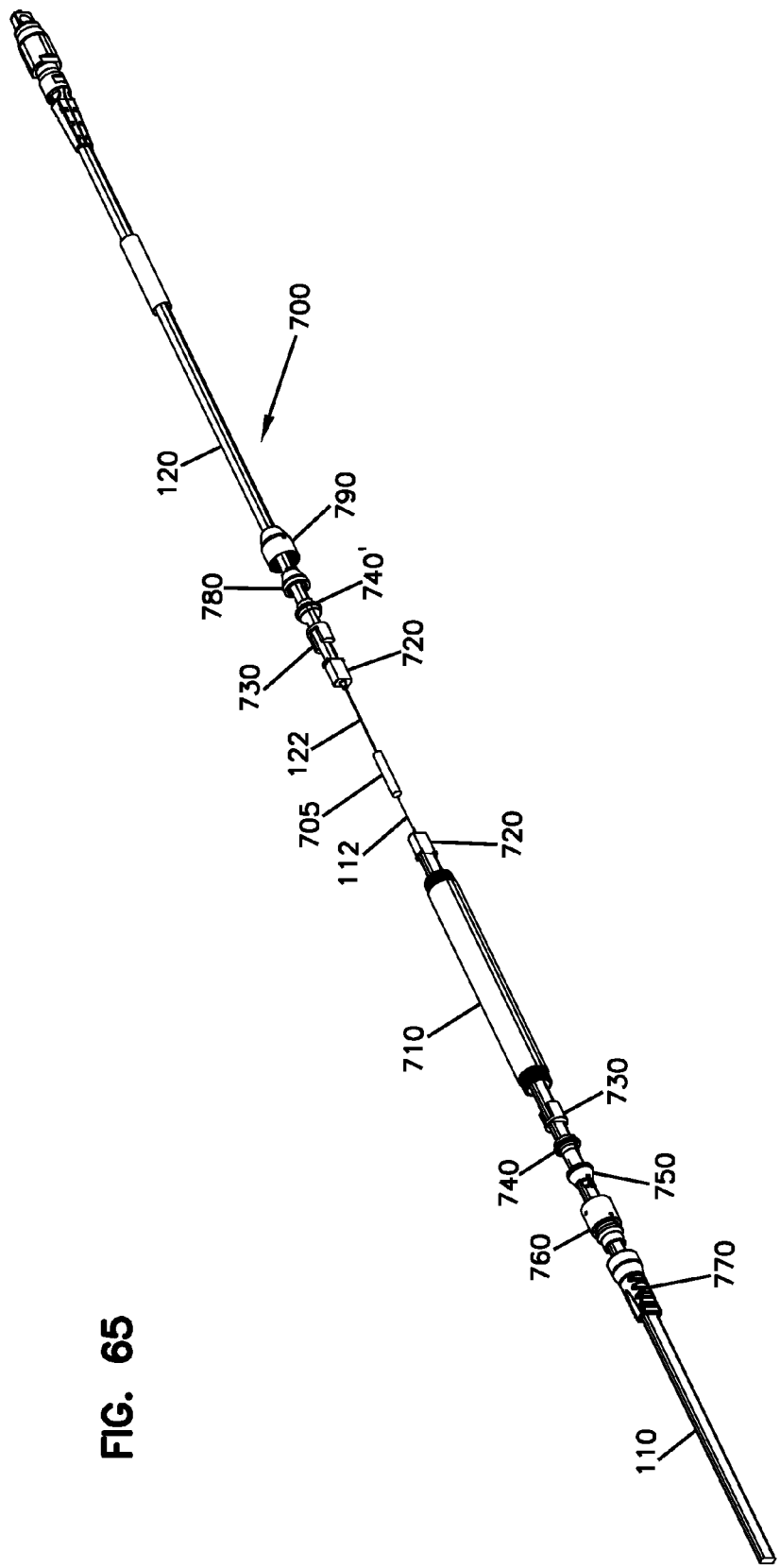
FIG. 65 shows another example implementation of a splice enclosure arrangement suitable for use in coupling together the first ends of the first and second cable segments to form the cable of FIG. 1 in accordance with aspects of the disclosure.
Figure 120:
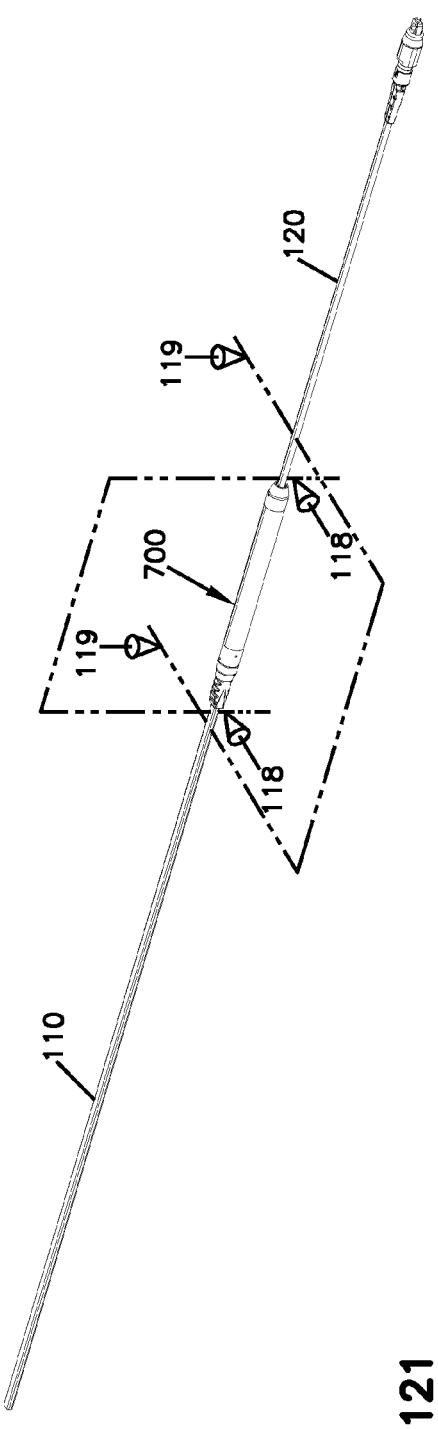
FIG. 120 is a perspective view of the splice enclosure of FIG. 65 assembled over a splice location in accordance with aspects of the disclosure.

Referring to FIGS. 65-120, another example system and process for splicing together the first and second cable segments 110, 120 are shown. FIG. 65 shows another example implementation 700 of a splice enclosure arrangement 140 (FIG. 1) suitable for use in coupling together the first ends 111, 121 of the first and second cable segments 110, 120 to form a cable 100. In the example shown, the splice enclosure arrangement 700 covers a splice location at which at least a first optical fiber 112 of a first example cable 110 is optically coupled to at least a second optical fiber 122 of a second example cable 120.

The example enclosure arrangement 700 includes an enclosure tube 710 (see FIGS. 66-67), a first end cap 760 (see FIGS. 68-74) and a second end cap 790 (see FIG. 75-81) that are configured to attach together to enclose a splice sleeve 705 positioned at the splice location. A cable retention member 720 (FIGS. 84-88) is configured to retain the strength members 117, 127 of each cable segments 110, 120. The cable retention member 720 is sized and shaped to fit within ends the enclosure tube 710. A lock member (FIGS. 90-92)) 730 fits over the cable retention member 720 to secure the cable retention member 720 within the tube 710. For example, the lock member 730 may rotationally lock the cable retention member 720, and hence the cable 110, 120 within the tube 710.

In certain implementations, gaskets 740, 740' (FIGS. 93-100) and stabilizers 750, 780 (FIGS. 101-112) can be positioned between the lock members 730 and the end caps 760, 790, respectively to aid in sealing an interior of the enclosure arrangement 700 from dirt, dust, and other contaminants. In some implementations, a cable strain relief device (e.g., a boot) 770 (FIGS. 113-117) can be mounted to at least the second end cap 780 to protect the first cable segment 110. The cable strain relief device 790 inhibits bending of the optical fibers 112 of the first cable segment 110 beyond a maximum bend radius. The cable strain relief device 770 also aids in transferring side loads. In other implementations, a cable strain relief device 790 also can be provided on or mounted to the first end cap 770 to protect the second cable segment 120.

Figure 66:
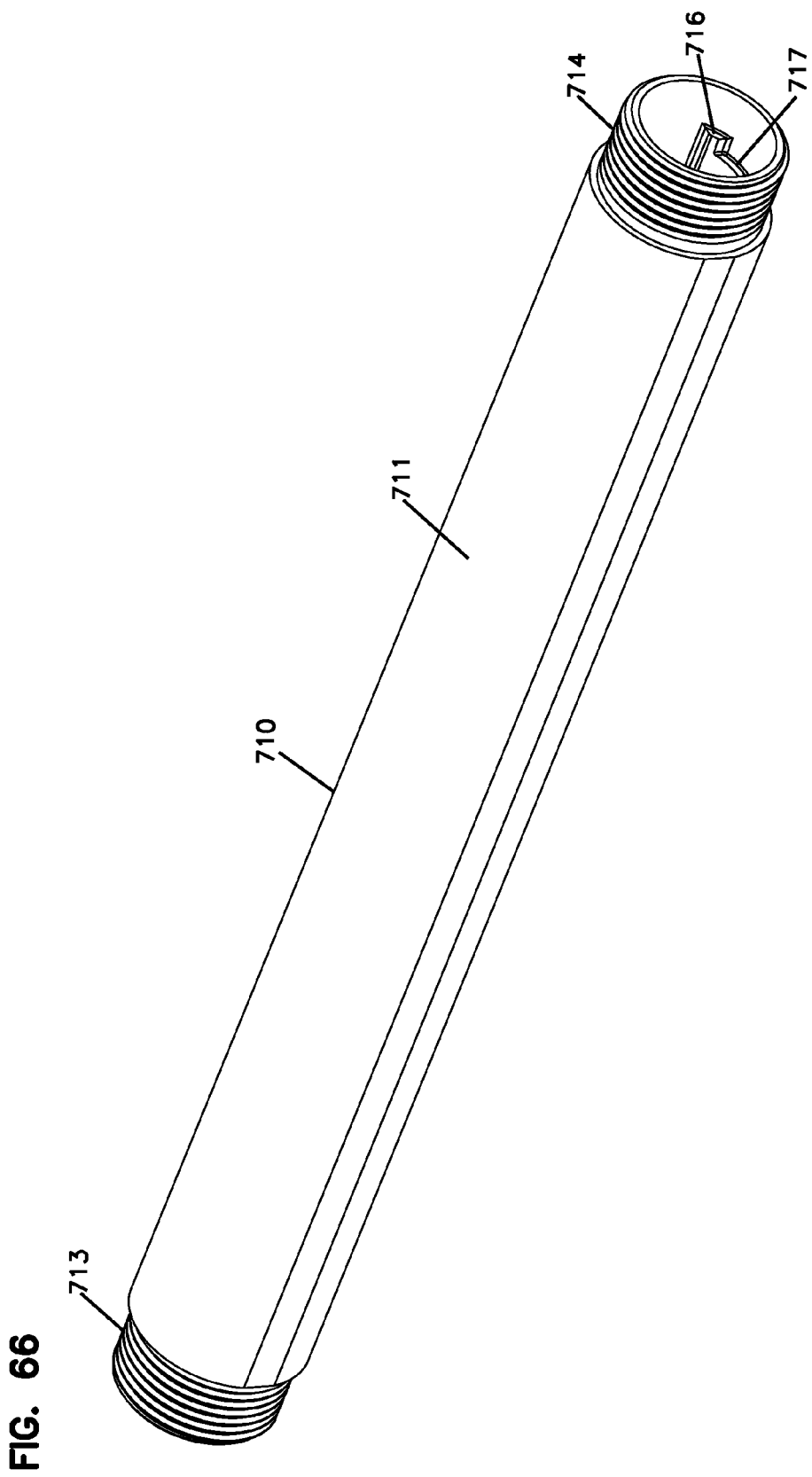
FIGS. 66-67 show an example enclosure tube of the splice enclosure arrangement of FIG. 65 in accordance with aspects of the disclosure.
Figure 67:
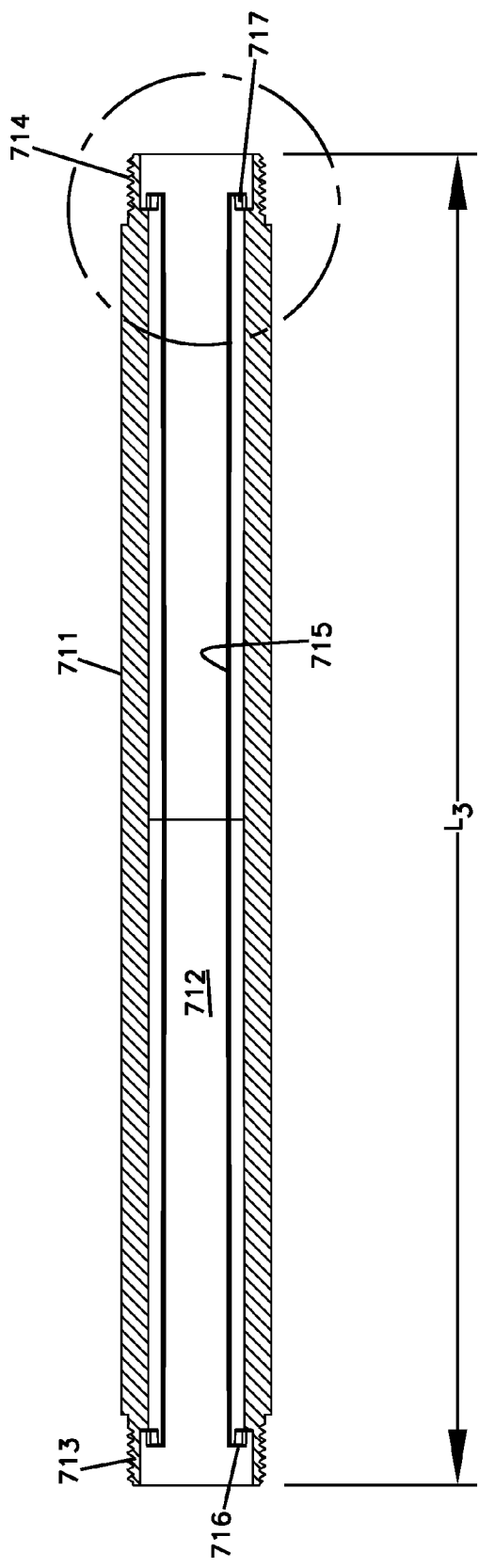
Figure 68:
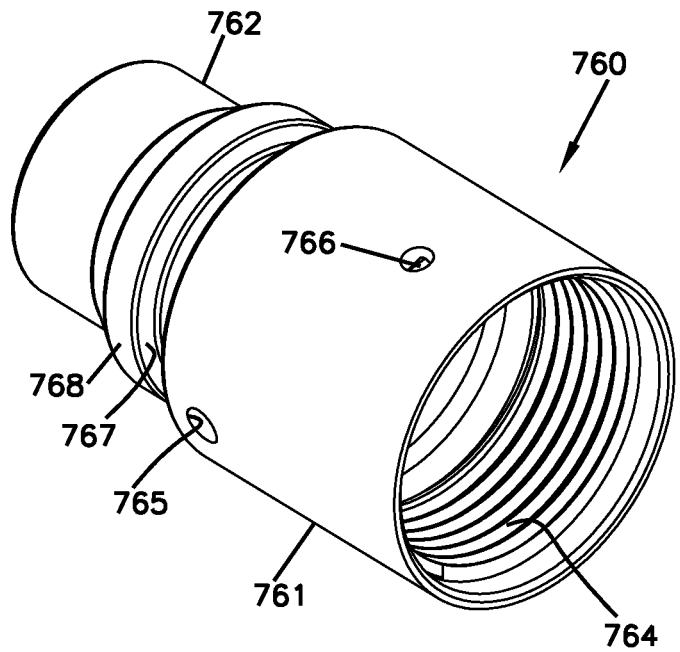
FIGS. 68-74 show an example first end cap of the splice enclosure arrangement of FIG. 65 in accordance with aspects of the disclosure.

FIGS. 66-67 show an example enclosure tube 710 having a generally cylindrical body 711 defining a hollow interior 712. A first end of the tube body 711 defines a first connection region 713 and a second end of the tube body 711 defines a second connection region 714. In some implementations, each connection region 713, 714 has a threaded exterior surface. In other implementations, however, one or both connection regions 713, 714 can define a threaded interior surface. In still other implementations, the connection regions 713, 714 are otherwise shaped and sized to facilitate connection of the tube 710 to the end caps 760, 790.

The tube 710 has a length L3. In some implementations, the length L3 of the tube 710 is within a range of about four inches to about ten inches. Indeed, in some implementations, the length L3 of the tube 710 is within a range of about five inches to about eight inches. In certain implementations, the length L3 of the tube 710 is within a range of about six inches to about seven inches. In one example implementations, the length L3 of the tube 710 is about six inches.

FIGS. 68-74 show an example first end cap 760 includes a first section 761 and a second section 762 defining a through-passage 763 that extends between two open ends. The first section has an external diameter D1 that is larger than an external diameter D2 of the second section 762. The internal diameter of the end cap 760 varies along a longitudinal axis $A_L$ of the end cap 760. However, each section of the through-passage 732 has a sufficient diameter to receive and slide along a jacketed portion of the first cable segment 110.

The interior surface of the first section 761 defines a threaded region 764. The threaded region 764 is configured to screw onto the first connection region 713 of the enclosure tube 710 to mount the first end cap 760 to the enclosure tube 710. Accordingly, the diameter of the first section 761 of the first end cap 760 is sufficiently large to fit over the first connection region 713 of the tube 710. In other implementations, however, the first section 716 of the end cap 760 can define a narrower end having a threaded exterior surface that screws into interior threading at the first end of the enclosure tube.

In some implementations, the first section 761 defines one or more first through-holes 765 extending radially through the first section 761. The first through-holes 765 are configured to facilitate threading the first end cap 760 onto the first connection region 713 of the tube 710. For example, the first through-holes 765 may be sized and shaped to allow the end cap 760 to be installed using a torque wrench. In the example shown, the first section 761 defines two first through-holes 765 positioned across from each other at a generally intermediate portion of the end cap 760 (see FIGS. 70 and 74).

In some implementations, the first section 761 defines one or more second through-holes 766 extending radially through the first section 761. In the example shown, the first section 761 includes a single second through-hole 766 (see FIG. 72). The second through-hole 766 is configured to facilitate the insertion of epoxy between the threaded region 764 of the first end cap 760 and the connection region 713 of the tube 710. Application of the epoxy may aid in retaining the first end cap 760 on the first connection region 713 despite vibration, pulling, or other mechanical stress applied to the splice enclosure 700.

Figure 73:
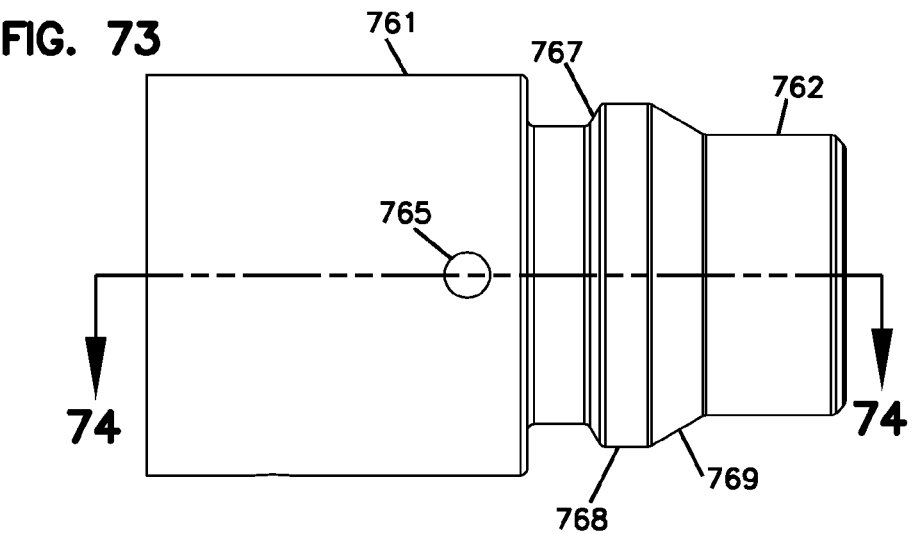
Figure 74:
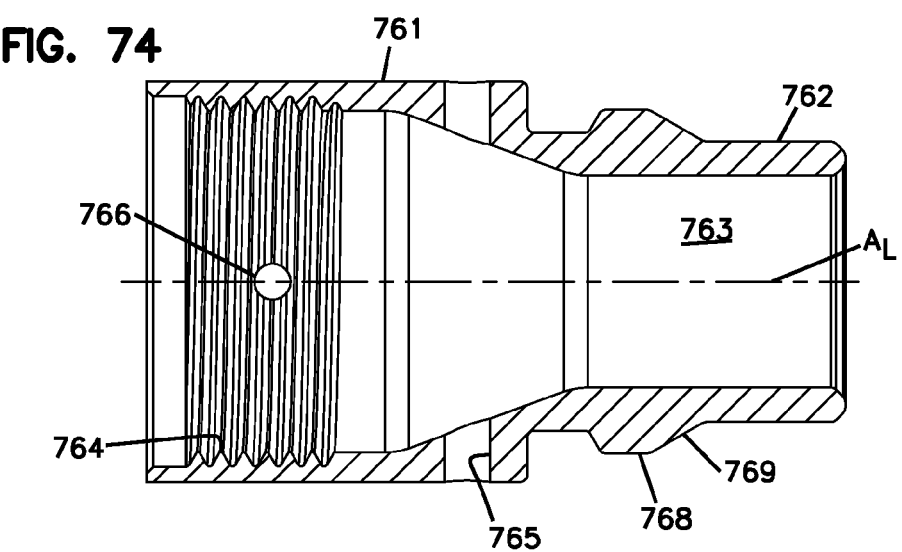
Figure 72:
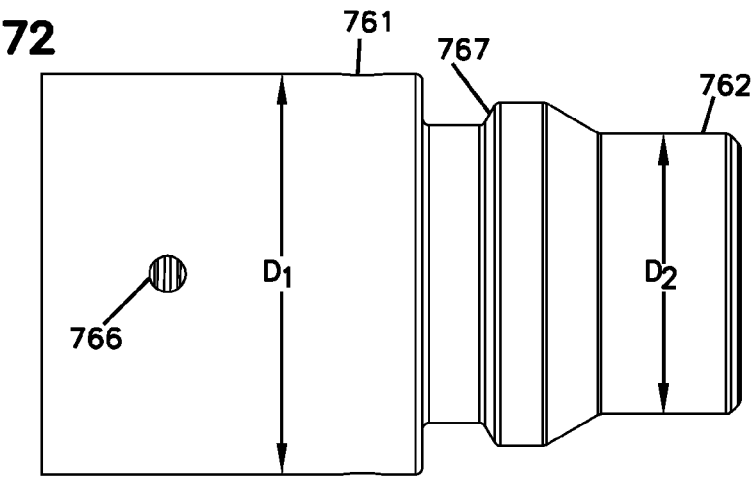
Figure 76:
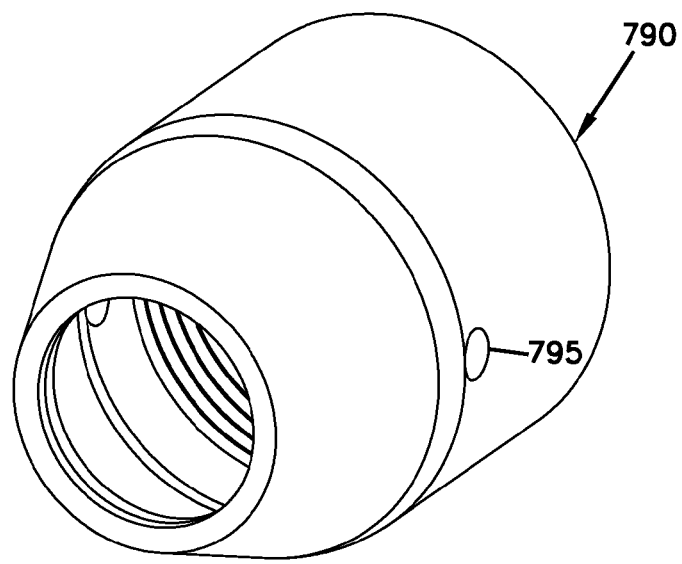
Figure 77:
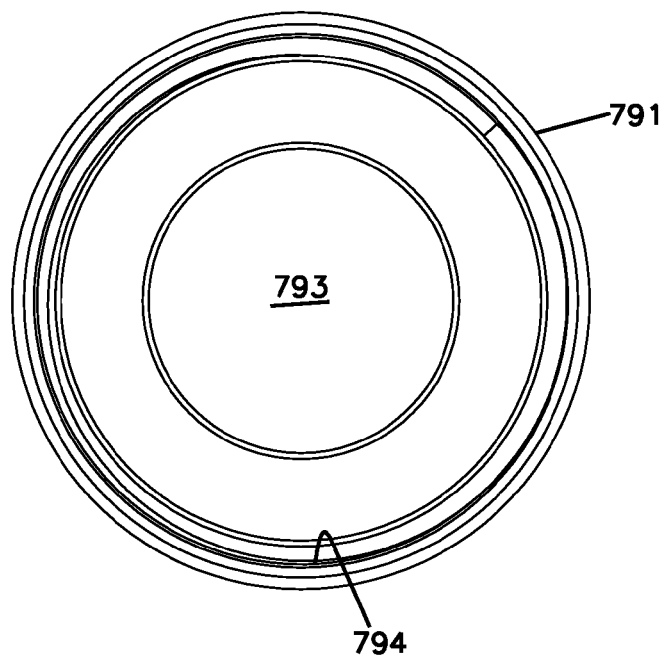
Figure 78:
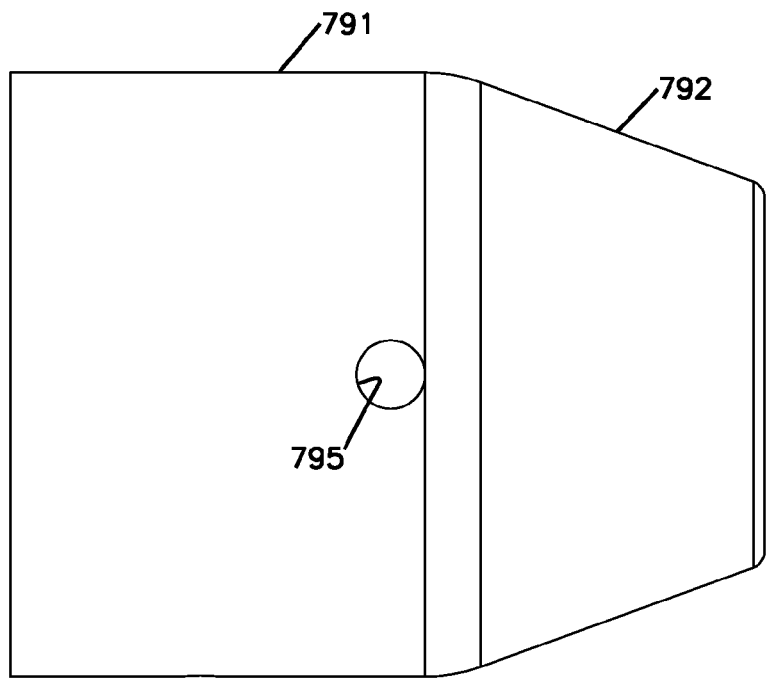
Figure 79:
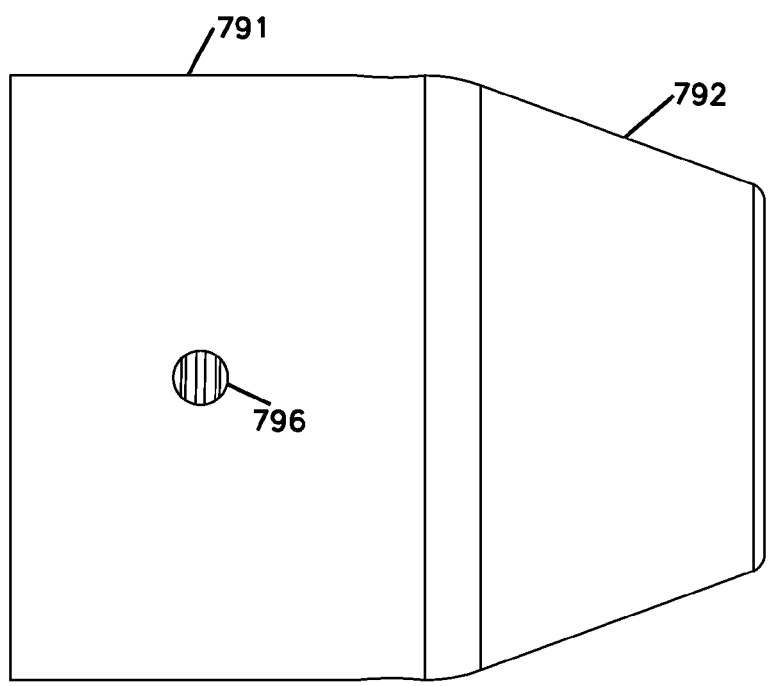
Figure 80:
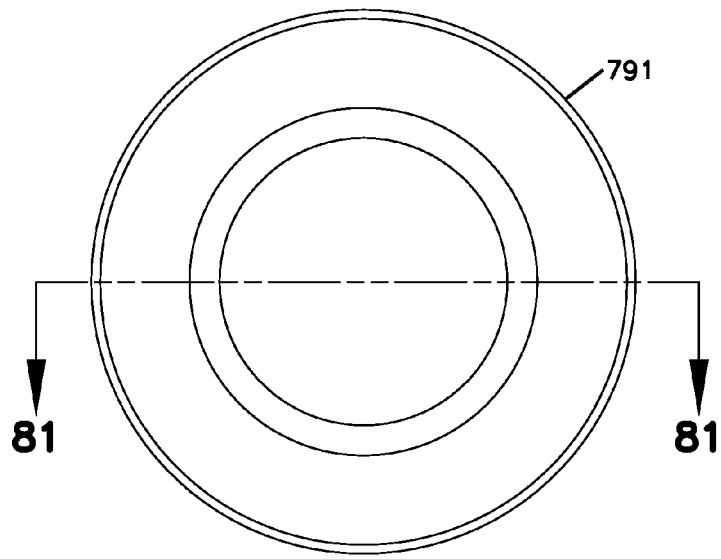
Figure 81:
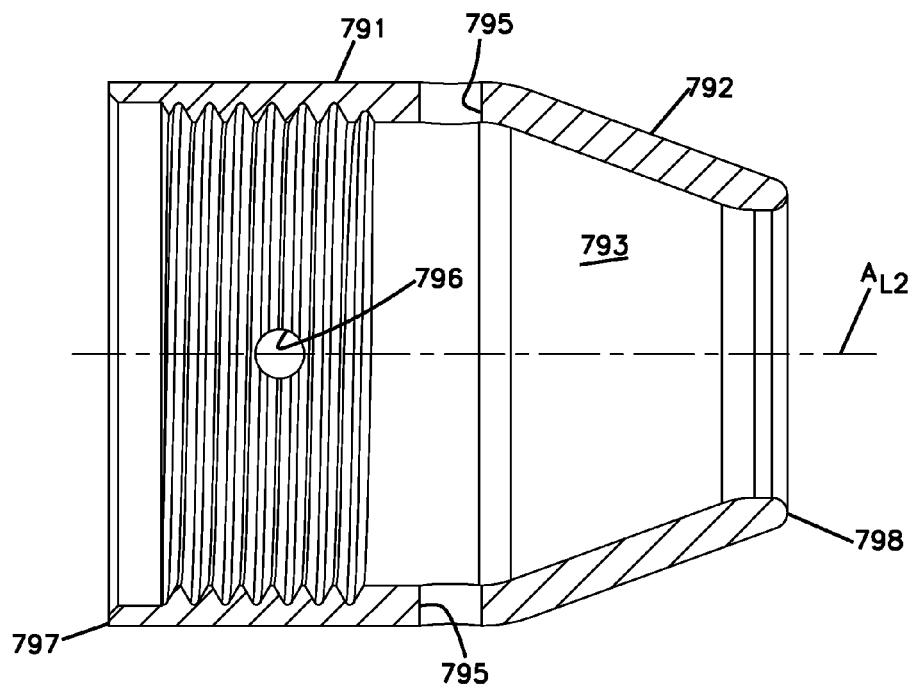
Figure 82:
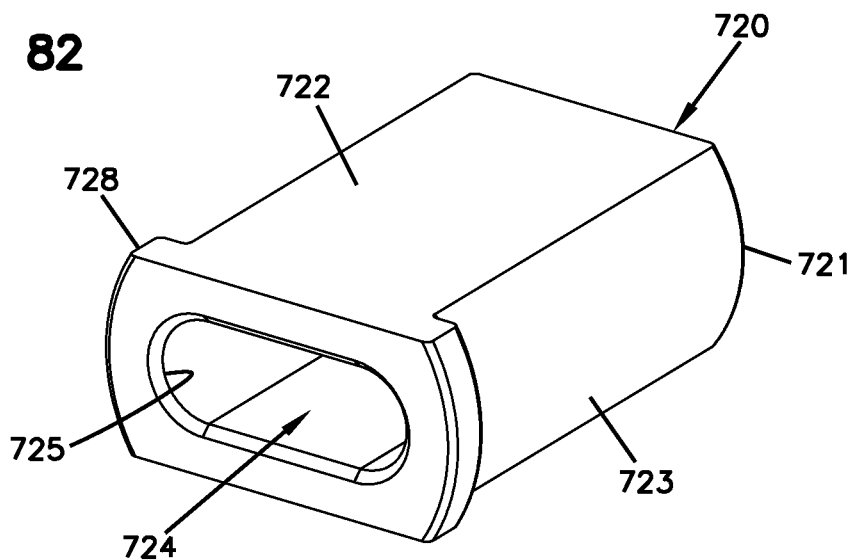
FIGS. 82-86 show one example cable retention member suitable for use in securing the cable segments to the splice enclosure arrangement of FIG. 65 in accordance with aspects of the disclosure.
Figure 83:
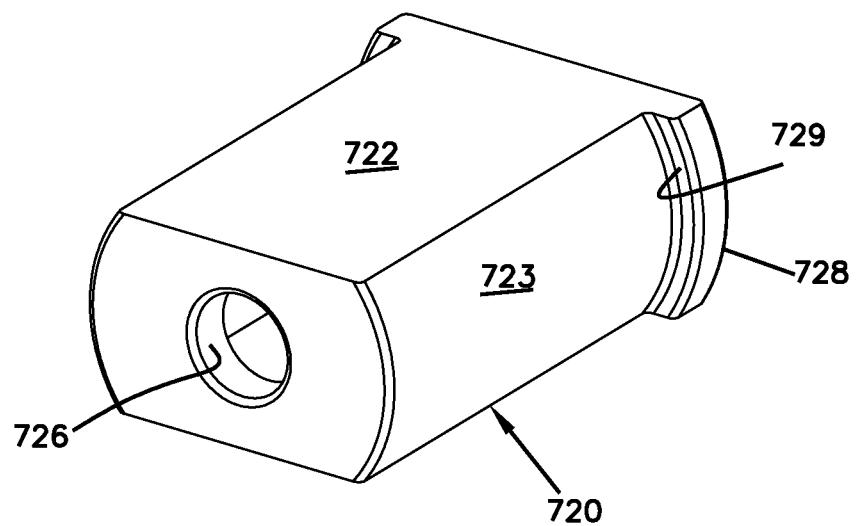
Figure 85:
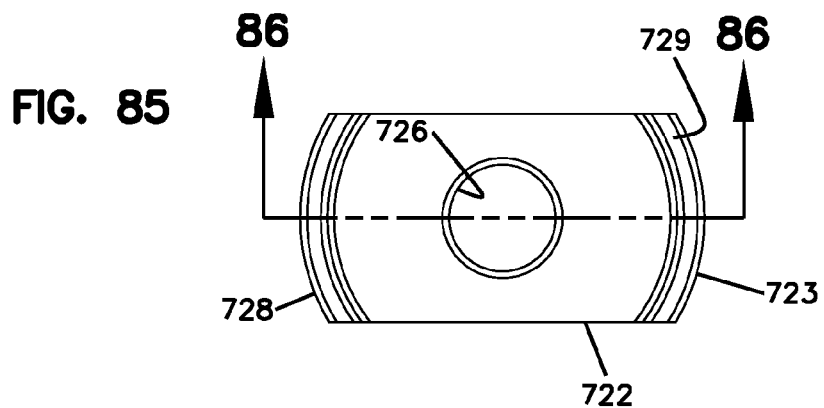
Figure 86:
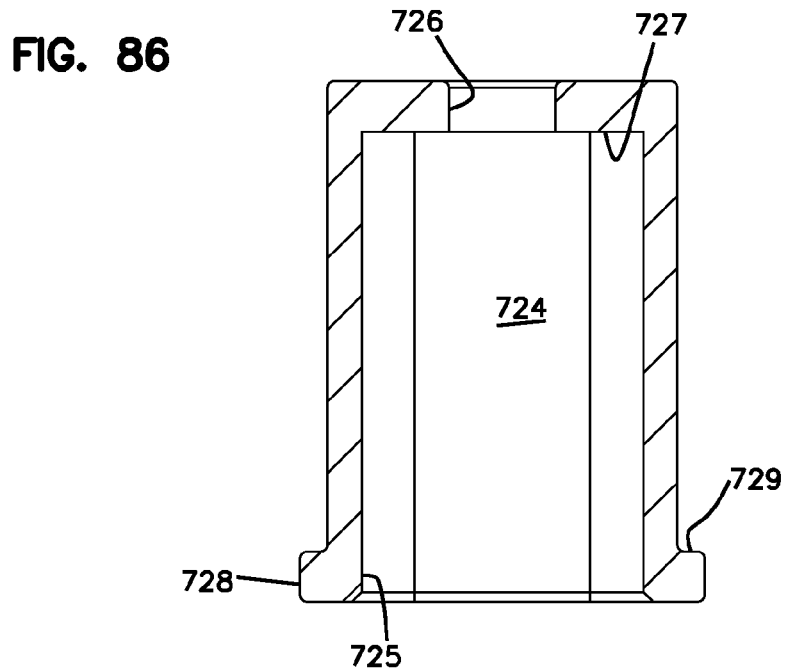
Figure 84:
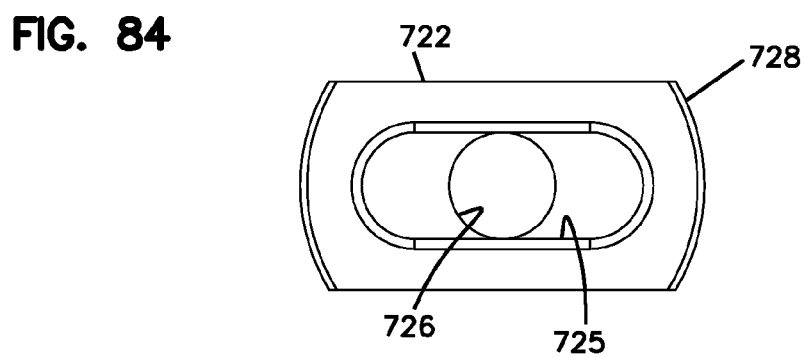

The first end cap 760 also includes an annular bulge portion extending circumferentially around an intermediate portion of the second section 762. The bulged portion aids in retaining the strain relief device 770 to the first end cap 760. The bulged portion defines a first surface 767 that tapers radially outwardly from the second section 762, a second surface 768 that extends generally parallel with the second section 762, and a third surface 769 that tapers radially inwardly to the second section 762 (FIGS. 72-73). The flat second surface 768 is located between the two tapered surfaces 767, 769.

FIGS. 75-81 show an example second end cap 790 including a first section 791 and a second section 792 that define a through-passage 793 extending from an open first end 797 to an open second end 798. The second section 792 defines a frustro-conical surface that tapers radially inwardly from the first section 791. The internal diameter of the end cap 790 varies along a longitudinal axis $A_{L2}$ of the end cap 790. However, each section of the through-passage 793 has a sufficient diameter to receive and slide along a jacketed portion of the second cable segment 120.

Figure 75:
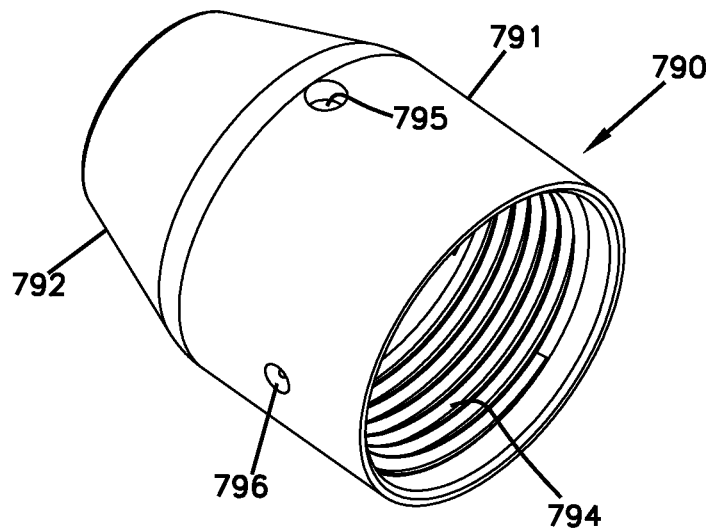
FIGS. 75-81 show an example second end cap of the splice enclosure arrangement of FIG. 65 in accordance with aspects of the disclosure.
Figure 69:
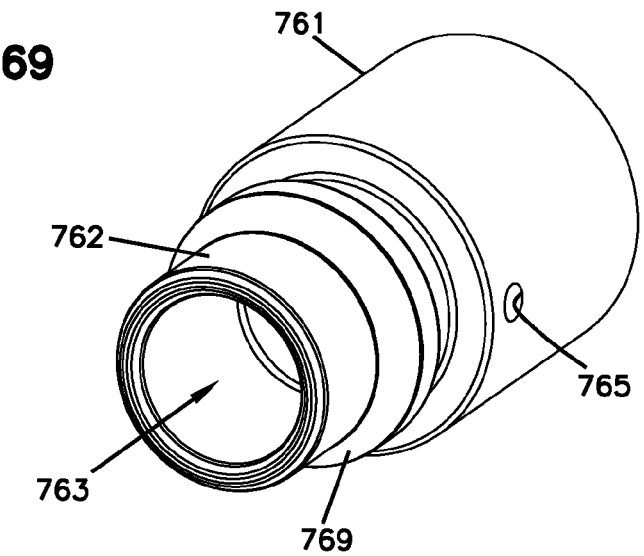
Figure 71:
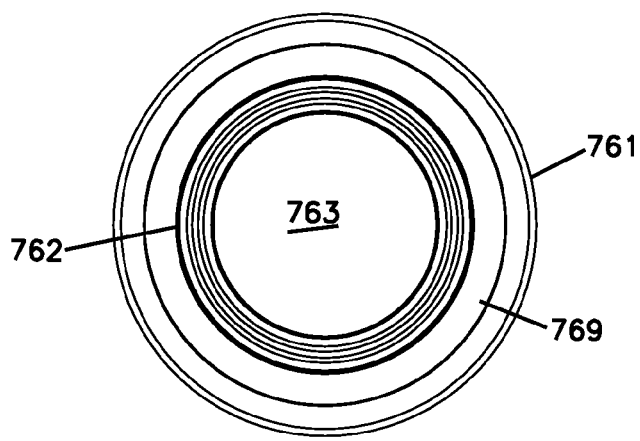
Figure 70:
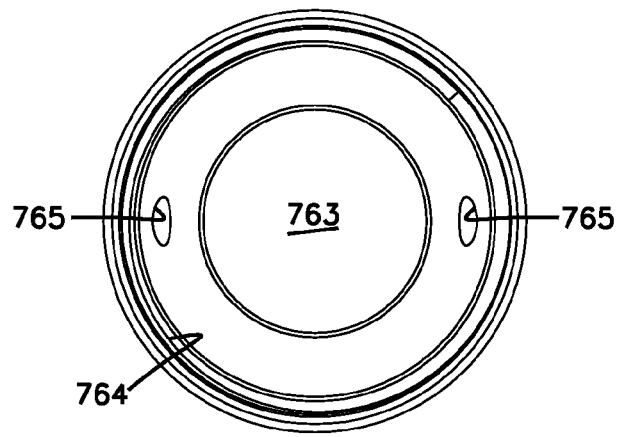

The first section 791 defines a generally flat exterior surface and a threaded interior surface 794 (FIG. 75). The threaded surface 794 is configured to screw onto the second connection region 714 of the enclosure tube 710 to mount the second end cap 790 to the enclosure tube 710. Accordingly, the diameter of the first end 797 of the second end cap 790 is sufficiently large to fit over the second connection region 714. In other implementations, however, the second end cap 790 can define a narrower first end 797 having a threaded exterior surface that screws into interior threading at the first end of the enclosure tube.

In some implementations, the first section 791 defines one or more first through-holes 795 extending radially through the first section 791. The first through-holes 795 are configured to facilitate threading the second end cap 790 onto the second connection region 714 of the tube 710. For example, the first through-holes 795 may be sized and shaped to allow the second end cap 790 to be installed using a torque wrench. In the example shown, the first section 791 defines two first through-holes 795 positioned across from each other at a generally intermediate portion of the end cap 790 (see FIGS. 76, 78, and 81).

In some implementations, the first section 791 defines one or more second through-holes 796 extending radially through the first section 791. In the example shown, the first section 791 includes a single second through-hole 796 (see FIG. 79). The second through-hole 796 is configured to facilitate the insertion of epoxy between the threaded region 794 of the second end cap 790 and the connection region 714 of the tube 710. Application of the epoxy may aid in retaining the first end cap 790 on the first connection region 714 despite vibration, pulling, or other mechanical stress applied to the splice enclosure 700.

FIGS. 82-86 show one example implementation of a cable retention member 720 suitable for use in securing the first cable segment 110 and/or the second cable segment 120 to the tube 710 of the splice enclosure arrangement 700. A first cable retention member 720 secures the first cable segment 110 to the tube 710 and a second cable retention member 720 secures the second cable segment 120 to the tube 710. In accordance with some aspects, the first retention member 720 may be identical to the second retention member 720. In other implementations, the internal dimensions and/or internal shape of the first and second cable retention members may differ based on the dimensions and shapes of the cable segments 110, 120.

In accordance with some aspects, the cable retention member 720 includes a body 721 having opposing first sides 722 interconnected by opposing second sides 723. In the example shown, the first sides 722 define planar external surfaces and the second sides 723 define convexly curved external surfaces. In another implementation, the sides 722, 723 define external surfaces of the same shape (e.g., both flat, both rounded, etc.). In other implementations, however, the first and second sides may define other types of surface.

The first and second sides 722, 723 extend between first and second open ends 725, 726 to define a through-passage 724. The first open end 725 of the retention body 721 is sized and shaped to receive at least one optical fiber 112, 122 and at least one strength member 117, 127 of one of the cables 110, 120. In some implementations, the first open end 725 defines an oblong shape. In other implementations, the first end 725 may be circular, elliptical, obround, or any other desired shape.

The second open end 726 is smaller than the first open end 725. The second open end 726 is sized and shaped to enable passage of at least one optical fiber 112, 122 therethrough. In certain implementations, the second open end 726 is sized and shaped to enable passage of a buffer tube surrounding the at least one optical fiber, such as buffer tube 124 of cable segment 120. In the sample shown, the second end 726 is circular. In other implementations, the first end 725 may be elliptical, oblong, obround, or any other desired shape.

The strength members 117, 127 of the cable segments 110, 120 extend through the passage 724 from the first open end 725 toward the second open end 726. The cable retention body 721 defines an internal shoulder 727 that aid in defining the second open end 726. The internal shoulders 727 inhibit passage of the strength members 117, 127 through the second end 726 of the retention body 721. For example, the strength members 117, 127 may abut the internal shoulders 727.

In certain implementations, the strength members 117, 127 may be affixed within the retention member 720 using epoxy or other adhesive. In some implementations, the optical fiber 122 inserted through the retention member 720 is surrounded by a buffer tube 124. In some such implementations, the buffer tube 124 completely through the passage 724 so that a length of the buffer tube 124 extends past the second end 726. The buffer tube 124 protects the at least one optical fiber 122 from being coated in the epoxy or other adhesive.

In some implementations, the strength members 117, 127 include strength member fibers that have a coating that does not bond well with adhesives. In some such implementations, the strength member fibers may be oxidized prior to being coated with adhesive and inserted into the retention member 720. The oxidation removes a binder from the strength member fibers, which enhances the ability of the adhesive to bond to the strength member fibers.

The retention member body 721 includes side projections 728 extending laterally outwardly from the first end 725 of the body 721. The side projections 728 have a curvature that matches the curvature of the second sides 723 of the retention member body 721 (see FIGS. 82, 83, and 85). In the example shown, the side projections 728 are flush with the first end 725 of the retention body 721 (see FIG. 82). The side projections 728 define abutting surfaces 729 facing toward the second end 726 of the retention member body 721 (see FIGS. 83 and 86).

Figure 88:
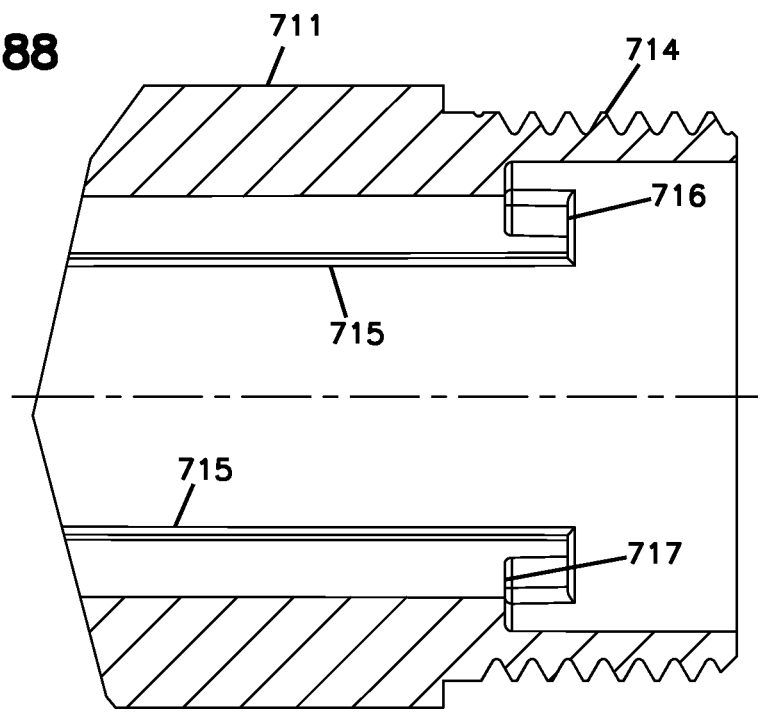
FIG. 88 shows an enlarged sectional view of the enclosure tube of FIGS. 65-67 to show the ledge and shoulders in accordance with aspects of the disclosure.
Figure 87:
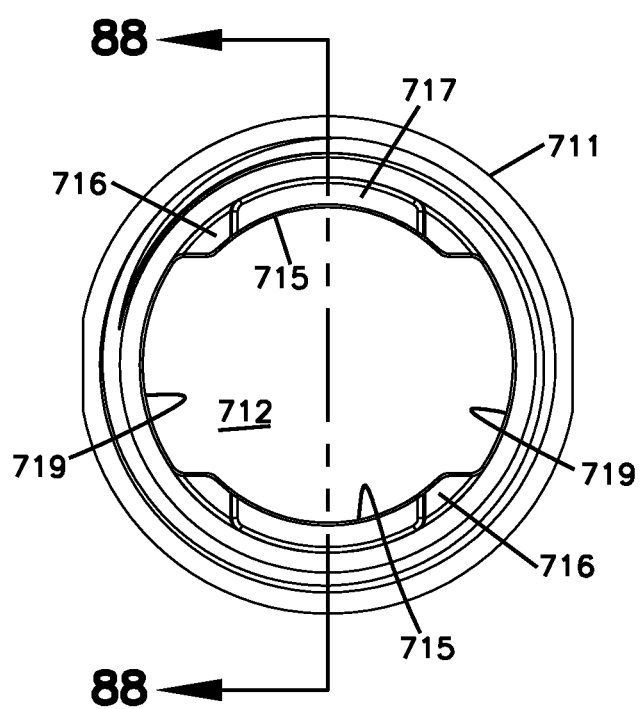
FIG. 87 shows an end view of the enclosure tube of FIGS. 65-67 so that the ledge and shoulders are visible in accordance with aspects of the disclosure.
Figure 89:
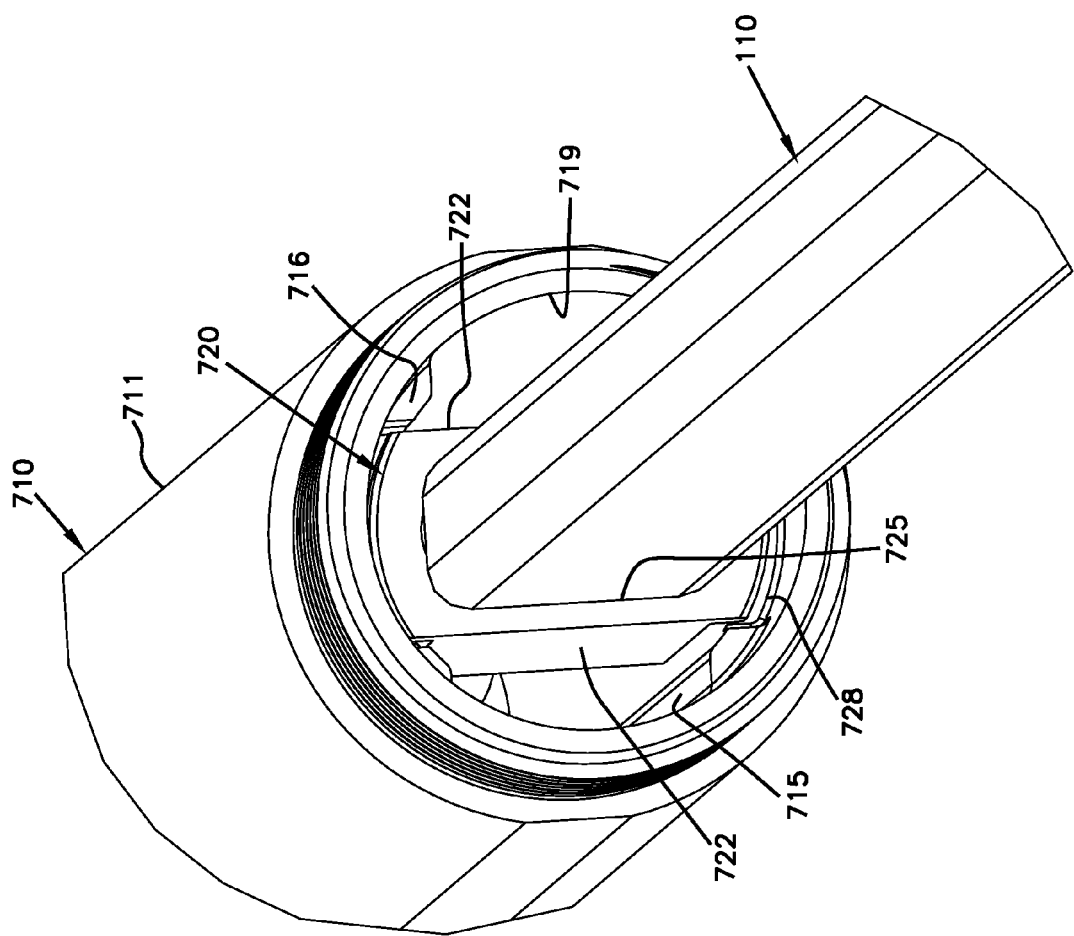
FIG. 89 shows an enlarged sectional view of an end of the enclosure tube of FIGS. 65-67 with a cable retention member receiving a cable segment and positioned within the enclosure tube in accordance with aspects of the disclosure.

FIGS. 87-89 illustrate how the example retention member 720 secures a cable segment 110, 120 to the tube 710. In some implementations, a retention member 720 secures one cable segment 110 to one end of the tube 710 and the other cable segment 120 to the other end of the tube 710. In certain implementations, an example retention member 720 is configured to move axially through the tube 710 when positioned in a pass-through orientation and is configured to secure to an end of the tube 710 when positioned in a locking orientation. In certain implementations, the locking orientation is rotated about 90° relative to the pass-through orientation.

The tube 710 may be mounted to one of the cable segments 110, 120 prior to splicing together the optical fibers 112, 122 and subsequently slid over the splice. Before splicing together the fibers, each retention member 720 is secured to the respective cable segment 110, 120. To position the tube 710 over the splice location, one of the retention members 720 is positioned in a pass-through orientation relative to the tube 710 and slid through the tube 710. When the tube 710 is positioned around the splice location, the retention members 720 are positioned in the locking orientation on opposite sides of the tube 710.

FIG. 87 shows an end view of the enclosure tube 710. The internal sides 719 of the tube 710 have a sufficient diameter to accommodate the projections 728 of the retention member 720. At least a first raised track 715 extends longitudinally along an internal surface 719 of the tube 710. The track 715 protrudes radially inwardly into the through-passage 712 from the internal surface 719. In the example shown, first and second raised tracks 715 extend along opposing sides of the through-passage 712. The gap between the first and second tracks 715 is not sufficient to accommodate the projections 728 of the retention member 720.

In certain implementations, the sides of each track 715 extend farther toward the ends of the tube 710 than an intermediate portion of the track 715, thereby forming shoulders 716 bounding a ledge 717 (see FIGS. 87-88). The engagement between the side projections 728 of the retention members 720 and the ledges 717 of the tracks 715 inhibit movement of the cable retention member 720 farther into the tube 710. The shoulders 716 of the tracks 715 retain the side projections 728 in alignment with the ledges 717. For example, the shoulders 716 inhibit rotation of the retention member 720 out of alignment with the tracks 715.

In some implementations, the tracks 715 extend less than completely though the passage 712. For example, in some implementations, the tracks 715 terminate along the internal surface of the connecting regions 713, 714 of the tube 710. In other implementations, however, the tracks 715 may terminate prior to reaching the connecting regions 713, 714. In one implementation, the sides of each track 715 taper toward the internal surface 719 of the tube 710.

Accordingly, a retention member 720 may be slid completely through the tube 710 from one end to another when the retention member 720 is positioned in the pass-through orientation (i.e., when the projections 728 are oriented out of alignment with the ledges 717). The retention member 720 may not be slid completely through the tube 710 from one end to another when the retention member 720 is positioned in the locking orientation. When the retention member 720 is positioned in the locking orientation (see FIG. 89), the side projections 728 of the retention member body 721 are sized and shaped to abut the tracks 715.

For example, as shown in FIG. 89, the retention member body 721 is positioned in the tube 710 so that the side projections 728 of the body 721 fit on the ledges 717 between the shoulders 716 of the tracks 715. The abutting surface 729 of each side projection 728 of the retention member 720 seats on the ledge 717 of one of the tracks 715 of the tube 710. Accordingly, the tracks 715 inhibit axial movement of the retention member body 721 through the tube 710 when the retention member 720 is positioned in a locking orientation. The shoulders 716 inhibit rotation of the retention member 720 from the locking orientation to the pass-through orientation.

In the example shown in FIG. 89, an example cable retention member 720 is positioned in a locking orientation relative to the enclosure tube 710 to secure the first cable segment 110 to the first end 713 of the enclosure tube 710. The strength members 117 and optical fibers 112 extend into the retention member body 721 through the first end 725 of the retention member body 721. The strength members 117 extend toward the internal shoulders 727 of the retention member body 721 and the optical fibers 112 extend through the second end 726 of the body 721.

Figure 90:
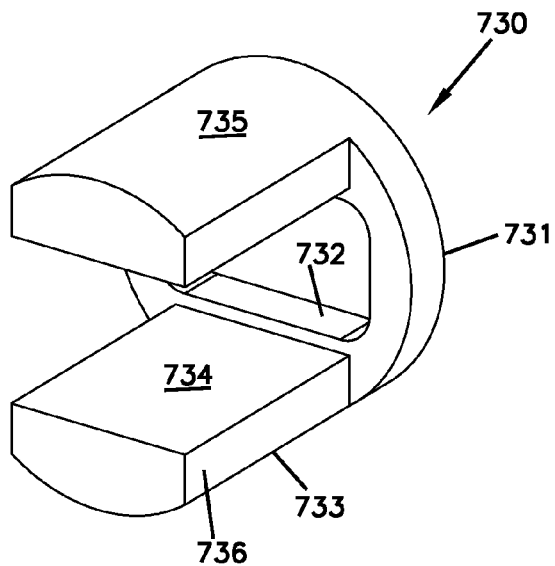
FIGS. 90-92 show one example lock member of the splice enclosure arrangement of FIG. 65 in accordance with aspects of the disclosure.
Figure 92:
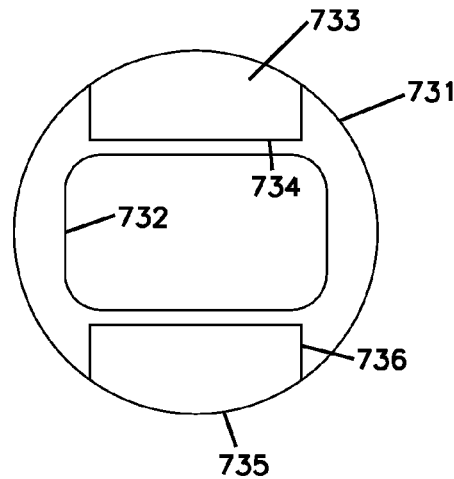
Figure 91:
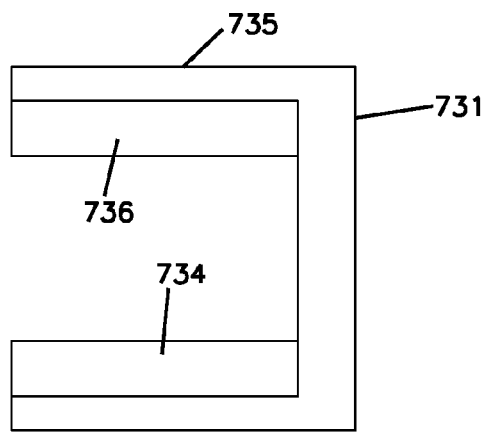
Figure 93:
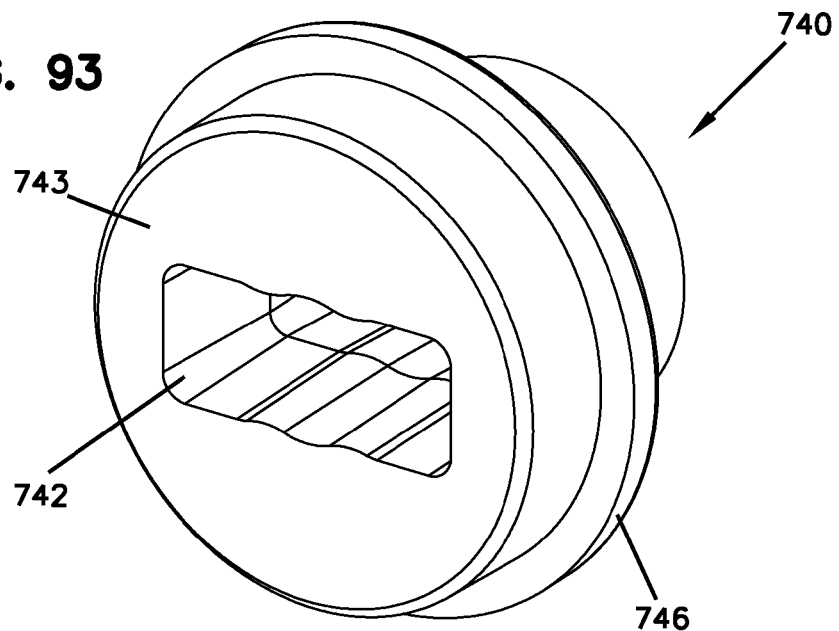
FIGS. 93-96 show one example gasket suitable for use in sealing an end of the enclosure tube of the splice enclosure arrangement of FIG. 65 in accordance with aspects of the disclosure.
Figure 94:
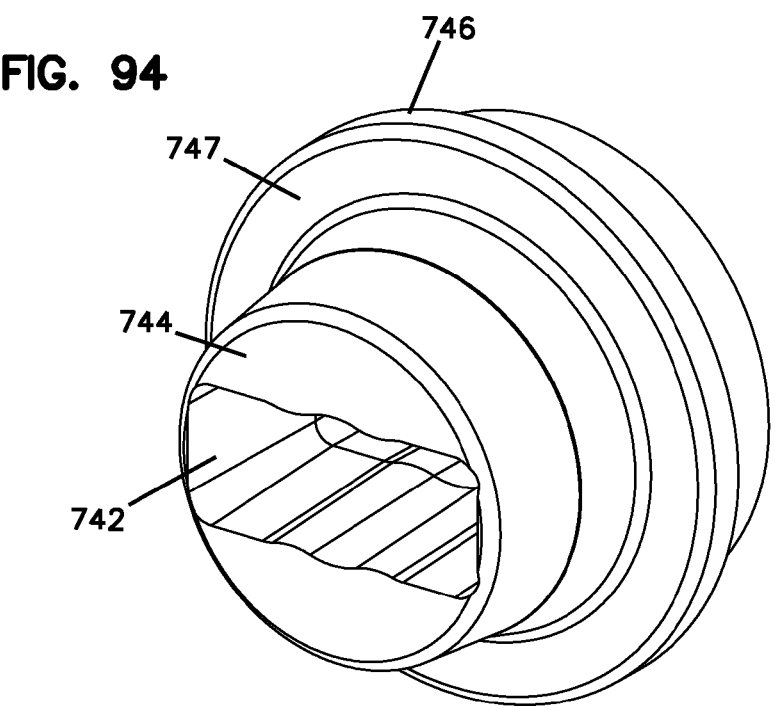
Figure 95:
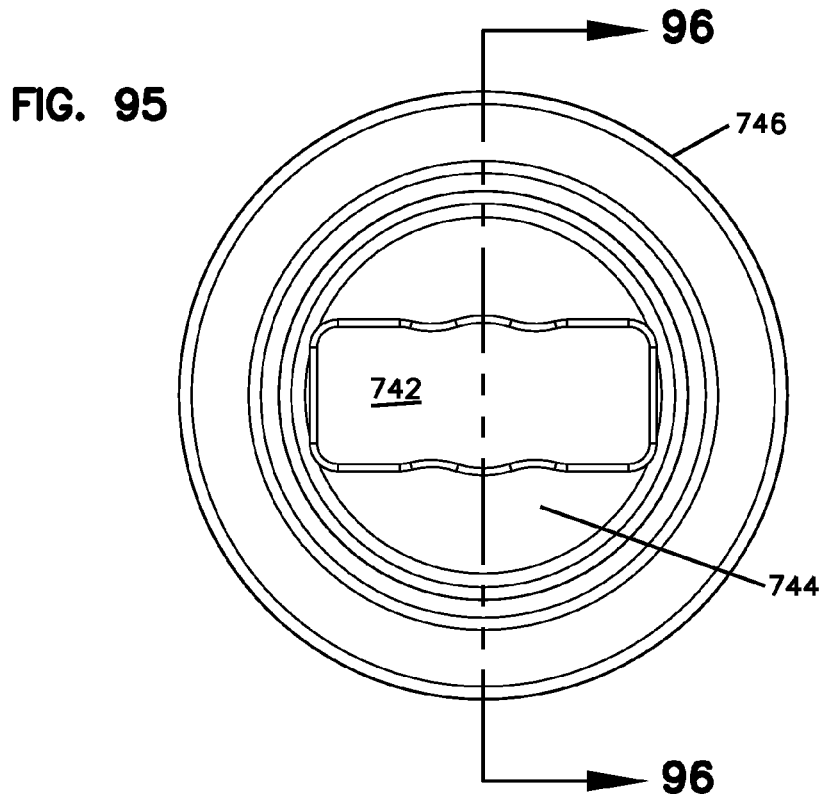
Figure 96:
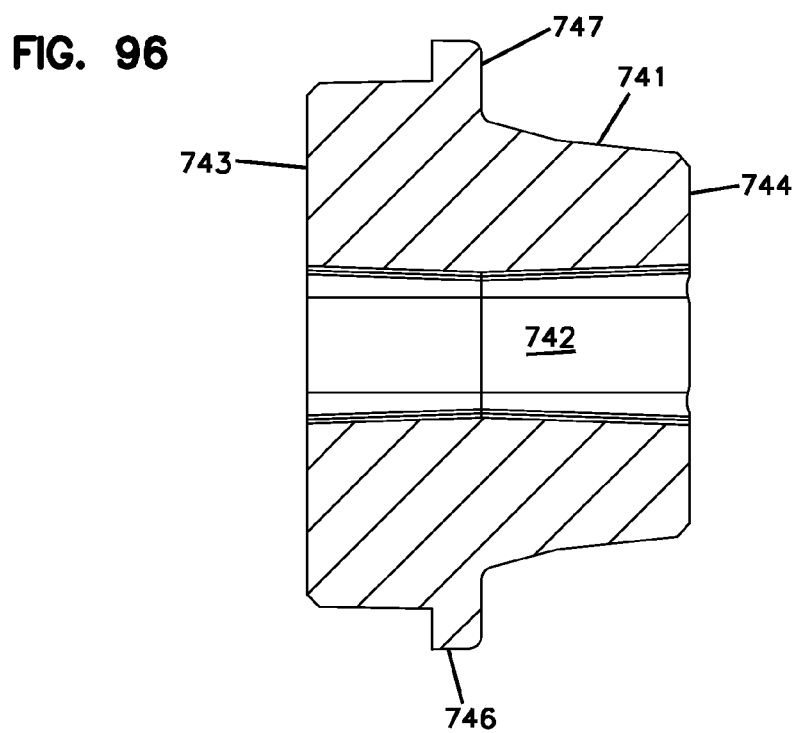
Figure 98:
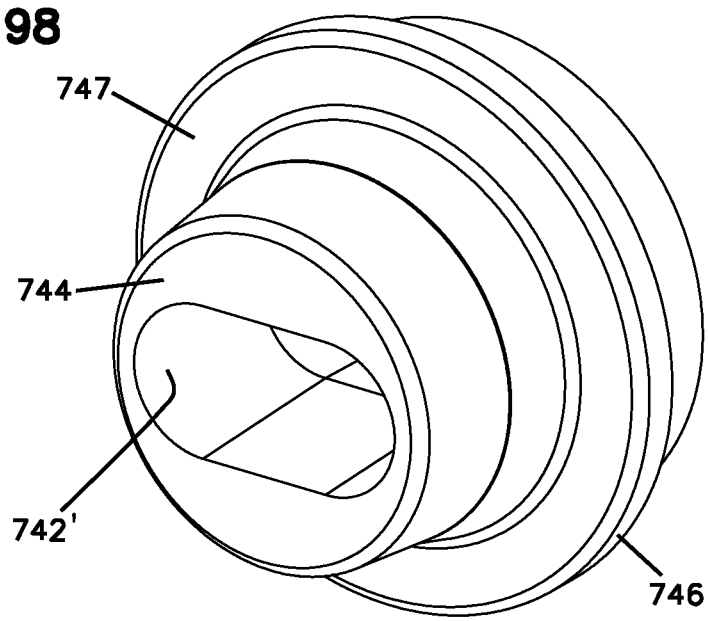
FIGS. 97-100 show another example gasket suitable for use in sealing an end of the enclosure tube of the splice enclosure arrangement of FIG. 65 in accordance with aspects of the disclosure.
Figure 97:
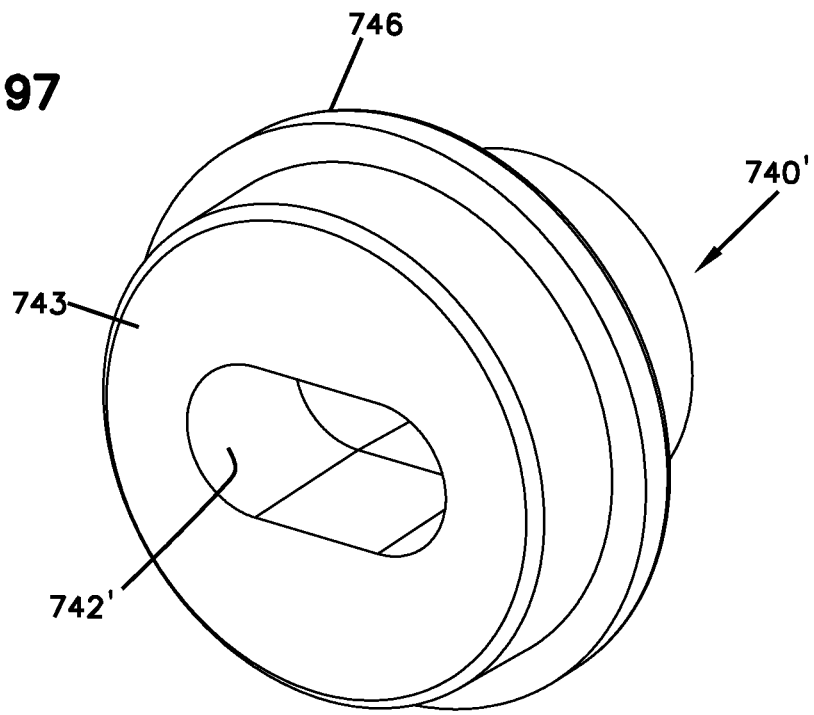
Figure 99:
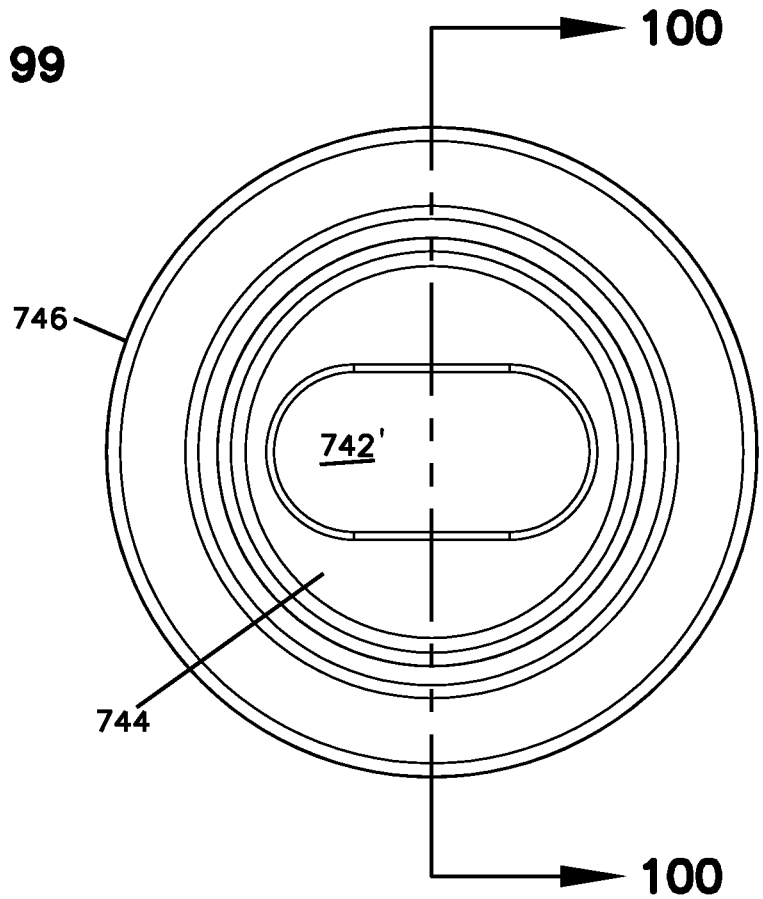
Figure 100:
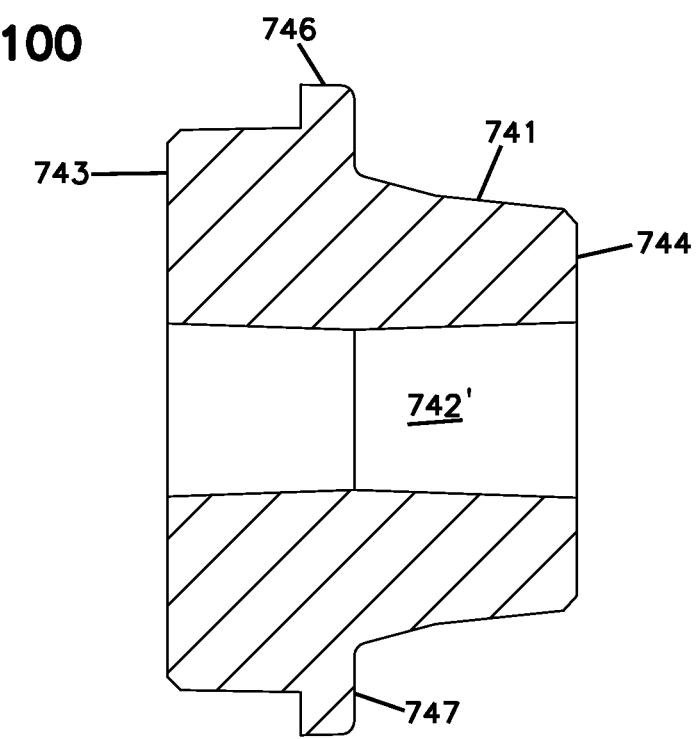
Figure 102:
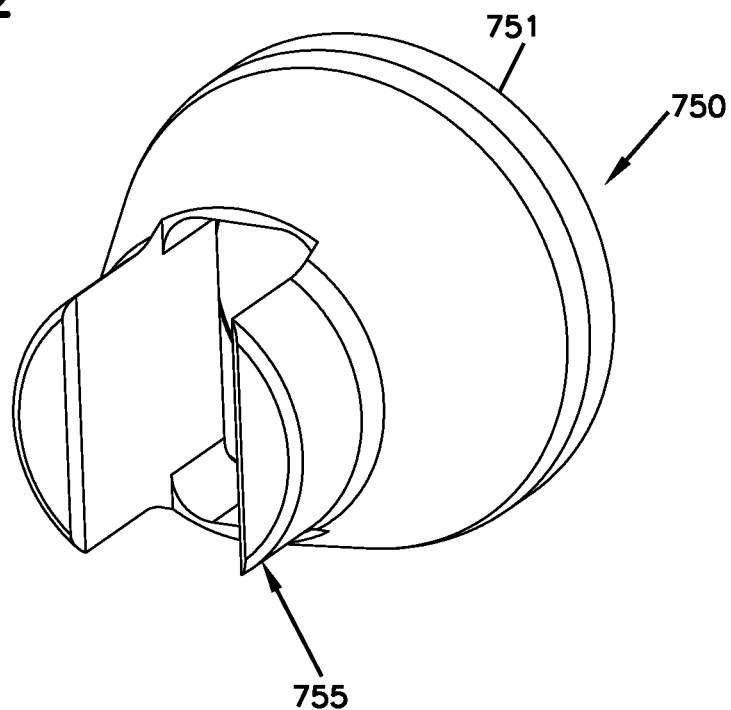
FIGS. 101-106 show one example stabilizer of the splice enclosure arrangement of FIG. 65 in accordance with aspects of the disclosure.
Figure 101:
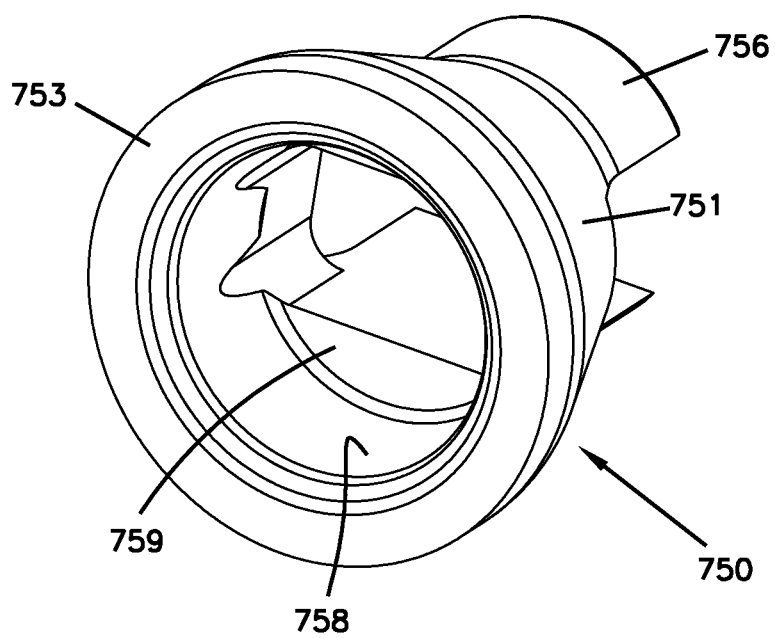
Figure 104:
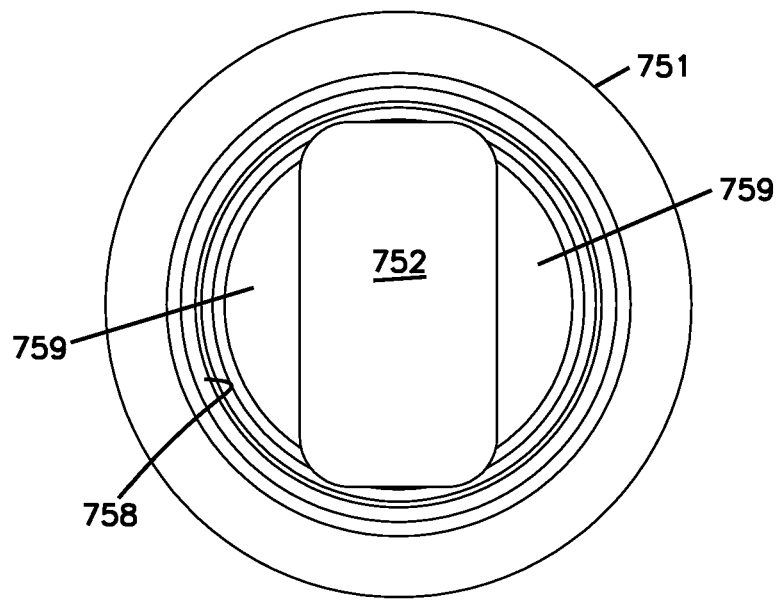
Figure 103:
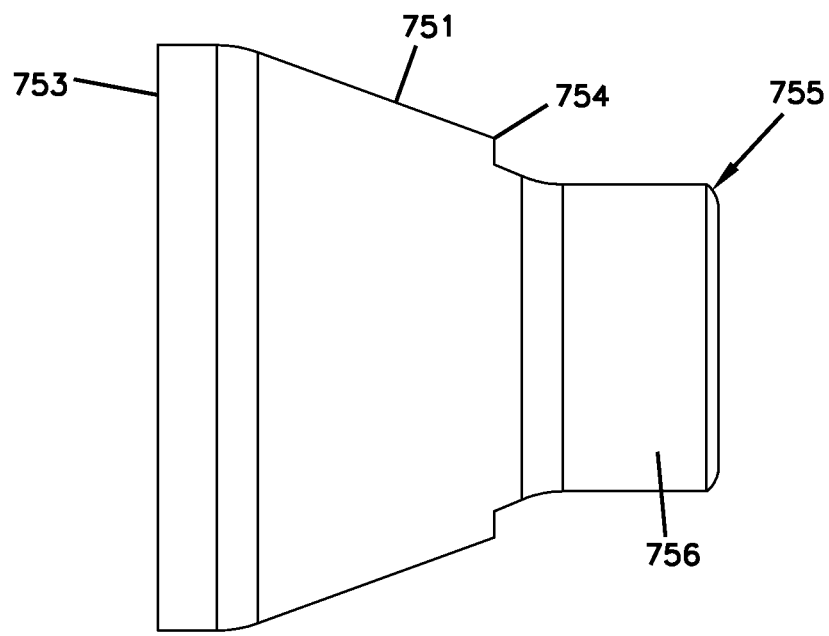
Figure 105:
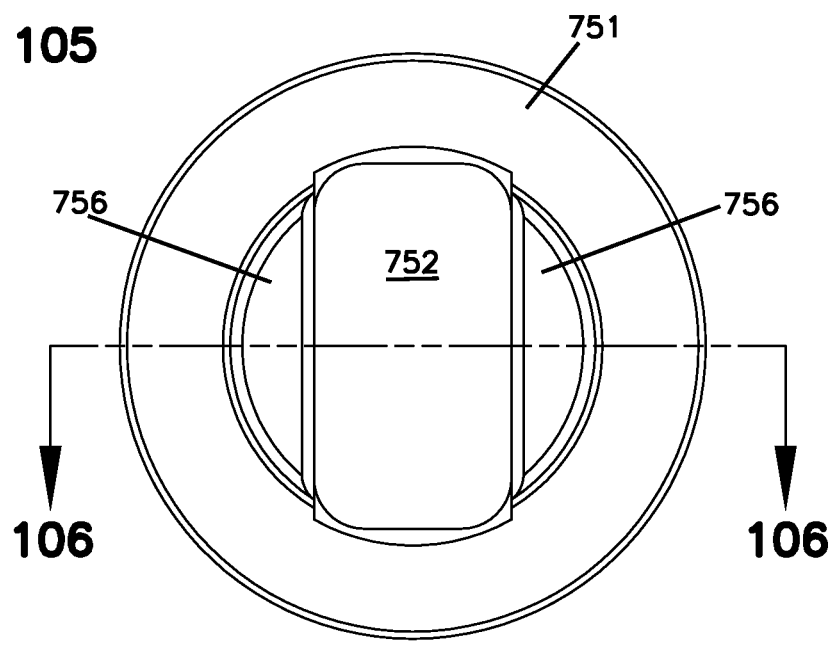
Figure 106:
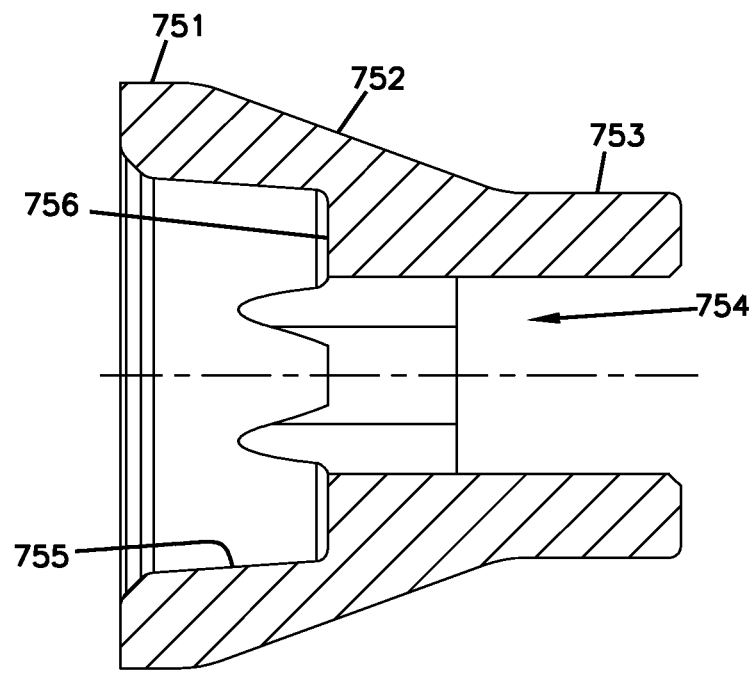
Figure 108:
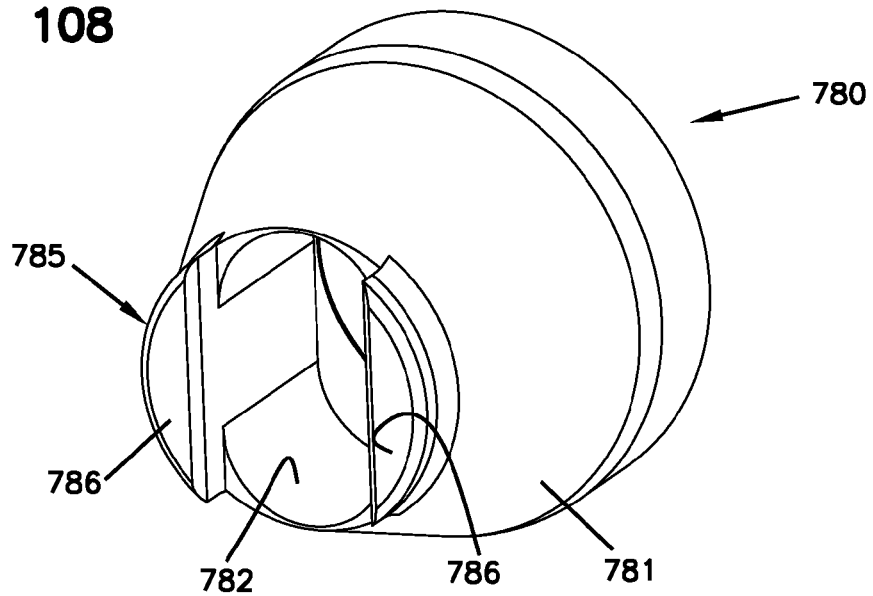
FIGS. 107-112 show another example stabilizer of the splice enclosure arrangement of FIG. 65 in accordance with aspects of the disclosure.
Figure 107:
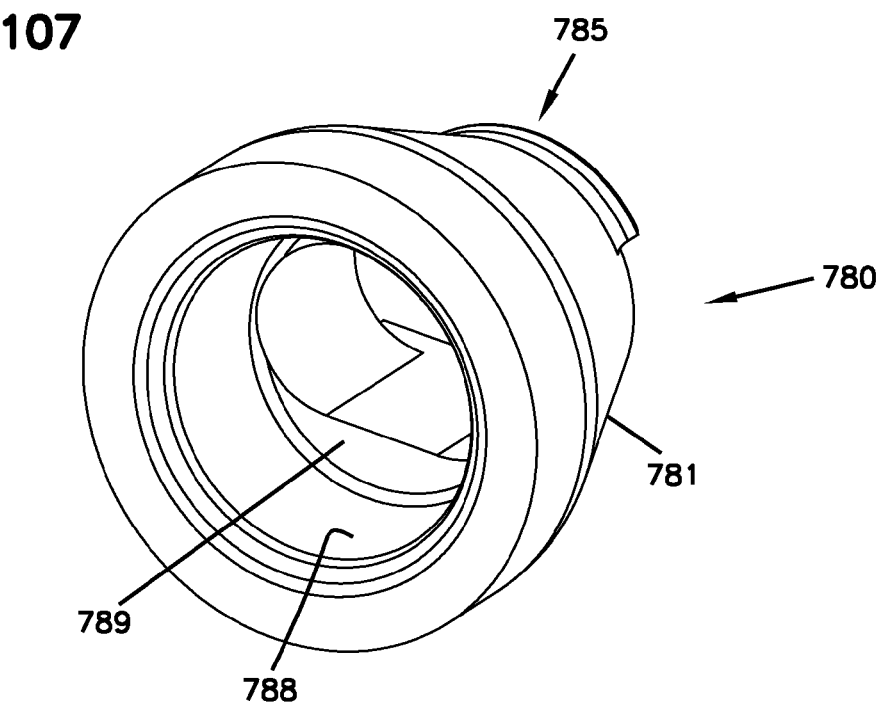
Figure 110:
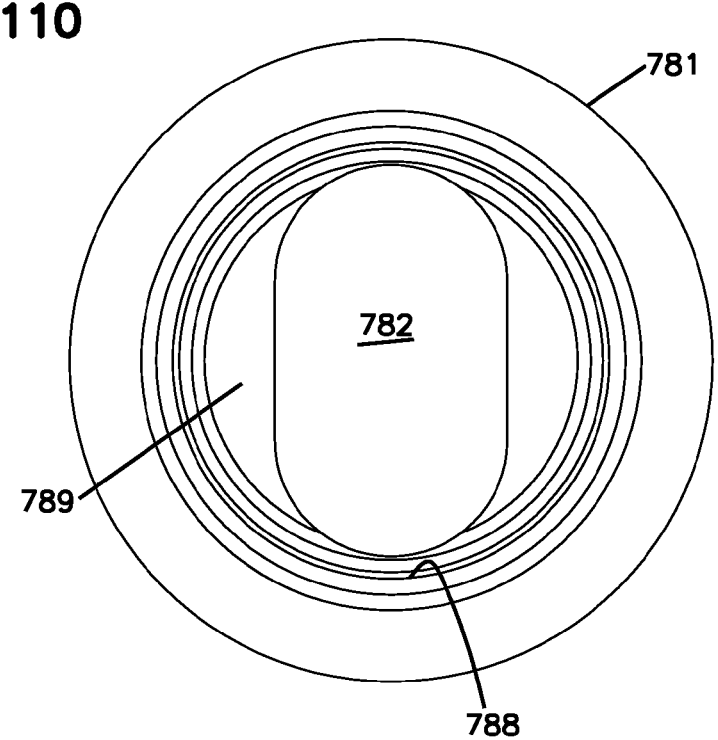
Figure 109:
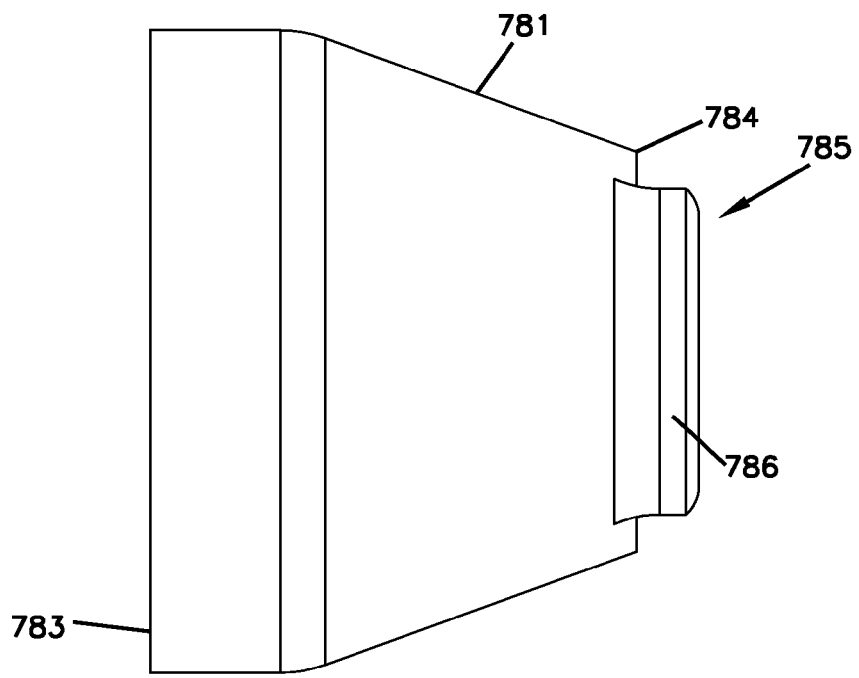
Figure 111:
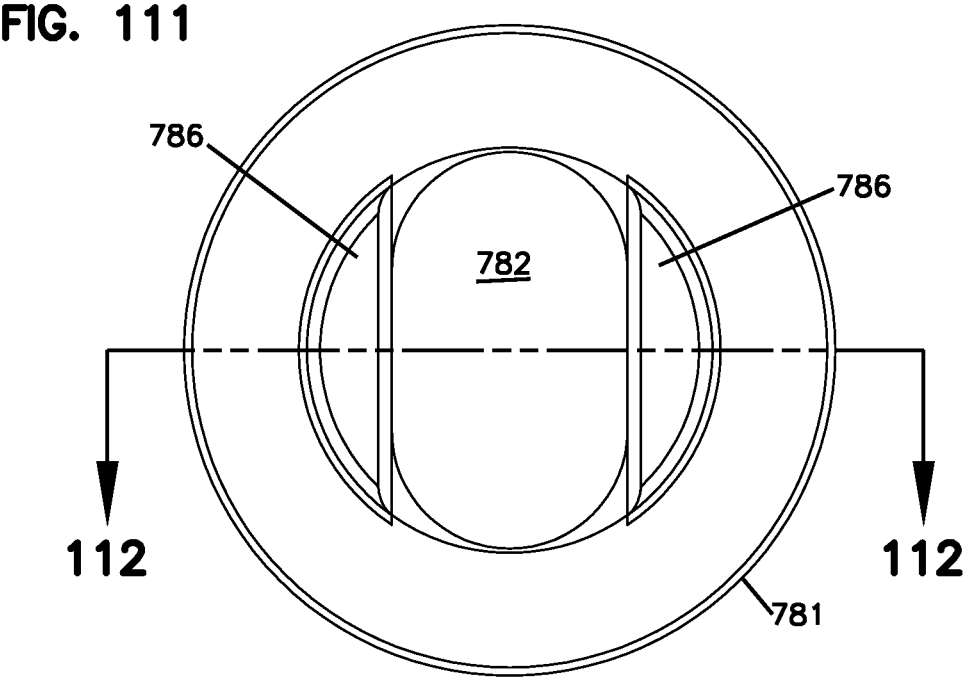
Figure 112:
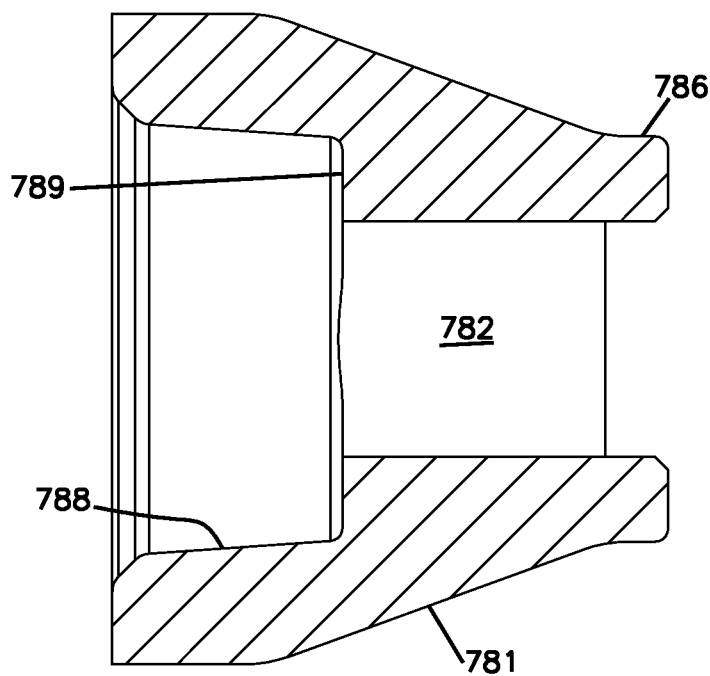
Figure 113:
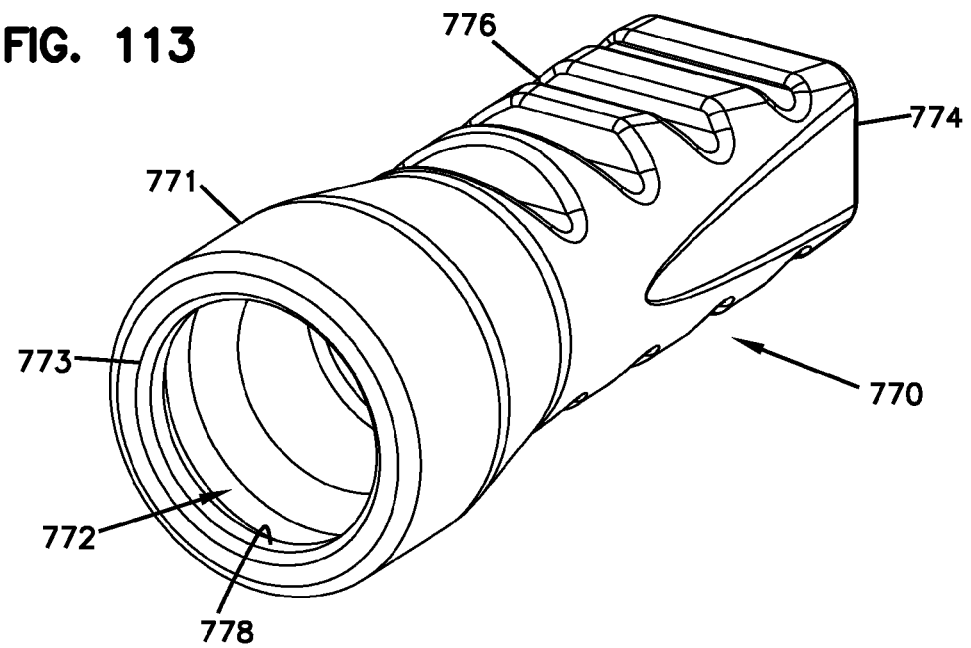
FIGS. 113-117 show one example strain relief device suitable for providing strain relief to at least the first cable segment in accordance with aspects of the disclosure.
Figure 114:
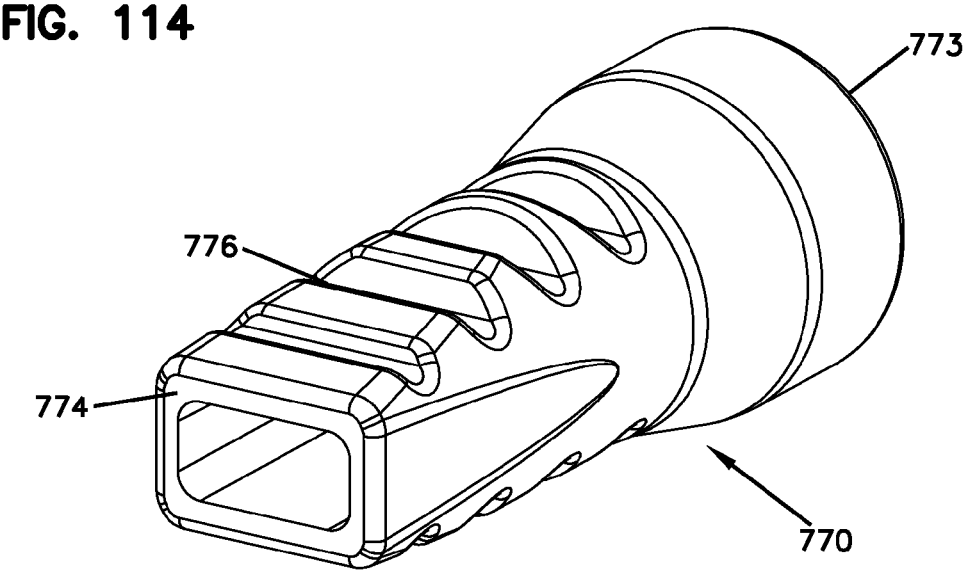
Figure 115:
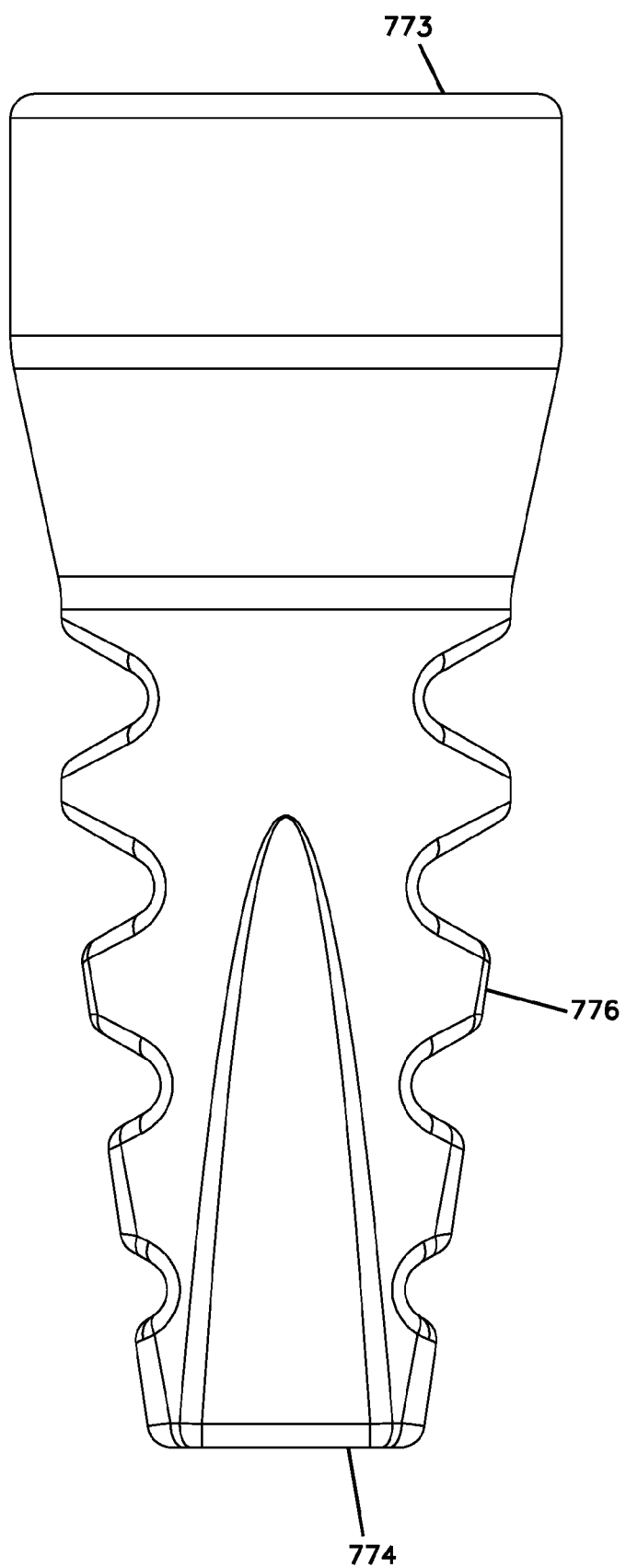
Figure 116:
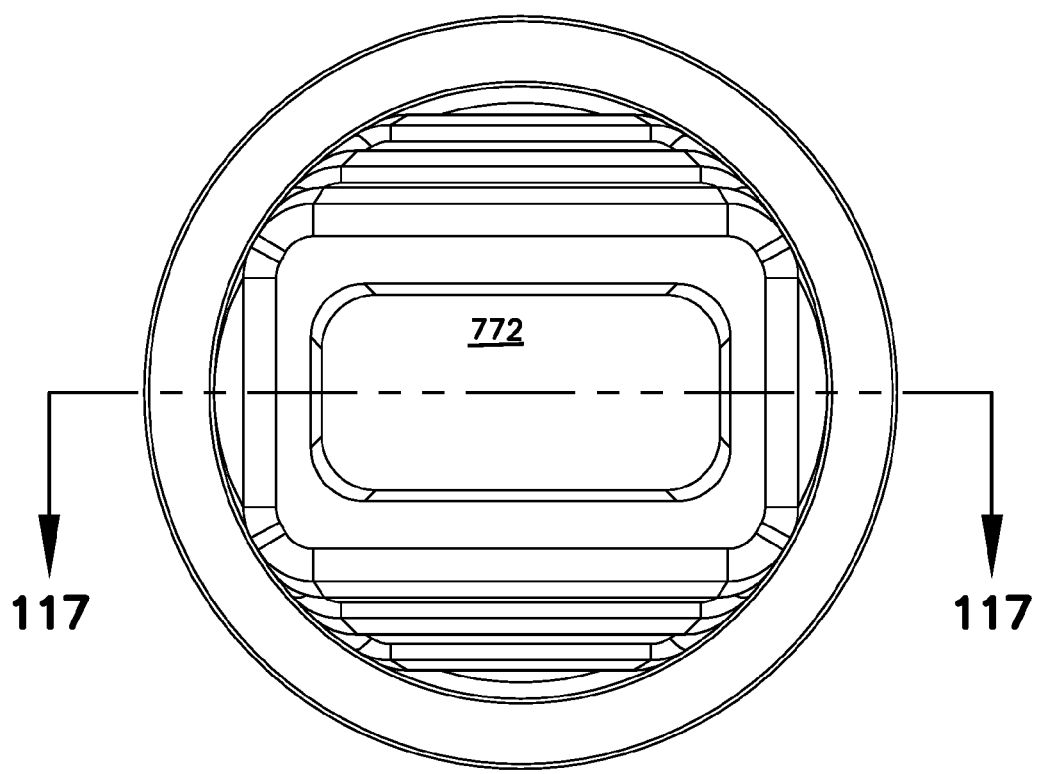
Figure 117:
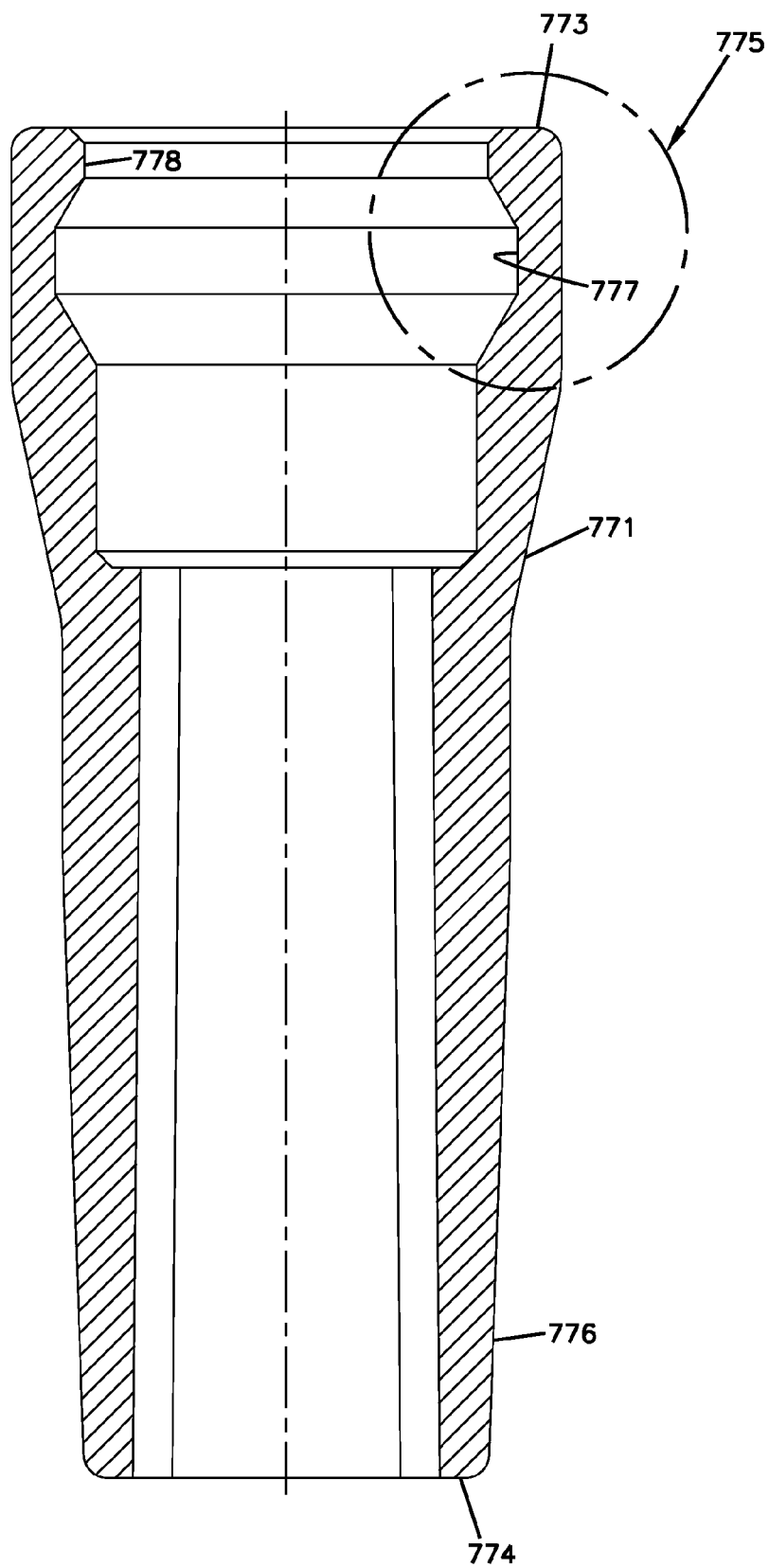

FIGS. 90-92 illustrate a lock member 730 that is configured to aid in securing the cable retention member 720 within the tube 710. In some implementations, the lock member 730 is configured to cooperate with the shoulders 716 of the tube 710 to inhibit rotation of the retention member 720 relative to the tube 710 from the locking orientation to the pass-through orientation. In certain implementations, the lock member 730 is configured to aid in inhibiting axial movement of the cable retention member 720 relative to the tube 710. For example, the lock member 730 may cooperate with the respective end cap 760, 790 and other components to inhibit axial movement of the retention member 720. Accordingly, the lock member 730 inhibits the retention member 720 from overcoming the shoulders 716 defined by the tracks 715 to rotate from the locking orientation to the pass-through orientation.

The lock member 730 includes prongs 733 extending from a base 721. The prongs 733 are sized and shaped to extend over sides 722 of the cable retention member 720 and to fill the gaps between the cable retention member 720 and the internal surface 719 of the tube 710. Each prong 733 has an inner surface 734, an outer surface 735, and two side surfaces 736. The inner surfaces 734 of the prongs 733 are sized and shaped complementary to the first sides 722 of the retention member 720. For example, in certain implementations, the inner surfaces 734 of opposing prongs 733 are flat and spaced at an appropriate distance apart to enable the inner surfaces 734 to slide over the flat first sides 722 of the retention members 721.

The outer surfaces 735 are sized and shaped complementary to the internal surface 719 of the tube 710. For example, the outer surfaces 735 may be curved to match the curved internal surface 719 of the tube 710. The side surfaces 736 of the prongs 733 extend between the inner and outer surfaces 734, 735 and are shaped to facilitate insertion of the prongs 733 into the ends of the tube 710 around the retention member 720. In some implementations, the side surfaces 736 are sized and shaped to avoid interference with the tracks. Indeed, in some implementations, the side surfaces 736 of the prongs 733 are shaped complementary to the lateral sides of the tracks 715. In other implementations, the side surfaces 736 do not touch the tracks 715 when the lock 730 is mounted over the retention member 720.

The base 731 of the lock 730 defines an opening 732 that is sized to fit between the prongs 733. The opening 732 also is sized to enable the cable segments 110, 120 to pass through the opening 732. For example, the opening 732 is sufficiently large to enable jacketed portions of the cable segments 110, 120 to pass therethrough. In the example shown, the opening 732 is obround. In other implementations, however, the opening 732 may be circular, elliptical, oblong, square, or any other desired shape. In some implementations, the lock 730 used for the first cable segment 110 has the same shaped opening as the lock 730 used for the second cable segment 120. In other implementations, however, the openings 732 of the locks 730 can vary to match the shape of the cable segment being secured.

FIGS. 93-100 show example gaskets suitable for use in sealing the ends of the enclosure tube 710. The gaskets inhibit dust, dirt, or other contaminants from entering the enclosure tube 710. In some implementations, the same type of gasket is used at both ends of the enclosure tube 710. In other implementations, however, different types of gaskets can be used. For example, in one implementation, a through-passage of each gasket can be sized and shaped to match the transverse cross-sectional profile of the cable segment over which the gasket is mounted.

In certain implementations, each gasket is mounted between one of the cable retention members 720 and one of the end caps 760, 790. Indeed, in certain implementations, each gasket is mounted between one of the lock members 730 and a stabilizer 750, 780, respectively. In accordance with some aspects, each gasket is axially compressed between the tube 710 and the respective stabilizer 750, 780 to inhibit ingress of contaminants into the tube 710. In accordance with other aspects, each gasket is radially compressed between the respective stabilizer 750, 780 and the respective cable segment 110, 120 to inhibit ingress of contaminants into the tube 710.

FIGS. 93-96 show a first example gasket 740 configured to seal one end of the tube 710 while enabling the first cable segment 110 to extend into the tube 710. FIGS. 97-100 show a second example gasket 740' configured to seal the other end of the tube 710 while enabling the second cable segment 120 to extend into the tube 710. Each example gasket 740, 740' includes a gasket body 741 having a first end 743 and a second end 744. In the example shown, the cross-sectional profile of the second end 744 of the gasket body 741 is larger than the cross-sectional profile of the first end 743.

The gasket body 741 of each gasket 740, 740' defines a through-passage 742, 742', respectively, extending between the first and second ends 743, 744. The through-passages 742, 742' are sized and shaped to enable at least the optical fibers of the respective cable segment 110, 120 to extend through the passage 742, 742', respectively. In certain implementations, the through-passages 742, 742' are sized and shaped to enable a jacketed portion of the respective cable segments 110, 120 to extend through the passages 742, 742'. When the gaskets 740, 740' are mounted to the cable segments 110, 120, the first end 743 of each gasket body 741 is configured to face toward the enclosure tube 710.

The gasket body 741 includes a sealing ridge 746 having a transverse cross-sectional profile with sufficient diameter to abut the ends of the tube 710 when the first end 743 of the gasket body 741 extends into the tube 710. In certain implementations, the first end 743 of each gasket body 741 abuts the respective lock member 730 or retention member 720. The exterior surface 748 of the gasket body 741 tapers radially inwardly from the sealing ridge 746 to the second end 744.

Stabilizers 740, 760 mount to respective cable segments 110, 120 and fit within respective end cap 760, 790. FIGS. 101-106 show a first example implementation of a stabilizer 750 suitable for use with the first cable segment 110. FIGS. 107-112 show a second example implementation of a stabilizer 780 suitable for use with the second cable segment 120. The stabilizers 750, 780 are configured to compress the gaskets 740, 740' between the respective ends of the enclosure tube 710 and the respective stabilizers 750, 780 when the end caps 760, 790 are mounted to the tube 710 to enhance sealing of the tube 710. In certain implementations, the sealing ridge 746 of the gasket body 741 defines an abutment surface 747 that is sized and shaped to interface with a first end of the respective stabilizer.

In accordance with certain aspects, the sealing ridge 746 of each gasket body 741 is axially compressed between the respective end of the tube 710 and the respective stabilizer 750, 780 when the respective end cap 760, 790 is mounted to the respective end of the tube 710. The axial compression of the sealing ridge 746 inhibits the ingress of contaminants into the tube 710 through the connection between the tube and the respective end cap or through the connection between the respective end cap and the respective stabilizer.

In certain implementations, the gasket body 741 of each gasket 740, 740' tapers to a second end 744 having a transverse cross-sectional profile that is sufficiently small to fit within the respective stabilizer 750, 780. Each stabilizer 750, 780 is configured to radially compress the tapered surface of the respective gasket body 741 to seal the gasket body 741 to the respective cable segment 110, 120. For example, the first stabilizer 750 is configured to compress the tapered portion of the first gasket 740 against the first cable segment 110 to inhibit ingress of contaminants into the first end of the tube 710. The second stabilizer 780 is configured to compress the tapered portion of the second gasket 740' against the second cable segment 120 to inhibit ingress of contaminants into the second end of the tube 710.

The first example stabilizer 750 (FIGS. 101-106) has an annular body 751 that defines a through passage 752 extending from a first end 753 to a second end 754. The through-passage 752 is sized and shaped to allow the cable segment 110 to pass therethrough. The second end 754 of the first stabilizer 750 is configured to be received in the first end cap 760. In some implementations, a shroud 755 extends from the second end 754 of the annular body 751. In certain implementations, the shroud 755 includes prongs 756 that inhibit bending of the cable adjacent the stabilizer 750. In the example shown, the shroud 755 includes two prongs 756 defining opposing flat surfaces 757 between which the first cable segment 110 extends. The prongs 756 of the first stabilizer 750 are sized and shaped to fit within an interior of the first end cap 760.

The annular body 751 defines an interior surface 758 that is configured (e.g., sized and shaped) to mount over the tapered portion of the gasket body 741. In some implementations, shoulders 759 protrude inwardly from the interior surface 758 of the annular body 751. For example, opposing shoulders 759 may protrude inwardly to define the through-passage 752. When the stabilizer 750 is mounted over the first gasket 740, the second end 744 of the gasket body 741 abuts against the shoulders 759, the abutment surface 747 of the gasket body 741 abuts against the front end 753 of the annular body 751, and the exterior surface 748 of the gasket body 741 compresses against the interior surface 758 of the annular body 751.

The second example stabilizer 780 (FIGS. 107-112) has an annular body 781 that defines a through passage 782 extending from a first end 783 to a second end 784. The through-passage 782 is sized and shaped to allow the second cable segment 120 to pass therethrough. In certain implementations, the through-passage 782 of the second stabilizer 780 is substantially the same size and shape as the through-passage 752 of the first stabilizer 750. In other implementations, the through-passage 782 has a different size and/or a different shape than the through-passage 752. For example, in one implementation, the through-passage 782 is oblong and the through passage 752 is more rectangular.

The second end 784 of the second stabilizer 780 is configured to be received in the second end cap 790. In some implementations, a shroud 785 extends from the second end 784 of the annular body 781. In certain implementations, the shroud 785 includes prongs 786. The prongs 786 of the second stabilizer 780 are sized and shaped to fit within an interior of the second end cap 790. In the example shown, the shroud 785 includes two prongs 786 defining opposing flat surfaces 787 between which the second cable segment 120 extends. In certain implementations, the prongs 786 of the second stabilizer 780 are shorter than the prongs 756 of the first stabilizer 755. In other implementations, the shroud 785 fully surrounds the second cable 120. In still other implementations, second stabilizer 780 does not have a shroud 785.

The annular body 781 defines an interior surface 788 that is configured (e.g., sized and shaped) to mount over the tapered portion of the gasket body 741. In some implementations, shoulders 789 protrude inwardly from the interior surface 788 of the annular body 781. For example, opposing shoulders 789 may protrude inwardly to define the through-passage 782. When the second stabilizer 780 is mounted over the second gasket 740', the second end 744 of the gasket body 741 abuts against the shoulders 789, the abutment surface 747 of the gasket body 741 abuts against the first end 783 of the annular body 781, and the exterior surface 748 of the gasket body 741 compresses against the interior surface 788 of the annular body 781.

FIGS. 113-117 show one example strain relief device 770 suitable for providing strain relief to at least the first cable segment 110. The strain relief device 770 includes a body 771 having a first end 773 and a second end 774. A through-passage 772 extends through the body 771 between the first and second ends 773, 774. The first end 773 of the strain relief body 771 includes a mounting section 775 that is configured to mount to the second section 762 of the first end cap 760. The second end 774 of the strain relief body 771 provides a boot section 776 that inhibits bending of the first cable segment 110 beyond a maximum bend radius.

In some implementations, the mounting section 775 can define an annular groove 777 along an interior surface of the body 771. The mounting section 775 also can define a lip 778 that is sufficiently flexible to enable the bulged portion of the first end cap 760 to push past the lip 778 to the groove 777. For example, in one implementation, the lip 778 of the strain relief mounting section 775 camps over the third surface 769 of the bulged portion, over the second surface 768, and down the first surface 767 so that the second surface 768 of the bulged portion seats in the groove 777 of the mounting section 775.

The boot section 776 of the strain-relief body 771 is sized and shaped to enable a jacketed portion of the first cable segment 110 to extend therethrough while inhibiting passage of the first end cap 760 therethrough. In one implementation, the second end 774 of the strain-relief device 770 can have a transverse cross-sectional profile that matches a transverse cross-sectional profile of the first cable segment 110.

In accordance with some aspects, the splicing process 300 shown in FIG. 7 can be implemented using the enclosure arrangement 700. For example, a technician is initially provided 302 with a first cable segment 110, a second cable segment 120, and the enclosure arrangement 700. The technician prepares 304 the first cable segment 110 and prepares 306 the second cable segment 120. For example, the technician can prepare the cable segments 110, 120 as discussed above.

At the end of the preparation steps, the first end 111 of the first cable segment 110 will have at least the strain relief device 770, the first end cap 760, a first stabilizer 750, a first gasket 740, a lock 730, and a cable retention member 720 threaded onto the optical fibers 112/strength members 117 as appropriate. In certain implementations, the first cable segment 110 also will have the enclosure tube 710 threaded onto the optical fibers 112/strength members 117 as well. The first end 121 of the second cable segment 120 will have the second end cap 790, a second stabilizer 780, a second gasket 740', another lock 730, and another cable retention member 720 threaded onto the optical fibers 122/strength components 127 as appropriate. In certain implementations, the second cable segment 120 also will have the enclosure tube 710 threaded onto the optical fibers 122/strength members 127 as well.

The technician splices 308 the optical fibers 112 of the first cable segment 110 to the optical fibers 122 of the second cable segment 120, e.g., as discussed above. The technician then secures 310 the spliced fibers within the splice enclosure arrangement 700 and seals 312 the splice enclosure arrangement 700. For example, the technician can attach (e.g., insert and glue) the strength members 117, 127 of each cable segment 110, 120 to one of the cable retention member 720. The technician also can position the enclosure tube 710 over the spliced fibers by sliding the enclosure tube 710 over a closest one of the cable retention members 720.

The technician then rotates the enclosure tube 710 and inserts the cable retention members 720 between the shoulders 716 of the tube 710 to seat against the respective ledges 717 on each side. To allow the retention members 720 to be inserted into opposite ends of the tube after the fibers 112, 122 are spliced, excess fiber length is provided within the tube 710 between the two retention members 720 after the retention members 720 have been mounted within the ends of the tube 710. In other words, the length of fiber extending between the retention members 720 is longer than the enclosure tube 710. The enclosure tube 710 is sized to accommodate the excess fiber length. The technician slides the locks 730 into place against the retention members 720 to axially and rotationally secure the retention members 720 within the tube 710.

The technician slides the gaskets 740, 740' against the respective locks 730, slides the first and second stabilizers 750, 780 over the respective gaskets 740, 740', and slides the end caps 760, 790 over the respective stabilizers 750, 780. The first end cap 760 threads onto the first connection region 713 of the enclosure tube 710 to hold the first cable retention member 720, first lock 730, first gasket 740, and first stabilizer 750 in an axially fixed position relative to the enclosure tube 710. In one implementation, the strain-relief device 770 is mounted to the end cap 760 before the end cap 760 is mounted to the tube 710. In another implementation, the strain-relief device 770 is mounted to the end cap 760 after the end cap 760 is mounted to the tube 710. The second end cap 790 threads onto the second connection region 714 of the enclosure tube 710 to hold the second cable retention member 720, second lock 730, second gasket 740', and second stabilizer 780 in an axially fixed position relative to the enclosure tube 710.

Figure 118:
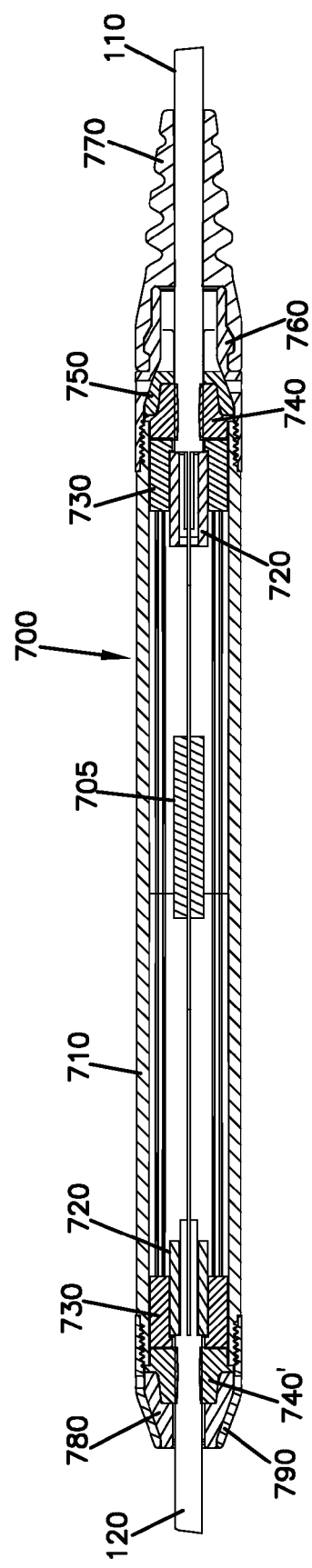
FIG. 118 is a longitudinal cross-sectional view of the cable and splice enclosure of FIG. 120 taken along the 118-118 line in accordance with aspects of the disclosure.
Figure 119:
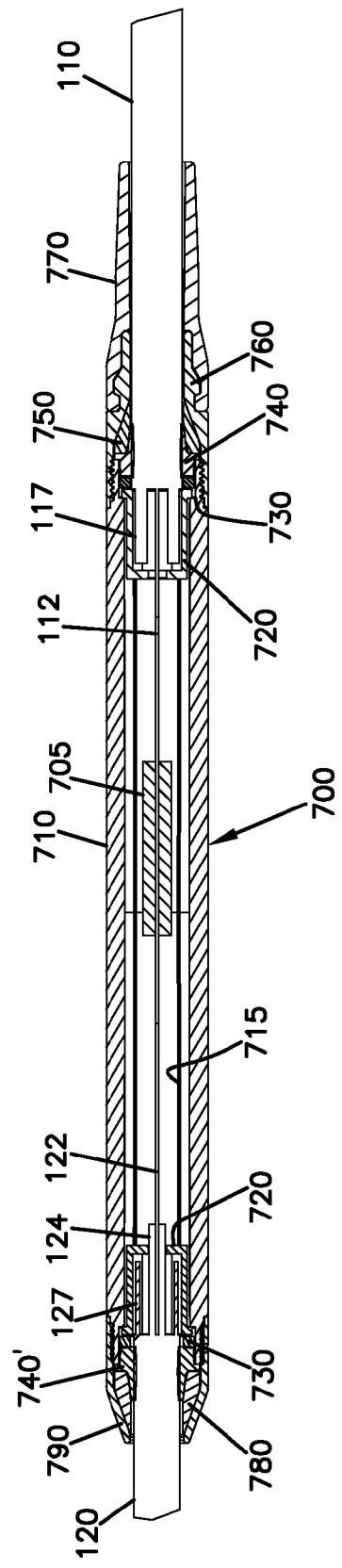
FIG. 119 is a longitudinal cross-sectional view of the cable and splice enclosure of FIG. 120 taken along the 119-119 line in accordance with aspects of the disclosure.

FIGS. 118 and 119 show the cable 100 having a splice location over which the splice enclosure 700 is mounted. For clarity, in FIGS. 118 and 119, the splice enclosure 700 is shown in cross-section and the cable 100 is shown schematically. FIG. 120 shows a perspective view of a cable 100 with the splice enclosure 700 mounted over the splice location connecting the first cable segment 110 to the second cable segment 120. The gaskets 740, 740' provide sealing protection for the bare optical fibers 112, 122 within the tube 710 at the splice location. Accordingly, in certain implementations, neither a heat shrink tube nor an overmolding enclosure is applied to the cable 100. In the example shown in FIG. 120, the second cable segment 120 is a tether terminated by a plug-type connector (e.g., see connector 500 of FIG. 5A).

In accordance with some aspects, multiple splices can be provided on a cable. For example, in some implementations, tethers can be spliced to opposite ends of an intermediate cable. In some implementations, the tethers have different cable configurations from the intermediate cable. In other implementations, one or both of the tethers may have the same configuration as the intermediate cable. In still other implementations, multiple lengths of unconnectorized cables may be spliced together. Any of the above described splices can be protected using any of the splice enclosures described herein. For example, each splice may be protected using the splice enclosure 700 (FIGS. 65-118).

Figure 121:
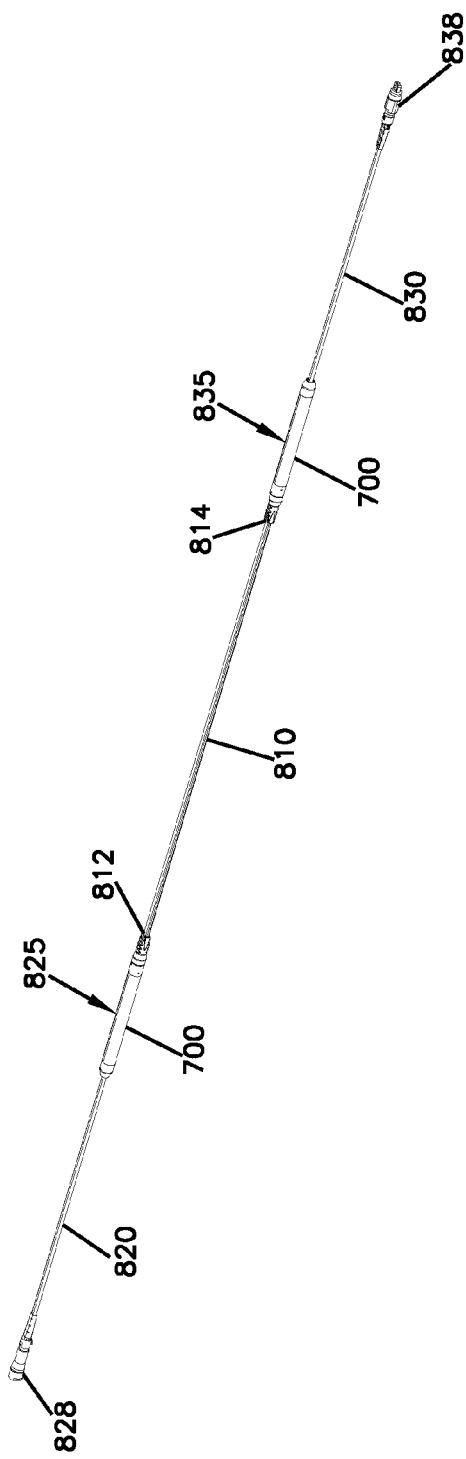
FIG. 121 is a perspective view of an example cable in which implementations of the splice enclosure of FIG. 65 cover multiple splice locations in accordance with aspects of the disclosure.

FIG. 121 shows an example cable 800 having a first tether 820 spliced (see 825) to a first end 812 of an intermediate cable 810 and a second tether 830 spliced (see 835) to a second end 814 of the intermediate cable 810. The splice enclosure 700 is mounted over each splice location 825, 835. In the example shown, the intermediate cable 810 is formed and configured like the first cable segment 110 disclosed herein and each tether 820, 830 is formed and configured like the second cable segment 120. Accordingly, the side of each enclosure tube 710 facing the intermediate cable 810 attaches to a first end cap 760 and strain-relief device 770. The side of each enclosure tube 710 facing the respective tether 820, 830 attaches to a second end cap 790.

In some implementations, distal ends of the tethers 820, 830 are connectorized. In one implementation, the first tether 820 is terminated at a ruggedized jack 828 (e.g., see receptacle 500' of FIG. 5B) and the second tether 830 is terminated at a ruggedized plug connector 838 (e.g., see plug 500 of FIG. 5A). In other implementations, each tether 820, 830 may be terminated with the same type of connector or plug. In other implementations, one or both tethers 820, 830 may include separately terminated optical fibers (e.g., with LC connectors, SC connectors, FC connectors, ST connectors, LX.5 connectors, etc.). In still other implementations, the distal ends of the tethers 820, 830 may be unconnectorized.

Figure 122:
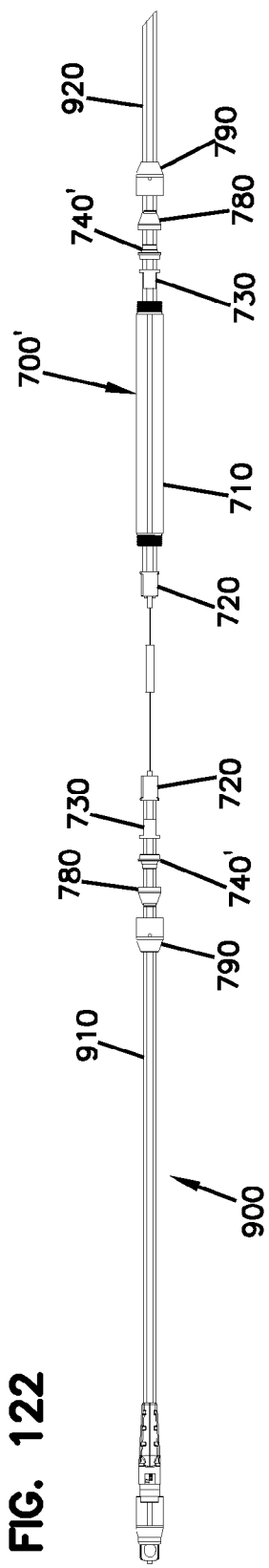
FIG. 122 is a side elevational view of an example cable in which an alternative splice enclosure is positioned on the cable after splicing the fibers and before assembling the enclosure in accordance with aspects of the disclosure.

In accordance with some aspects, a variation of the splice enclosure 700 may be used to splice together cable segments having the same configurations. FIG. 122 shows one example cable 900 using an alternative splice enclosure 700' to optically couple two cable segments 910, 920 that are both configured like the second cable segment 120. For example, each of the cable segments 910, 920 includes optical fibers surrounded by a buffer tube. Strength members extend along opposite sides of the buffer tube.

The alternative splice enclosure 700' includes the enclosure tube 710, two cable retention member 720, two locks 730, two second gaskets 740', two second stabilizers 780, and two second end caps 790 of the splice enclosure 700. Each cable segment 910, 920 is prepared, spliced, and sealed using the steps described above with respect to the splice enclosure 700 and the second cable segment 120. In still other implementations, another alternative splice enclosure can be used to optically couple two cable segments that are both configured like the first cable segment 110. For example, such a splice enclosure would include a strain-relief device 770 mounted to each cable segment.

From the forgoing detailed description, it will be evident that modifications and variations can be made in the methods of the disclosure without departing from the spirit or scope of the disclosure.

The invention claimed is:

1. An optical fiber cable comprising:
   a first cable segment including at least one optical fiber enclosed in a first jacket, the first cable segment also including at least one strength member;
   a second cable segment including at least one optical fiber enclosed in a second jacket, the second cable segment also including at least one strength member that is less flexible than the strength member of the first cable segment, the optical fiber of the second cable segment being spliced to the optical fiber of the first cable segment;
   a splice enclosure mounted over the spliced optical fibers of the first and second cable segments, the splice enclosure including an enclosure tube, a first end cap configured to mount to a first end of the enclosure tube, and a second end cap configured to mount to a second end of the enclosure tube;
   a first cable retention member configured to fit within the enclosure tube, the first cable retention member being configured to directly contact and retain the strength member of the first cable segment;
   a first gasket configured to seal the enclosure tube at the first end when the first end cap is mounted to the first end of the tube;
   a second cable retention member configured to fit within the enclosure tube, the second cable retention member being configured to directly contact and retain the strength member of the second cable segment; and
   a second gasket configured to seal the enclosure tube at the second end when the second end cap is mounted to the second end of the tube.

2. The optical fiber cable as claimed in claim 1, wherein the strength member of the first cable segment is crimped to the first cable retention member.

3. The optical fiber cable as claimed in claim 1, wherein the strength member of the second cable segment is glued to the second cable retention member.

4. The optical fiber cable as claimed in claim 1, further comprising a strain relief device that couples to the first end cap.

5. The optical fiber cable as claimed in claim 1, wherein the enclosure tube defines a first interior shoulder and a second interior shoulder, wherein the first cable retention member is retained between the first interior shoulder and the first end cap, and wherein the second cable retention member is retained between the second interior shoulder and the second end cap.

6. The optical fiber cable as claimed in claim 1, wherein the first cable retention member is identical to the second cable retention member.

7. The optical fiber cable as claimed in claim 1, wherein each cable retention member defines a through-passage, wherein a first end of the through-passage is larger than a second end of the through-passage, wherein the second end of the through-passage is sufficiently sized to enable passage of a buffered optical fiber.

8. The optical fiber cable as claimed in claim 7, wherein each cable retention member defines an internal shoulder that are configured to inhibit passage of the respective strength member through the second end of the through-passage.

9. The optical fiber cable as claimed in claim 1, wherein splice enclosure is configured to enabling sliding of the cable retention members therethrough when the respective cable retention member is positioned in a first rotational orientation relative to the splice enclosure and to inhibit sliding of the cable retention members therethrough when the respective cable retention member is positioned in a second rotational orientation relative to the splice enclosure.

10. The optical fiber cable as claimed in claim 9, further comprising:
a first lock member configured to fit over the first cable retention member to rotationally lock the first cable retention member in the second rotational orientation; and
a second lock member configured to fit over the second cable retention member to rotationally lock the second cable retention member in the second rotational orientation.

11. The optical fiber cable as claimed in claim 10, wherein the first gasket is disposed between the first lock member and the first end cap; and wherein the second gasket is disposed between the second lock member and the second end cap.

12. The optical fiber cable as claimed in claim 9, wherein each cable retention member includes a body having opposing first sides interconnected by opposing second sides, the first sides define planar external surfaces and the second sides define convexly curved external surfaces, the second sides also including radially outward projections at one end of the respective cable retention member.

13. The optical fiber cable as claimed in claim 12, wherein the splice enclosure defines opposing internal tracks protruding radially into the splice enclosure from an inner wall of the splice enclosure, wherein the splice enclosure has a first internal cross-dimension defined between opposing points on the inner wall of the splice enclosure, and wherein the splice enclosure has a second internal cross-dimension defined between the opposing internal tracks, wherein the first internal cross-dimension is sized to accommodate the radially outward projections of the cable retention members, and wherein the second internal cross-dimension are not sized to accommodate the radially outward projections of the cable retention members.

14. The optical fiber cable as claimed in claim 13, wherein axial ends of the internal tracks are inwardly offset from axial ends of the splice enclosure.

15. The optical fiber cable as claimed in claim 13, further comprising:
a first lock member configured to fit over the first cable retention member to rotationally lock the first cable retention member in the second rotational orientation, the first lock member including prongs extending from a base, the prongs spaced sufficiently apart to extend over the first sides of the first cable retention member; and
a second lock member configured to fit over the second cable retention member to rotationally lock the second cable retention member in the second rotational orientation, the second lock member including prongs extending from a base, the prongs spaced sufficiently apart to extend over the first sides of the second cable retention member.

* * * * *